US006775729B1

(12) United States Patent
Matsuo et al.

(10) Patent No.: US 6,775,729 B1
(45) Date of Patent: Aug. 10, 2004

(54) PERIPHERAL DEVICE, PERIPHERAL DEVICE CONTROL METHOD, PERIPHERAL DEVICE CONTROL SYSTEM, STORAGE MEDIUM FOR STORING PERIPHERAL DEVICE CONTROL PROGRAMS, SENDING DEVICE FOR SENDING PERIPHERAL DEVICE CONTROL PROGRAMS, AND PERIPHERAL DEVICE CONTROL PROGRAM PRODUCT

(75) Inventors: Takyuki Matsuo, Yokohama (JP); Tomoaki Endo, Ichikawa (JP); Mamoru Osada, Kawasaki (JP); Takashi Inoue, Yokohama (JP); Yasuhiko Sasaki, Tokyo (JP); Naoko Shimotai, Kawasaki (JP); Tomoko Takagi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/448,593

(22) Filed: Nov. 24, 1999

(30) Foreign Application Priority Data

Nov. 25, 1998 (JP) .......................................... 10-333777
Oct. 6, 1999 (JP) .......................................... 11-285458

(51) Int. Cl.[7] ................................................ G06F 1/00
(52) U.S. Cl. ........................ 710/263; 710/268; 710/260
(58) Field of Search ................................. 710/260–262, 710/264, 266, 268–269, 62, 63, 72; 358/501, 403, 407, 442, 443, 452; 709/100–108

(56) References Cited

U.S. PATENT DOCUMENTS

| | | | | | |
|---|---|---|---|---|---|
| 4,001,784 | A | * | 1/1977 | Bardotti | 340/172.5 |
| 5,784,622 | A | * | 7/1998 | Kalwitz et al. | 710/263 |
| 5,819,112 | A | * | 10/1998 | Kusters | 710/65 |
| 5,920,405 | A | * | 7/1999 | McIntyre et al. | 358/442 |
| 5,925,116 | A | * | 7/1999 | Minamizawa | 710/64 |
| 5,970,223 | A | * | 10/1999 | Debes et al. | 395/115 |
| 5,978,559 | A | * | 11/1999 | Quinion | 395/114 |
| 5,995,723 | A | * | 11/1999 | Sperry et al. | 395/114 |
| 6,009,454 | A | * | 12/1999 | Dummermuth | 709/108 |
| 6,275,893 | B1 | * | 8/2001 | Bonola | 710/262 |
| 6,321,266 | B1 | * | 11/2001 | Yokomizo et al. | 709/226 |
| 6,332,170 | B1 | * | 12/2001 | Ban | 710/6 |

FOREIGN PATENT DOCUMENTS

| | | | | |
|---|---|---|---|---|
| EP | 0 820 185 A2 | * | 7/1997 | H04N/1/32 |

* cited by examiner

*Primary Examiner*—Paul R. Myers
*Assistant Examiner*—Raymond N Phan
(74) *Attorney, Agent, or Firm*—Fitzpatrick, Cella, Harper & Scinto

(57) ABSTRACT

A peripheral device is connected to an information processing device, and in the event that an interruption job is input from the information processing device while the peripheral device is processing a job by executing one of multiple device control programs holding the functions of multiple devices engines of the peripheral device and managing jobs with the device engines, another device control program different from the device control program being executed is selected and the interruption job is executed. Accordingly, a user-friendly multifunctional peripheral device can be provided.

13 Claims, 94 Drawing Sheets

FIG. 7

ATTRIBUTES TABLE (SUPERVISOR)

701 702 703

| ATTRIBUTE ID | TYPE ID | VALUE |
|---|---|---|
| 10 | 1 | 0 |
| 11 | 1 | 0 |
| 100 | 11 | 10, 11, 100, 101, 102, 103, 104, 105, ··· |
| 101 | 11 | 1, 2, 3, 7, 9 |
| 102 | 11 | 1, 3 |
| 103 | 1 | 1 |
| 104 | 11 | 1001, 1002, 1003, 1004 |
| 105 | 11 | 1003 |
| 301 | 3 | "SuperMFP-1" |
| 302 | 13 | "Japanese", "English" |
| 303 | 1 | "English" |
| | | |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| 503 | 53 | Table Data |
| | | |
| 1001 | 101 | Table Data |
| 1002 | 102 | Table Data |
| 1003 | 103 | Table Data |
| 1004 | 104 | Table Data |
| 2001 | 11 | 21, 22, 23, 24 |

FIG. 8

• REPRESENTS THE ATTRIBUTES THE SUPERVISOR HAS.
• THE CLIENT ALREADY KNOWS WHAT THE ATTRIBUTE ID MEANS.

• ATTRIBUTE ID

| | |
|---|---|
| 10 | TaskType |
| 11 | Service ID |
| 100 | LIST OF ATTRIBUTE IDS |
| 101 | SUPPORTED OPERATIONS |
| 102 | SUPPORTED SECURITY LEVELS |
| 103 | CURRENT SECURITY LEVEL |
| 104 | ATTRIBUTES LIST WHICH ONLY ADMINISTRATOR CAN CHANGE |
| 105 | ATTRIBUTES LIST WHICH ONLY ADMINISTRATOR CAN OBTAIN |
| 301 | MODEL NAME |
| 302 | SUPPORTED LANGUAGES |
| 303 | CURRENT LANGUAGE |
| 401 | CURRENT COUNT DATA |
| 402 | COUNT DATA FORMAT |
| 403 | COUNT RESTRICTION DATA |
| 404 | COUNT UNIT PRICE DATA |
| 405 | CURRENT BILLING DATA |
| 406 | BILLING RESTRICTION DATA |
| 501 | LIST OF SUPPORTED EVENTS |
| 502 | EVENT SETTING TABLE |
| 503 | EVENT FORMAT TABLE |
| 1001 | SUB-ADDRESS/SID CORRELATION TABLE |
| 1002 | SID/TASK TYPE TABLE |
| 1003 | USER VERIFICATION TABLE |
| 1004 | ACCESS RESTRICTION TABLE |
| 2001 | CONTROLLER ID LIST |

• TYPE ID

| | |
|---|---|
| 0 | Boolean |
| 1 | INTEGER |
| 2 | REAL NUMBER |
| 3 | TEXT STRING |
| 11 | LIST OF INTEGERS |
| 12 | LIST OF REAL NUMBERS |
| 13 | LIST OF TEXT STRINGS |
| 52 | EVENT SETTING TABLE FORMAT |
| 53 | EVENT FORMAT TABLE FORMAT |
| 101 | SUB-ADDRESS/SID TABLE FORMAT |
| 102 | SID/TASK TYPE TABLE FORMAT |
| 103 | USER VERIFICATION TABLE FORMAT |
| 104 | ACCESS CONTROL TABLE FORMAT |

FIG. 9

SUB-ADDRESS/SERVICE ID CORRELATION TABLE

| CONNECTION FORMAT ID (801) | SUB-ADDRESS (802) | Service ID (803) | VALID FLAG (804) | VALID USER (805) | INVALID USER (806) |
|---|---|---|---|---|---|
| 0 | 0 | 0 | YES | | |
| 0 | 1 | 1 | YES | 2355, 5678 | |
| 0 | 2 | 2 | YES | | 1234, 2345 |
| 1 | 9600 | 0 | YES | | |
| 1 | 9601 | 1 | YES | | |
| 1 | 9602 | 2 | YES | 1234, 2345 | |
| 1 | 8001 | 101 | YES | 1234 | |
| 1 | 8002 | 102 | YES | | |
| 2 | 45 | 0 | YES | | |
| 2 | 46 | 1 | YES | | |
| 2 | 47 | 2 | YES | | |
| 2 | 68 | 8 | NO | | |
| 2 | 89 | 10 | YES | | |
| 3 | 23 | 0 | YES | | |
| 3 | 52 | 1 | YES | | |
| 3 | 98 | 17 | YES | | |

FIG. 10

- DESCRIBES TO WHICH SUB-ADDRESS A JOB SHOULD BE PROVIDED TO RECEIVE A SERVICE.
- THIS TABLE ALSO MANAGES WHETHER THE CONNECTION FORM IS VALID OR NOT (WHETHER OR NOT USE IS PERMITTED)
- CONNECTION FORMAT ID

0 : Internal
  1 : TCP/IP
  2 : IEEE1284.4
  3 : SBB-2

FIG. 11

SERVICE ID/TASK TYPE CORRELATION TABLE 901 902

| Service ID | Task Type |
|---|---|
| 0 | 0 |
| 1 | 1 |
| 2 | 1 |
| 3 | 1 |
| 4 | 1 |
| 5 | 1 |
| 6 | 1 |
| 7 | 1 |
| 8 | 1 |
| 9 | 1 |
| 10 | 2 |
| 11 | 3 |
| 12 | 3 |
| 13 | 3 |
| 14 | 3 |
| 15 | 3 |
| 16 | 3 |
| 17 | 3 |
| 18 | 3 |
| 19 | 11 |
| 20 | 13 |
| 101 | 101 |
| 102 | 102 |
| 103 | 103 |
| 104 | 104 |
| 21 | 201 |
| 22 | 201 |
| 23 | 201 |
| 24 | 202 |

FIG. 12

- A TABLE REPRESENTING WHAT SORT OF SERVICE THE SERVICE ID IS
- TASK TYPE IS EQUIVALENT TO TASK TYPE OF CPCA.
- THIS TABLE ALSO REFERRED TO FROM THE DISPATCHER, AND IS ALSO USED TO DISTRIBUTE COMMANDS TO THE MANAGERS.
- TaskType 0 : Supervisor
  1 : Print
  2 : Scan
  3 : Copy
  11 : Interrupt Print
  13 : Interrupt Copy
  101 : Font
  102 : Form Overlay
  103 : Log
  104 : Color Profile

FIG. 13

USER VERIFICATION TABLE

| UID (1001) | PASSWORD (1002) | ADMINISTRATOR (1003) |
|---|---|---|
| 2355 | 2345 | NO |
| 3254 | 2223 | NO |
| 4665 | 1145 | YES |
| ⋮ | ⋮ | ⋮ |
| 2664 | 1244 | NO |

FIG. 14

ACCESS CONTROL TABLE

| SID (1101) | Security Level (1102) | UID (1103) |
|---|---|---|
| 0 | 1 | – |
| 1 | 1 | – |
| 2 | 2 | 2355, 3254 |
| 3 | 3 | 3254, 4665 |
| ⋮ | ⋮ | ⋮ |
| 102 | 2 | 3254 |

FIG. 15

- REPRESENTS SECURITY LEVEL FOR EACH SERVICE
- SECURITY LEVEL
  - 0 : NO DISTINCTION
  - 1 : DISTINGUISH ONLY ADMINISTRATOR
  - 2 : AVAILABLE ONLY TO VERIFIED USERS (USE ONLY UID FOR VERIFICATION)
  - 3 : AVAILABLE ONLY TO VERIFIED USERS (USE UID AND PASSWORD FOR VERIFICATION)
- UID COLUMN IN TABLE USED ONLY WHEN SECURITY LEVEL IS 2 OR 3

FIG. 16

EVENT SETTING TABLE (SUPERVISOR)

| Event ID (1201) | CONNECTION FORMAT ID (1202) | NOTIFICATION DESTINATION ADDRESS (1203) |
|---|---|---|
| 200 | 0 | |
| 399 | 1 | 123, 222, 111, 321 : 9340 |
| 432 | 2 | 35 |
| 234 | 3 | 12 |

FIG. 17

EVENT FORMAT TABLE

| Event ID (1301) | EVENT FORMAT (1302) |
|---|---|
| 200 | 676, 756 |
| 399 | 666 |
| 432 | 698 |
| 234 | 600 |

FIG. 18

ATTRIBUTES TABLE (PRINT JOB MANAGER)

1401 1402 1403

| ATTRIBUTE ID | TYPE ID | VALUE |
|---|---|---|
| 10 | 1 | 1 |
| 11 | 1 | 4 |
| 100 | 11 | 10, 11, 100, 101, 104, 401, ··· |
| 101 | 11 | 11, 14, 15, 17 |
| 104 | 11 | 1104, 1105 |
| ⋮ | ⋮ | ⋮ |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| 601 | 11 | 1, 2 |
| 801 | 81 | 4354:3254, 2464, 2456, 4356:124, 535, 6 |
| 802 | 82 | 3254:1:4324:43143, 2342, 6543, 3245 |
| 803 | 83 | 5425:2:25432:34324:2:12453, 3424, 2343 |
| 804 | 84 | 5425:2:25432:4:5425:5:655:2435, 563 |
| 805 | 85 | 22414:3:4324231:5:43243:2:32144:455 |
| ⋮ | ⋮ | ⋮ |
| 1101 | 11 | 3, 5 |
| 1102 | 0 | NO |
| 1103 | 11 | 1, 2 |
| 1104 | 1 | 400 |
| 1105 | 1 | 100 |
| 2001 | 11 | 21, 22 |
| 2002 | 0 | NO |
| 2003 | 203 | Table Data |
| 2004 | 204 | Table Data |
| 2005 | 205 | Table Data |
| 2006 | 0 | YES |

FIG. 19

• REPRESENTS THE ATTRIBUTES THE PRINT MANAGER HAS.
• THE CLIENT ALREADY KNOWS WHAT THE ATTRIBUTE ID MEANS.
• ATTRIBUTE ID

| | |
|---|---|
| 10 | TaskType |
| 11 | Service ID |
| 100 | LIST OF ATTRIBUTE IDS |
| 101 | OPERATIONS SUPPORTED WITH JOB SCRIPT |
| 104 | ATTRIBUTES LIST WHICH ONLY ADMINISTRATOR CAN CHANGE |
| 401 | CURRENT COUNT DATA |
| 402 | COUNT DATA FORMAT |
| 403 | COUNT RESTRICTION DATA |
| 404 | COUNT UNIT PRICE DATA |
| 405 | CURRENT BILLING DATA |
| 406 | BILLING RESTRICTION DATA |
| 501 | LIST OF SUPPORTED EVENTS |
| 502 | EVENT SETTING TABLE |
| 601 | METHOD FOR DOWNLOADING LIST OF SUPPORTED EVENTS |
| 801 | LIST OF COMBINATION OF ATTRIBUTES FORBIDDEN TO SET (NO. 1 TYPE) |
| 802 | LIST OF COMBINATION OF ATTRIBUTES FORBIDDEN TO SET (NO. 2 TYPE) |
| 803 | LIST OF COMBINATION OF ATTRIBUTES FORBIDDEN TO SET (NO. 3 TYPE) |
| 804 | LIST OF COMBINATION OF ATTRIBUTES FORBIDDEN TO SET (NO. 4 TYPE) |
| 805 | LIST OF COMBINATION OF ATTRIBUTES FORBIDDEN TO SET (NO. 5 TYPE) |
| 1101 | LIST OF SUPPORTED PDLS |
| 1102 | WHETHER COLOR PRINTING IS AVAILABLE |
| 1103 | SUPPORTED TYPES OF FINISHING |
| 1104 | MAXIMUM SETTABLE RESOLUTION |
| 1105 | MINIMUM SETTABLE RESOLUTION |
| 2001 | LIST OF CONTROLLER IDS TO EXECUTE JOB |
| 2002 | WHETHER AUTOMATIC SELECTION OF CONTROLLER IS AVAILABLE |
| 2003 | JOB TABLE |
| 2004 | JOB REQUEST TABLE |
| 2005 | JOB SCHEDULE TABLE |
| 2006 | WHETHER JOB MANAGEMENT SETTING IS AVAILABLE |

• TYPE ID

| | |
|---|---|
| 0 | Boolean |
| 1 | INTEGER |
| 2 | REAL NUMBER |
| 3 | TEXT STRING |
| 11 | LIST OF INTEGERS |
| 12 | LIST OF REAL NUMBERS |
| 13 | LIST OF TEXT STRINGS |
| 52 | EVENT SETTING TABLE FORMAT |
| 81 | LIST OF FORBIDDEN ATTRIBUTES COMBINATION, NO. 1 FORMAT |
| 82 | LIST OF FORBIDDEN ATTRIBUTES COMBINATION, NO. 2 FORMAT |
| 83 | LIST OF FORBIDDEN ATTRIBUTES COMBINATION, NO. 3 FORMAT |
| 203 | JOB TABLE FORMAT |
| 204 | JOB REQUEST TABLE FORMAT |
| 205 | JOB SCHEDULE TABLE FORMAT |

FIG. 20

JOB TABLE

| 1501 Job ID | 1502 Job File Name | 1506 EXECUTION PRIORITY | 1507 SPECIFIED EXECUTION TIME | 1508 REMAINING LIMIT TIME |
|---|---|---|---|---|
| 1 | P0001 | 3 | 13 : 45 | 14 : 45 |
| 2 | P1002 | 3 | 13 : 45 | 14 : 45 |
| 3 | P2001 | 1 | – | – |
| | | | | |
| | | | | |
| | | | | |
| | | | | |

FIG. 21

JOB REQUEST TABLE

| 1503 Job ID | 1504 Control ID | 1505 Job ID |
|---|---|---|
| 1 | 21 | 100 |
| 1 | 22 | 101 |
| 2 | 21 | 102 |
| 2 | 22 | 403 |
| 3 | – | – |
| | | |
| | | |

FIG. 22

ATTRIBUTES TABLE (SCAN JOB MANAGER)

1601 1602 1603

| ATTRIBUTE ID | TYPE ID | VALUE |
|---|---|---|
| 10 | 1 | 2 |
| 11 | 1 | 10 |
| 100 | 11 | 10, 11, 100, 101, 104, 401, ··· |
| 101 | 11 | 21, 22, 25, 29 |
| 104 | 11 | 602 |
| ⋮ | ⋮ | ⋮ |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| 602 | 11 | 1, 2 |
| ⋮ | ⋮ | ⋮ |
| 1201 | 11 | 3, 5 |
| 1202 | 0 | YES |
| 1203 | 11 | 100, 200, 300, 400 |
| 2001 | 11 | 24 |
| 2002 | 0 | NO |
| 2003 | 203 | Table Data |

FIG. 23

- REPRESENTS THE ATTRIBUTES THE SCAN MANAGER HAS.
- THE CLIENT ALREADY KNOWS WHAT THE ATTRIBUTE ID MEANS.

- ATTRIBUTE ID

| | |
|---|---|
| 10 | TaskType |
| 11 | Service ID |
| 100 | LIST OF ATTRIBUTE IDS |
| 101 | OPERATIONS SUPPORTED WITH JOB SCRIPT |
| 104 | ATTRIBUTES LIST WHICH ONLY ADMINISTRATOR CAN CHANGE |
| 401 | CURRENT COUNT DATA |
| 402 | COUNT DATA FORMAT |
| 403 | COUNT RESTRICTION DATA |
| 404 | COUNT UNIT PRICE DATA |
| 405 | CURRENT BILLING DATA |
| 406 | BILLING RESTRICTION DATA |
| 501 | LIST OF SUPPORTED EVENTS |
| 502 | EVENT SETTING TABLE |
| 602 | METHOD FOR UPLOADING LIST OF SUPPORTED EVENTS |
| 1201 | LIST OF SUPPORTED IMAGE FORMATS |
| 1202 | WHETHER COLOR SCANNING IS AVAILABLE |
| 1203 | LIST OF RESOLUTIONS AVAILABLE FOR SETTING |
| 2001 | LIST OF CONTROLLER IDS TO EXECUTE JOB |
| 2002 | WHETHER AUTOMATIC SELECTION OF CONTROLLER IS AVAILABLE |
| 2003 | JOB TABLE |

- TYPE ID

| | |
|---|---|
| 0 | Boolean |
| 1 | INTEGER |
| 2 | REAL NUMBER |
| 3 | TEXT STRING |
| 11 | LIST OF INTEGERS |
| 12 | LIST OF REAL NUMBERS |
| 13 | LIST OF TEXT STRINGS |
| 52 | EVENT SETTING TABLE FORMAT |
| 203 | JOB TABLE FORMAT |

FIG. 24

ATTRIBUTES TABLE (SCAN JOB MANAGER)

1701 1702 1703

| ATTRIBUTE ID | TYPE ID | VALUE |
|---|---|---|
| 10 | 1 | 3 |
| 11 | 1 | 18 |
| 100 | 11 | 10, 11, 100, 101, 104, 401, ··· |
| 101 | 11 | 31, 32, 35 |
| 104 | 11 | 1304, 1305 |
| ⋮ | ⋮ | ⋮ |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| ⋮ | ⋮ | ⋮ |
| 1302 | 0 | NO |
| 1303 | 11 | 1, 2 |
| 1304 | 1 | 400 |
| 1305 | 1 | 100 |
| 2001 | 11 | 21, 22, 23, 24 |
| 2002 | 0 | YES |
| 2003 | 203 | Table Data |
| 2004 | 204 | Table Data |
| 2005 | 203 | Table Data |
| 2006 | 0 | YES |

FIG. 25

• REPRESENTS THE ATTRIBUTES THE COPY MANAGER HAS.
• THE CLIENT ALREADY KNOWS WHAT THE ATTRIBUTE ID MEANS.

• ATTRIBUTE ID

| | |
|---|---|
| 10 | TaskType |
| 11 | Service ID |
| 100 | LIST OF ATTRIBUTE IDS |
| 101 | OPERATIONS SUPPORTED WITH JOB SCRIPT |
| 104 | ATTRIBUTES LIST WHICH ONLY ADMINISTRATOR CAN CHANGE |
| 401 | CURRENT COUNT DATA |
| 402 | COUNT DATA FORMAT |
| 403 | COUNT RESTRICTION DATA |
| 404 | COUNT UNIT PRICE DATA |
| 405 | CURRENT BILLING DATA |
| 406 | BILLING RESTRICTION DATA |
| 501 | LIST OF SUPPORTED EVENTS |
| 502 | EVENT SETTING TABLE |
| 1302 | WHETHER COLOR PRINTING IS AVAILABLE |
| 1303 | SUPPORTED TYPES OF FINISHING |
| 1304 | MAXIMUM SETTABLE RESOLUTION |
| 1305 | MINIMUM SETTABLE RESOLUTION |
| 2001 | LIST OF CONTROLLER IDS TO EXECUTE JOB |
| 2002 | WHETHER AUTOMATIC SELECTION OF CONTROLLER IS AVAILABLE |
| 2003 | JOB TABLE |
| 2004 | JOB REQUEST TABLE |
| 2005 | JOB SCHEDULE TABLE |
| 2006 | WHETHER JOB MANAGEMENT SETTING IS AVAILABLE |

• TYPE ID

| | |
|---|---|
| 0 | Boolean |
| 1 | INTEGER |
| 2 | REAL NUMBER |
| 3 | TEXT STRING |
| 11 | LIST OF INTEGERS |
| 12 | LIST OF REAL NUMBERS |
| 13 | LIST OF TEXT STRINGS |
| 52 | EVENT SETTING TABLE FORMAT |
| 203 | JOB TABLE FORMAT |
| 204 | JOB REQUEST TABLE FORMAT |
| 205 | JOB SCHEDULE TABLE FORMAT |

FIG. 26

ATTRIBUTES TABLE (FONT JOB MANAGER)

1801 1802 1803

| ATTRIBUTE ID | TYPE ID | VALUE |
|---|---|---|
| 10 | 1 | 101 |
| 11 | 1 | 101 |
| 100 | 11 | 10, 11, 100, 101, 104, 401, ··· |
| 101 | 11 | 110, 111, 112 |
| 104 | 11 | |
| ⋮ | ⋮ | ⋮ |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| 601 | 11 | 1, 2 |
| 602 | 11 | 1, 2 |
| ⋮ | ⋮ | ⋮ |
| 1501 | 11 | 3, 5 |
| 1502 | 1 | 10 |
| 1503 | 1 | 3 |
| 1504 | 150 | Table Data |

FIG. 27

- REPRESENTS THE ATTRIBUTES THE FONT MANAGER HAS.
- THE CLIENT ALREADY KNOWS WHAT THE ATTRIBUTE ID MEANS.

- ATTRIBUTE ID

| | |
|---|---|
| 10 | TaskType |
| 11 | Service ID |
| 100 | LIST OF ATTRIBUTE IDS |
| 101 | OPERATIONS SUPPORTED WITH RESOURCE SCRIPT |
| 104 | ATTRIBUTES LIST WHICH ONLY ADMINISTRATOR CAN CHANGE |
| 401 | CURRENT COUNT DATA |
| 402 | COUNT DATA FORMAT |
| 403 | COUNT RESTRICTION DATA |
| 404 | COUNT UNIT PRICE DATA |
| 405 | CURRENT BILLING DATA |
| 406 | BILLING RESTRICTION DATA |
| 501 | LIST OF SUPPORTED EVENTS |
| 502 | EVENT SETTING TABLE |
| 601 | METHOD FOR DOWNLOADING SUPPORTED DATA |
| 602 | METHOD FOR UPLOADING SUPPORTED DATA |
| 1501 | LIST OF SUPPORTED FONT TYPES |
| 1502 | MAXIMUM NUMBER OF FONTS |
| 1503 | CURRENT NUMBER OF FONTS |
| 1504 | LIST OF FONTS HELD |

- TYPE ID

| | |
|---|---|
| 0 | Boolean |
| 1 | INTEGER |
| 2 | REAL NUMBER |
| 3 | TEXT STRING |
| 11 | LIST OF INTEGERS |
| 12 | LIST OF REAL NUMBERS |
| 13 | LIST OF TEXT STRINGS |
| 52 | EVENT SETTING TABLE FORMAT |
| 150 | FONT TABLE |

FIG. 28

FONT TABLE

| FONT ID (1901) | FONT TYPE (1902) | FONT NAME (1902) | FONT DATA FILE NAME (1903) |
|---|---|---|---|
| 1 | 1 | Gothic | 1500 |
| 2 | 2 | Times | 1501 |
| 3 | 1 | Helvetica | 1502 |
| | | | |
| | | | |
| | | | |
| | | | |
| | | | |
| | | | |

FIG. 29

ATTRIBUTES TABLE (FORM OVERLAY MANAGER)

2001 2002 2003

| ATTRIBUTE ID | TYPE ID | VALUE |
|---|---|---|
| 10 | 1 | 102 |
| 11 | 1 | 102 |
| 100 | 11 | 10, 11, 100, 101, 104, 401, ··· |
| 101 | 11 | 110, 111, 112, |
| 104 | 11 | |
| ⋮ | ⋮ | ⋮ |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| 601 | 11 | 1, 2 |
| 602 | 11 | 1, 2 |
| ⋮ | ⋮ | ⋮ |
| 1601 | 11 | 1, 2 |
| 1602 | 1 | 10 |
| 1603 | 1 | 3 |
| 1604 | 160 | Table Data |

FIG. 30

- REPRESENTS THE ATTRIBUTES THE FONT OVERLAY MANAGER HAS.
- THE CLIENT ALREADY KNOWS WHAT THE ATTRIBUTE ID MEANS.

- ATTRIBUTE ID

| | |
|---|---|
| 10 | TaskType |
| 11 | Service ID |
| 100 | LIST OF ATTRIBUTE IDS |
| 101 | OPERATIONS SUPPORTED WITH RESOURCE SCRIPT |
| 104 | ATTRIBUTES LIST WHICH ONLY ADMINISTRATOR CAN CHANGE |
| 401 | CURRENT COUNT DATA |
| 402 | COUNT DATA FORMAT |
| 403 | COUNT RESTRICTION DATA |
| 404 | COUNT UNIT PRICE DATA |
| 405 | CURRENT BILLING DATA |
| 406 | BILLING RESTRICTION DATA |
| 501 | LIST OF SUPPORTED EVENTS |
| 502 | EVENT SETTING TABLE |
| 601 | METHOD FOR DOWNLOADING SUPPORTED DATA |
| 602 | METHOD FOR UPLOADING SUPPORTED DATA |
| 1601 | LIST OF SUPPORTED FORMATS |
| 1602 | MAXIMUM NUMBER OF FORMS |
| 1603 | CURRENT NUMBER OF FORMS |
| 1604 | LIST OF FORMS HELD |

- TYPE ID

| | |
|---|---|
| 0 | Boolean |
| 1 | INTEGER |
| 2 | REAL NUMBER |
| 3 | TEXT STRING |
| 11 | LIST OF INTEGERS |
| 12 | LIST OF REAL NUMBERS |
| 13 | LIST OF TEXT STRINGS |
| 52 | EVENT SETTING TABLE FORMAT |
| 160 | FORM TABLE |

FIG. 31

FORM TABLE

| FORM ID (2101) | FORMAT (2102) | FORM NAME (2103) | FORM DATA FILE NAME (2104) |
|---|---|---|---|
| 1 | 1 | Confidential | 1600 |
| 2 | 2 | Reference | 1601 |
| 3 | 1 | Logo | 1602 |
| | | | |
| | | | |
| | | | |
| | | | |
| | | | |
| | | | |

FIG. 32

ATTRIBUTES TABLE (LOG MANAGER)

2201 2202 2203

| ATTRIBUTE ID | TYPE ID | VALUE |
|---|---|---|
| 10 | 1 | 103 |
| 11 | 1 | 103 |
| 100 | 11 | 10, 11, 100, 101, 104, 401, ··· |
| 101 | 11 | 110, 111, 112, |
| 104 | 11 | |
| | | |
| 401 | 11 | 45, 78, 34, 13 |
| 402 | 11 | 565, 537, 545, 523 |
| 403 | 11 | 100, 100, 100, 200, |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| 602 | 11 | 1, 2 |
| | | |
| 1703 | 1 | 3 |
| 1704 | 170 | Table Data |
| 1705 | 171 | Table Data |

FIG. 33

- REPRESENTS THE ATTRIBUTES THE LOG MANAGER HAS.
- THE CLIENT ALREADY KNOWS WHAT THE ATTRIBUTE ID MEANS.

- ATTRIBUTE ID

| | |
|---|---|
| 10 | TaskType |
| 11 | Service ID |
| 100 | LIST OF ATTRIBUTE IDS |
| 101 | OPERATIONS SUPPORTED WITH RESOURCE SCRIPT |
| 104 | ATTRIBUTES LIST WHICH ONLY ADMINISTRATOR CAN CHANGE |
| 401 | CURRENT COUNT DATA |
| 402 | COUNT DATA FORMAT |
| 403 | COUNT RESTRICTION DATA |
| 404 | COUNT UNIT PRICE DATA |
| 405 | CURRENT BILLING DATA |
| 406 | BILLING RESTRICTION DATA |
| 501 | LIST OF SUPPORTED EVENTS |
| 502 | EVENT SETTING TABLE |
| 602 | METHOD FOR UPLOADING SUPPORTED DATA |
| 1703 | NUMBER OF LOGS HELD |
| 1704 | LIST OF LOGS HELD |
| 1705 | LOG FORMAT TABLE |

- TYPE ID

| | |
|---|---|
| 0 | Boolean |
| 1 | INTEGER |
| 2 | REAL NUMBER |
| 3 | TEXT STRING |
| 11 | LIST OF INTEGERS |
| 12 | LIST OF REAL NUMBERS |
| 13 | LIST OF TEXT STRINGS |
| 52 | EVENT SETTING TABLE FORMAT |
| 170 | LOG TABLE |
| 171 | LOG FORMAT TABLE FORMAT |

FIG. 34

LOG TABLE 2301 2302

| LOG ID | LOG DATA FILE NAME |
|---|---|
| 1 | 1700 |
| 2 | 1701 |
| 3 | 1702 |
| | |
| | |
| | |
| | |
| | |
| | |

FIG. 35

CONTENTS OF LOG DATA (FILE NAME : 1700)

2401 2402 2403

| LOG FORMAT ID | DATA/TIME | VALUE |
|---|---|---|
| 1 | 98/1/3 1:23 | 12345, 4, 1.23, "OK" |
| 2 | 98/1/3 1:25 | 22345, 12, 4.22, "OK" |
| 1 | 98/1/3 1:43 | 98763, 11, 3.45, "Canceled" |
| 2 | 98/1/3 2:33 | 77623, 5, 1.44, "NG" |
| 1 | 98/1/3 3:32 | 12346, 5, 1.66, "OK" |

FIG. 36

LOG FORMAT TABLE 2501 2502

| LOG FORMAT ID | FORMAT |
|---|---|
| 1 | 1:701, 1:565, 1:765, 1:777 |
| 2 | 11:701, 11:565, 11:765, 11:777 |

FIG. 37

ATTRIBUTES TABLE (COLOR PROFILE MANAGER)

2601 2602 2603

| ATTRIBUTE ID | TYPE ID | VALUE |
|---|---|---|
| 10 | 1 | 104 |
| 11 | 1 | 104 |
| 100 | 11 | 10, 11, 100, 101, 104, 401, ··· |
| 101 | 11 | 110, 111, 112, |
| 104 | 11 | |
| | | |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| 601 | 11 | 1, 2 |
| 602 | 11 | 1, 2 |
| | | |
| 1801 | 11 | 3, 5 |
| 1802 | 1 | 10 |
| 1803 | 1 | 3 |
| 1804 | 180 | Table Data |

FIG. 38

- REPRESENTS THE ATTRIBUTES THE COLOR PROFILE MANAGER HAS.
- THE CLIENT ALREADY KNOWS WHAT THE ATTRIBUTE ID MEANS.

- ATTRIBUTE ID

| | |
|---|---|
| 10 | TaskType |
| 11 | Service ID |
| 100 | LIST OF ATTRIBUTE IDS |
| 101 | OPERATIONS SUPPORTED WITH RESOURCE SCRIPT |
| 104 | ATTRIBUTES LIST WHICH ONLY ADMINISTRATOR CAN CHANGE |
| 401 | CURRENT COUNT DATA |
| 402 | COUNT DATA FORMAT |
| 403 | COUNT RESTRICTION DATA |
| 404 | COUNT UNIT PRICE DATA |
| 405 | CURRENT BILLING DATA |
| 406 | BILLING RESTRICTION DATA |
| 501 | LIST OF SUPPORTED EVENTS |
| 502 | EVENT SETTING TABLE |
| 601 | METHOD FOR DOWNLOADING SUPPORTED DATA |
| 602 | METHOD FOR UPLOADING SUPPORTED DATA |
| 1801 | LIST OF SUPPORTED FORMATS |
| 1802 | MAXIMUM NUMBER OF PROFILES |
| 1803 | CURRENT NUMBER OF PROFILES |
| 1804 | LIST OF PROFILES HELD |

- TYPE ID

| | |
|---|---|
| 0 | Boolean |
| 1 | INTEGER |
| 2 | REAL NUMBER |
| 3 | TEXT STRING |
| 11 | LIST OF INTEGERS |
| 12 | LIST OF REAL NUMBERS |
| 13 | LIST OF TEXT STRINGS |
| 52 | EVENT SETTING TABLE FORMAT |
| 180 | PROFILE TABLE |

FIG. 39

COLOR PROFILE TABLE

| PROFILE ID (2701) | FORMAT (2702) | PROFILE DATA FILE NAME (2703) |
|---|---|---|
| 1 | 3 | 1800 |
| 2 | 5 | 1801 |
| 3 | 3 | 1802 |
| | | |
| | | |
| | | |
| | | |
| | | |
| | | |

FIG. 40

ATTRIBUTES TABLE (PRINTER CONTROLLER)

2801 2802 2803

| ATTRIBUTE ID | TYPE ID | VALUE |
|---|---|---|
| 12 | 1 | 1 |
| 13 | 1 | 21 |
| 100 | 11 | 12, 13, 104 ··· |
| 104 | 11 | |
| ⋮ | ⋮ | ⋮ |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| ⋮ | ⋮ | ⋮ |
| 5001 | 0 | NO |
| 5002 | 11 | 1, 2, 3 |
| 5003 | 1 | 1200 |
| 5004 | 1 | 100 |
| 5005 | 500 | Table Data |
| 5006 | 0 | 0 |
| 5007 | 501 | Table Data |
| 5008 | 501 | Table Data |

FIG. 41

- REPRESENTS THE ATTRIBUTES THE PRINTER CONTROLLER HAS.
- THE CLIENT ALREADY KNOWS WHAT THE ATTRIBUTE ID MEANS.

- ATTRIBUTE ID

| | |
|---|---|
| 12 | Controller Type |
| 13 | Controller ID |
| 100 | LIST OF ATTRIBUTE IDS |
| 104 | ATTRIBUTES LIST WHICH ONLY ADMINISTRATOR CAN CHANGE |
| 401 | CURRENT COUNT DATA |
| 402 | COUNT DATA FORMAT |
| 403 | COUNT RESTRICTION DATA |
| 404 | COUNT UNIT PRICE DATA |
| 405 | CURRENT BILLING DATA |
| 406 | BILLING RESTRICTION DATA |
| 501 | LIST OF SUPPORTED EVENTS |
| 502 | EVENT SETTING TABLE |
| 5001 | WHETHER COLOR PRINTING IS AVAILABLE |
| 5002 | SUPPORTED TYPES OF FINISHING |
| 5003 | MAXIMUM SETTABLE RESOLUTION |
| 5004 | MINIMUM SETTABLE RESOLUTION |
| 5005 | JOB QUEUE TABLE |
| 5006 | WHETHER INTERRUPTION JOB IS EXECUTING |
| 5007 | CONTEXT TABLE OF JOB EXECUTING |
| 5008 | CONTEXT TABLE OF JOB BEING INTERRUPTED |

- TYPE ID

| | |
|---|---|
| 0 | Boolean |
| 1 | INTEGER |
| 2 | REAL NUMBER |
| 3 | TEXT STRING |
| 11 | LIST OF INTEGERS |
| 12 | LIST OF REAL NUMBERS |
| 13 | LIST OF TEXT STRINGS |
| 52 | EVENT SETTING TABLE FORMAT |
| 500 | JOB QUEUE TABLE FORMAT |

FIG. 42

JOB QUEUE TABLE 2901 2902 2903

| JOB ID | STATUS | FILE NAME |
|---|---|---|
| 100 | 1 | C100 |
| 101 | 2 | C101 |
| 102 | 3 | C102 |
| 103 | 3 | C103 |
| 104 | 3 | C104 |
| 105 | 4 | C105 |
| | | |

FIG. 43

- LIST OF JOBS BEING EXECUTED BY PRINTER CONTROLLER AND JOBS WAITING FOR EXECUTION
- MEANING OF STATUS
  - 1 : EXECUTION COMPLETED
  - 2 : EXECUTING WITH ENGINE
  - 3 : WAITING FOR EXECUTION
  - 4 : EXECUTION SUSPENDED

FIG. 44

ATTRIBUTES TABLE (SCANNER CONTROLLER)

3001 3002 3003

| ATTRIBUTE ID | TYPE ID | VALUE |
|---|---|---|
| 12 | 1 | 2 |
| 13 | 1 | 24 |
| 100 | 11 | 12, 13, 104, ··· |
| 104 | 11 | |
| ⋮ | ⋮ | ⋮ |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| ⋮ | ⋮ | ⋮ |
| 6001 | 0 | YES |
| 6002 | 12 | 200.00, 300.00 |
| 6003 | 1 | 1200 |
| 6004 | 1 | 100 |

FIG. 45

• REPRESENTS THE ATTRIBUTES THE SCANNER CONTROLLER HAS.
• THE CLIENT ALREADY KNOWS WHAT THE ATTRIBUTE ID MEANS.

• ATTRIBUTE ID

| | |
|---|---|
| 12 | Controller Type |
| 13 | Controller ID |
| 100 | LIST OF ATTRIBUTE IDS |
| 104 | ATTRIBUTES LIST WHICH ONLY ADMINISTRATOR CAN CHANGE |
| 401 | CURRENT COUNT DATA |
| 402 | COUNT DATA FORMAT |
| 403 | COUNT RESTRICTION DATA |
| 404 | COUNT UNIT PRICE DATA |
| 405 | CURRENT BILLING DATA |
| 406 | BILLING RESTRICTION DATA |
| 501 | LIST OF SUPPORTED EVENTS |
| 502 | EVENT SETTING TABLE |
| 6001 | WHETHER COLOR SCANNING IS AVAILABLE |
| 6002 | MAXIMUM ORIGINAL SIZE |
| 6003 | MAXIMUM SETTABLE RESOLUTION |
| 6004 | MINIMUM SETTABLE RESOLUTION |

• TYPE ID

| | |
|---|---|
| 0 | Boolean |
| 1 | INTEGER |
| 2 | REAL NUMBER |
| 3 | TEXT STRING |
| 11 | LIST OF INTEGERS |
| 12 | LIST OF REAL NUMBERS |
| 13 | LIST OF TEXT STRINGS |
| 52 | EVENT SETTING TABLE FORMAT |

STRUCTURE OF COMMAND PACKET

FLOW OF COMMAND PACKETS

ACCESS PROCESS FLOW FOR ATTRIBUTES TABLE

INQUIRY PROCESS FOR SERVICE ID LIST

INQUIRY PROCESS FOR SUB-ADDRESS

INQUIRY PROCESS FOR SERVICE ID WITH SPECIFIED TASK TYPE

JOB SCRIPT PROCESSING AT EACH MANAGER

JOB SCRIPT PROCESSING AT EACH MANAGER (CONTINUED)

JOB PROCESSING AT PRINT JOB MANAGER
(FROM DATA RECEPTION TO REGISTRATION OF JOB SCHEDULING TABLE)

JOB PROCESSING AT COPY JOB MANAGER

JOB PROCESSING AT FONT MANAGER, FORMOVERLAY MANAGER, LOG MANAGER, AND COLOR PROFILE MANAGER

JOB PROCESSING AT FONT MANAGER, FORM OVERLAY MANAGER, LOG MANAGER, AND COLOR PROFILE MANAGER (UPLOAD)

SENDING EVENT

SENDING OF DATA (SCRIPT) FROM DEVICE

PACKET GENETATING/SENDING PROCESSING

INFORMATION OBTAINING AND AUTOMATIC SOFTWARE CONFIGURATION AT THE CLIENT SIDE

ISSUING JOB WITH TASK TYPE SPECIFIED

EVENT STRUCTURE

EVENT PROCESSING

OBTAINING AND PROCESSING BILLING INFORMATION

ISSUING JOB (PRINT JOB, DATA DOWNLOAD)

ISSUING JOB (PRINT JOB, DATA DOWNLOAD)

| FIG. 73A |
| --- |
| FIG. 73B |

ISSUING JOB (PRINT JOB, DATA DOWNLOAD)

ISSUING COPY JOB

ISSUING JOB MANAGEMENT COMMAND

FIG. 76

| |
|---|
| DISK315 |
| UI Driver401 |
| Network Interface Driver402 |
| IEEE1284 Interface Driver403 |
| IEEE1394 Interface Driver404 |
| User Interface Manager405 |
| TCP/IP, UDP/IP Module406 |
| IEEE1284.4 Module407 |
| SBB-2 Module408 |
| Interpreter/Generator409 |
| Supervisor410 |
| Security Gate411 |
| Dispatcher412 |
| Font Manager413 |
| Form Overlay Manager414 |
| Log Manager415 |
| Color Profile Manager416 |
| PDL (PS) Rasterizer417 |
| PDL (PCL) Rasterizer418 |
| Scan Job Manager419 |
| Scan Controler420 |
| Print Job Manager501 |
| Print Job Manager502 |
| Print Job Manager503 |
| Print Job Manager504 |
| Print Job Manager505 |
| Print Job Manager506 |
| Print Job Manager507 |
| Print Job Manager508 |
| Print Job Manager509 |
| LBP Controler510 |
| LBP Controler511 |
| Inkjet Controler512 |
| Copy Job Manager601 |
| Copy Job Manager602 |
| Copy Job Manager603 |
| Copy Job Manager604 |
| Copy Job Manager605 |
| Copy Job Manager606 |
| Copy Job Manager607 |
| Copy Job Manager608 |
| PROCESSING PROGRAM SHOWN IN FIG. 47 |
| PROCESSING PROGRAM SHOWN IN FIG. 48 |
| PROCESSING PROGRAM SHOWN IN FIG. 49 |
| PROCESSING PROGRAM SHOWN IN FIG. 50 |
| PROCESSING PROGRAM SHOWN IN FIG. 51 |
| PROCESSING PROGRAM SHOWN IN FIG. 53 |
| PROCESSING PROGRAM SHOWN IN FIG. 54 |
| PROCESSING PROGRAM SHOWN IN FIG. 55 |
| PROCESSING PROGRAM SHOWN IN FIG. 56 |
| PROCESSING PROGRAM SHOWN IN FIG. 57 |
| PROCESSING PROGRAM SHOWN IN FIG. 58 |
| PROCESSING PROGRAM SHOWN IN FIG. 59 |
| PROCESSING PROGRAM SHOWN IN FIG. 60 |
| PROCESSING PROGRAM SHOWN IN FIG. 61 |
| PROCESSING PROGRAM SHOWN IN FIG. 62 |

| |
|---|
| PROCESSING PROGRAM SHOWN IN FIGS. 86, 87, 88 |
| PROCESSING PROGRAM SHOWN IN FIG. 89 |
| PROCESSING PROGRAM SHOWN IN FIG. 90 |
| PROCESSING PROGRAM SHOWN IN FIG. 91 |
| PROCESSING PROGRAM SHOWN IN FIG. 92 |
| PROCESSING PROGRAM SHOWN IN FIGS. 93, 94, 95 |
| OTHER PROGRAMS AND VARIOUS DATA |

FIG. 77

| |
|---|
| DISK6009 |
| STIPULATED INFORMATION DATABASE 504 |
| DEVICE INFORMATION DATABADE 502 |
| USER INTERFACE PROGRAM 501 |
| DEVICE INFORMATION OBTAINING PROGRAM 503 |
| Printer Driver505 |
| Scanner Driver506 |
| Copy Driver507 |
| FONT MANAGING UTILITY 508 |
| FORM MANAGING UTILITY 509 |
| LOG MANAGING UTILITY 510 |
| COLOR PROFILE MANAGING UTILITY 511 |
| JOB MANAGING UTILITY 512 |
| DEVICE MANAGING UTILITY 513 |
| BILLING MANAGING UTILITY 514 |
| Interpreter/Generator515 |
| SBB-2 Module517 |
| IEEE1394 Interface Driver518 |
| TCP/IP, UDP/IP Module519 |
| Network Interface Driver520 |
| IEEE1284.4 Module521 |
| IEEE1284.4 Interface Driver522 |
| PROGRAM SHOWN IN FIG. 65 |
| PROGRAM SHOWN IN FIG. 66 |
| PROGRAM SHOWN IN FIG. 67 |
| PROGRAM SHOWN IN FIG. 69 |
| PROGRAM SHOWN IN FIG. 70 |
| PROGRAM SHOWN IN FIG. 71 |
| PROGRAM SHOWN IN FIG. 72 |
| PROGRAM SHOWN IN FIG. 73 |
| PROGRAM SHOWN IN FIG. 74 |
| PROGRAM SHOWN IN FIG. 75 |
| Operation System |
| DOCUMENT EDITING PROGRAM |
| OTHER PROGRAMS AND VARIOUS DATA |

FIG. 81

PRINTER DRIVER A

| | |
|---|---|
| SUPPORTED PDLS | : PDL1, PDL2 |
| COLOR PRINTING | : NOT AVAILABLE |
| MAXIMUM SETTABLE RESOLUTION | : 1200 dpi |
| MINIMUM SETTABLE RESOLUTION | : 600 dpi |

FIG. 82

PRINTER DRIVER B

| | |
|---|---|
| SUPPORTED PDLS | : PDL3 |
| COLOR PRINTING | : AVAILABLE |
| MAXIMUM SETTABLE RESOLUTION | : 600 dpi |
| MINIMUM SETTABLE RESOLUTION | : 300 dpi |

FIG. 83

JOB SCHEDULING TABLE

| | | | | | | |
|---|---|---|---|---|---|---|
| 1551 | JOB ID WITH PRIORITY 1 | 5 | 7 | 8 | | |
| 1552 | JOB ID WITH PRIORITY 2 | 2 | 3 | 4 | | |
| 1553 | JOB ID WITH PRIORITY 3 | 1 | 6 | | | |

FIG. 84

EXECUTE-BY-TIME JOB QUEUE TABLE

| SPECIFIED EXECUTION TIME (1561) | JobID (1562) |
|---|---|
| 13 : 45 | 13 |
| 14 : 00 | 12 |
| 14 : 30 | 15 |
| | |
| | |
| | |
| | |
| | |

FIG. 85

JOB CONTEXT TABLE

| | |
|---|---|
| JobID | 1563 |
| FILE POINTER FOR JOB FILE | 1564 |
| NUMBER OF COPIES REMAINING | 1565 |
| FINISHER BIN ID | 1566 |

JOB PROCESSING WITH PRINT JOB MANAGER
(REGISTRATION FROM EXECUTE-BY-TIME JOB QUEUE TABLE TO JOB SCHEDULING TABLE)

JOB PROCESSING AT PRINT JOB MANAGER
(FROM JOB SCHEDULING TABLE TO COMPLETION OF EXECUTION)

JOB PROCESSING AT PRINT JOB MANAGER
(DELET JOBS WITH REMAINING TIME LIMIT SPECIFICATION)

| FIG. 89A |
| --- |
| FIG. 89B |

JOB PROCESSING WITH INTERRUPTION PRINT JOB MANAGER

JOB PROCESSING WITH INTERRUPTION COPY JOB MANAGER

| FIG. 91A |
| --- |
| FIG. 91B |

JOB PROCESSING WITH INTERRUPTION COPY JOB MANAGER

JOB PROCESSING WITH MANAGERS
(JOB DELETION PROCESSING)

JOB MANAGEMENT
(JOB PRIORITY CHANGING PROCESS)

JOB MANAGEMENT
(EXECUTION TIME CHANGING PROCESSING)

JOB MANAGEMENT
(REMAINING TIME LIMIT CHANGING PROCESSING)

PERIPHERAL DEVICE, PERIPHERAL DEVICE CONTROL METHOD, PERIPHERAL DEVICE CONTROL SYSTEM, STORAGE MEDIUM FOR STORING PERIPHERAL DEVICE CONTROL PROGRAMS, SENDING DEVICE FOR SENDING PERIPHERAL DEVICE CONTROL PROGRAMS, AND PERIPHERAL DEVICE CONTROL PROGRAM PRODUCT

BACKGROUND OF THE INVENTION

1. Field of the Invention

The present invention relates to a peripheral device such as a printer, scanner, facsimile, photocopier, etc., controlled by an information processing device via a connection from such as a network, IEEE 1394, etc., and to a peripheral device control method, peripheral device control system, storage medium for storing peripheral device control programs, sending device for sending peripheral device control programs, and peripheral device control program product.

2. Description of the Related Art

In the event that a job is submitted from a host computer (information processing device) to a printer, scanner, facsimile, photocopier, etc., connected to a network or the like, devices having a large-capacity storage device have come to be able to internally store a great number of jobs in a simultaneous manner. Normally, jobs are processes according to the First-In First-Serve (FIFS) method, based on the order of the jobs being submitted.

SUMMARY OF THE INVENTION

With conventional peripheral devices, particularly with multi-functional peripheral devices such as arrangements wherein printer, scanner, facsimile, and photocopier functions are provided within a single housing, control of interruption jobs has not been achieved.

It is an object of the present invention to provide a user-friendly multifunctional peripheral device, peripheral device control method, peripheral device control system, and storage medium for storing peripheral device control programs.

The peripheral device according to the present invention for achieving the above object is a peripheral device connected to an information processing device, the peripheral device comprising: software, such as a plurality of device control programs, for maintaining the functions of a plurality of device engines of the peripheral device and for managing jobs with the device engines; and control means for selecting and executing a device control program other than the device control program currently executing, in the event that an interruption job is input from the information processing device during the processing of a job by executing one of the plurality of device control programs.

The peripheral device control method according to the present invention for achieving the above object is a peripheral device control method for a peripheral device connected to an information processing device, wherein, in the event that an interruption job is input from an information processing device during the processing of a job by executing one of a plurality of device control programs for maintaining the functions of a plurality of device engines of the peripheral device and for managing jobs with the device engines, a device control program other than the device control program currently executing is selected and executed.

The storage medium according to the present invention for achieving the above object is a storage medium storing a peripheral device control program executed by a peripheral device connected to an information processing device, the storage medium storing a peripheral device control program, which, in the event that an interruption job is input from an information processing device during the processing of a job by executing one of a plurality of device control programs for maintaining the functions of a plurality of device engines of the peripheral device and for managing jobs with the device engines, selects and executes a device control program other than the device control program currently executing.

The peripheral device control system according to the present invention for achieving the above object is a peripheral device control system consisting of an information processing device and a peripheral device, the peripheral device control system comprising: an output means for outputting jobs to the peripheral device; a plurality of device control programs for maintaining the functions of a plurality of device engines of the peripheral device and for managing jobs with the device engines; and control means for selecting and executing a device control program other than the device control program currently executing, in the event that an interruption job is output to the information processing device from the output means during the processing of a job by executing one of the plurality of device control programs.

The sending device according to the present invention for achieving the above object is a sending device for sending device control programs executed by a peripheral device connected to an information processing device, wherein, in the event that an interruption job is input from the information processing device during the processing of a job by executing one of a plurality of peripheral device control programs for maintaining the functions of a plurality of device engines of the peripheral device and for managing jobs with the device engines, the sending device sends a peripheral device control program which selects and executes a device control program other than the device control program currently executing.

The peripheral device control program product according to the present invention for achieving the above object is a peripheral device control program product executed by a peripheral device connected to an information processing device, wherein, in the event that an interruption job is input from an information processing device during the processing of a job by executing one of a plurality of device control programs for maintaining the functions of a plurality of device engines of the peripheral device and for managing jobs with the device engines, a device control program other than the device control program currently executing is selected and executed.

Accordingly, with a peripheral device connected to an information processing device, in the event that an interruption job is input from an information processing device during the processing of a job by executing one of a plurality of device control programs for maintaining the functions of a plurality of device engines of the peripheral device and for managing jobs with the device engines, a device control program other than the device control program currently executing can be selected and executed.

Also, a device control program may save the executing context of the job being executed at the time that the interruption job was input, and restore the saved job execution context upon completion of the interruption job execution.

Also, multiple input of other interruption jobs may be prevented during execution of an interruption job.

Also, in the event that an interruption copy job is input, an arbitrary printer control program for maintaining the functions of the printer engine of the peripheral device and for managing the job at the printer engine may be selected, following the job being provided to a scanner control program for maintaining the functions of the scanner engine of the peripheral device and for managing the job at the scanner engine.

Also, a list of identification information such as icons corresponding to the device control programs for the peripheral device is displayed on the display device of the information processing device, and the user can issue an interruption job by selecting one of these. Included in the icons displayed in the list are icons corresponding to the device control program to be selected and executed in the event that an interruption job is issued, and the user issues an interruption job by selecting one of these icons. Further, the user can tell which interruption jobs can be issued by viewing the information relating to the device control programs.

BRIEF DESCRIPTION OF THE DRAWINGS

FIG. 7 is a diagram illustrating the attributes table of the supervisor 410 shown in FIG. 4;

FIG. 8 is a diagram illustrating the meaning of the attributes ID and type ID of the attributes table shown in FIG. 7;

FIG. 9 is a diagram illustrating a sub-address/service ID correlation table;

FIG. 10 is a diagram illustrating the meaning of the connection format ID shown in FIG. 9;

FIG. 11 is a diagram illustrating a sub-address/task type correlation table;

FIG. 12 is a diagram illustrating the meaning of the task type ID shown in FIG. 11;

FIG. 13 is a diagram illustrating a user verification table;

FIG. 14 is a diagram illustrating an access control table;

FIG. 15 is a diagram illustrating security level;

FIG. 16 is a diagram illustrating an event setting table;

FIG. 17 is a diagram illustrating an event format table;

FIG. 18 is a diagram illustrating an attributes table for a print manager;

FIG. 19 is a diagram illustrating the meaning of the attributes ID and type ID in the attributes table shown in FIG. 18;

FIG. 20 is a diagram illustrating a job table;

FIG. 21 is a diagram illustrating a job request table;

FIG. 22 is a diagram illustrating an attributes table for a scan job manager;

FIG. 23 is a diagram illustrating the meaning of the attributes ID and type ID in the attributes table shown in FIG. 22;

FIG. 24 is a diagram illustrating an attributes table for a copy job manager;

FIG. 25 is a diagram illustrating the meaning of the attributes ID and type ID in the attributes table shown in FIG. 24;

FIG. 26 is a diagram illustrating an attributes table for a font manager;

FIG. 27 is a diagram illustrating the meaning of the attributes ID and type ID in the attributes table shown in FIG. 26;

FIG. 28 is a diagram illustrating a font table;

FIG. 29 is a diagram illustrating an attributes table for a form overlay manager;

FIG. 30 is a diagram illustrating the meaning of the attributes ID and type ID in the attributes table shown in FIG. 29;

FIG. 31 is a diagram illustrating a form overlay table;

FIG. 32 is a diagram illustrating an attributes table for a log manager;

FIG. 33 is a diagram illustrating the meaning of the attributes ID and type ID in the attributes table shown in FIG. 32;

FIG. 34 is a diagram illustrating a log table;

FIG. 35 is a diagram illustrating the contents of the log data;

FIG. 36 is a diagram illustrating a log format table;

FIG. 37 is a diagram illustrating an attributes table for a color profile manager;

FIG. 38 is a diagram illustrating the meaning of the attributes ID and type ID in the attributes table shown in FIG. 37;

FIG. 39 is a diagram illustrating a color profile table;

FIG. 40 is a diagram illustrating an attributes table for a printer controller;

FIG. 41 is a diagram illustrating the meaning of the attributes ID and type ID in the attributes table shown in FIG. 40;

FIG. 42 is a diagram illustrating a job queue table;

FIG. 43 is a diagram illustrating the status in FIG. 42;

FIG. 44 is a diagram illustrating an attributes table for a scanner controller;

FIG. 45 is a diagram illustrating the meaning of the attributes ID and type ID in the attributes table shown in FIG. 44;

FIG. 76 is a memory map of the disk 315 of the MFP;

FIG. 77 is a memory map of the disk 6009 of the Client PC;

FIG. 81 is a diagram illustrating a sample display screen displayed on the display;

FIG. 82 is another diagram illustrating a sample display screen displayed on the display;

FIG. 83 is a diagram illustrating a job scheduling table;

FIG. 84 is a diagram illustrating an execute-by-time job queue table;

FIG. 85 is a diagram illustrating a job context table;

DETAILED DESCRIPTION OF THE PREFERRED EMBODIMENTS (Configuration of Multi-functional Peripheral Device)

Figure 1:
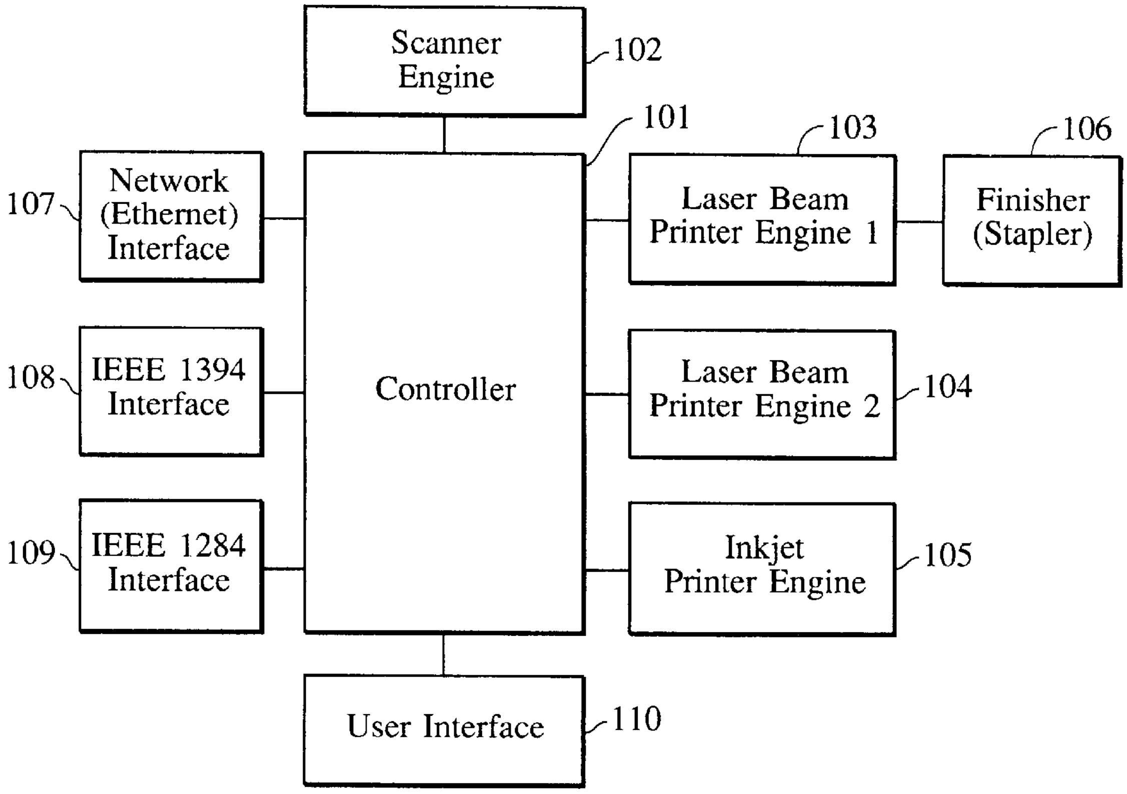
FIG. 1 is a diagram showing the configuration of a multi-functional peripheral device (MFP) illustrating a first embodiment of the present invention.

FIG. 1 is a diagram showing the configuration of a multi-functional peripheral device (MFP) illustrating an embodiment of the present invention.

Figure 3:
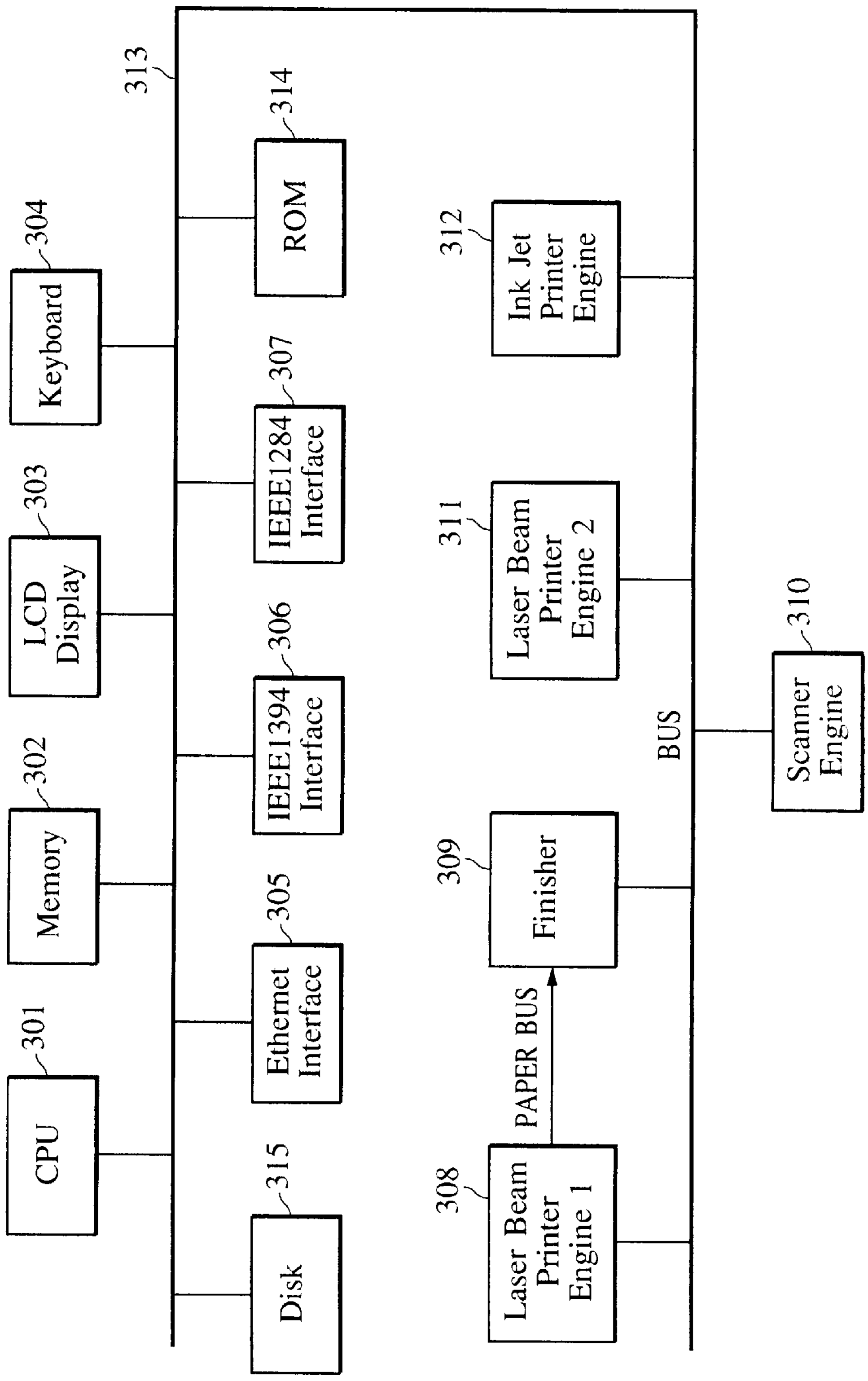
FIG. 3 is a diagram illustrating the hardware configuration of the controller of the MFP shown in FIG. 1.

In FIG. 1, reference numeral 101 denotes a controller for controlling the multi-functional peripheral device, having the hardware configuration shown in FIG. 3 and having a software (control program) configuration such as that shown in FIG. 76 with the disk 315 (see FIG. 3) serving as a storage medium. Reference numeral 102 denotes a scanner engine which is controlled by the controller 101. Reference numerals 103 and 104 denote laser beam printer engines (LBP) 1 and 2, which are controlled by the controller 101. The laser beam printer engine 1 denoted by 103 is connected to a finisher 106, and is capable of grouping multiple pieces of a recording medium (e.g., paper) output from the printer engine, and stapling these. The finisher 106 also is controlled by the controller 101. Reference numeral 105 denotes an ink-jet printer engine (IJP) capable of color printer, and is controlled by the controller 101. Reference numeral 107 denotes a network (Ethernet) interface, providing interactive communication with the controller 101 via this interface. Reference numeral 108 denotes an IEEE 1394 interface, providing interactive communication with the controller 101 via this interface. Reference numeral 109 denotes an IEEE 1284 interface, providing interactive communication with the controller 101 via this interface. Reference numeral 110 denotes a user interface, comprised of an LCD display and a keyboard, for displaying information from the controller 101 and transmitting instruction from the user to the controller 101.

With the multi-functional peripheral device having the configuration such as described above, three physical printers LBP 103 (B/W, with finisher), LBP 104 (B/W), and IJP 105 (color) can be selected from to issue a print job. Also, four logical printers (cluster) LBP 103+LBP 104, LBP

104+IJP 105, LBP 103+IJP 105, and LBP 103+LBP 104+IJP 105, can be selected from to issue a print job. Also, automatic selection from the above seven printers LBP 103, LBP 104, IJP 105, LBP 103+LBP 104, LBP 104+IJP 105, LBP 103+IJP 105, and LBP 103+LBP 104+IJP 105, can be selected from to issue a print job. Further, the IJP can be used to configure a logical printer capable only of B/W printing, to issue a print job.

Also, external scan job issuing can be made, enabling reading of color originals. Also, selection (including automatic selection) from the scanner and the above eight printers LBP 103, LBP 104, IJP 105, LBP 103+LBP 104, LBP 104+IJP 105, LBP 103+IJP 105, LBP 103+LBP 104+IJP 105, and the IJP capable only of printing B/W, can be selected from to issue a print job. Further, in the event that the only printer is the IJP, color copy jobs can be issued.

Also, fonts and form overlay can be used for print jobs, uploads and downloads can be performed, and resource management can be conducted. Also, color profiles can be used for print jobs, scan jobs, and copy jobs, uploads and downloads can be performed, and resource management can be conducted. Further, automatic generation of logs can be performed within the equipment, and uploads can be performed.

Also, all functions can be used from any of the following interfaces: network (Ethernet, TCP/IP), IEEE 1284, IEEE 1394. Also, correlation is made between sub-addresses and physical/logical devices (printer, scanner, copy) and resources, for each interface, thereby enabling the physical/logical devices and resources to be selected by selecting sub-addresses. Jobs can be issued and downloads/uploads can be instructed simultaneously to the sub-addresses of each of the interfaces. Also, correlation between the sub-addresses, physical/logical devices and resources is made by inquiring at the equipment itself. Further, the function can be used from internal user interfaces.

Also, by means of externally inquiring of the below-described supervisor via the above interfaces, an overview of provided functions (what sort of jobs can be issued, what sort of resources can be used), sub-addresses used for issuing jobs and uploading/downloading resource, detailed information of various functions (maximum number of copies, PDLs supporting finisher types, number of output BIN that can be specified, and so forth), can be obtained. Using the above information, the client side can automatically configure software (control program). However, the client needs to know beforehand the sub-addresses used for this inquiry, at each interface. The administrator can restrict the above functions by connection form and user.

(Overall System Configuration)

Figure 2:
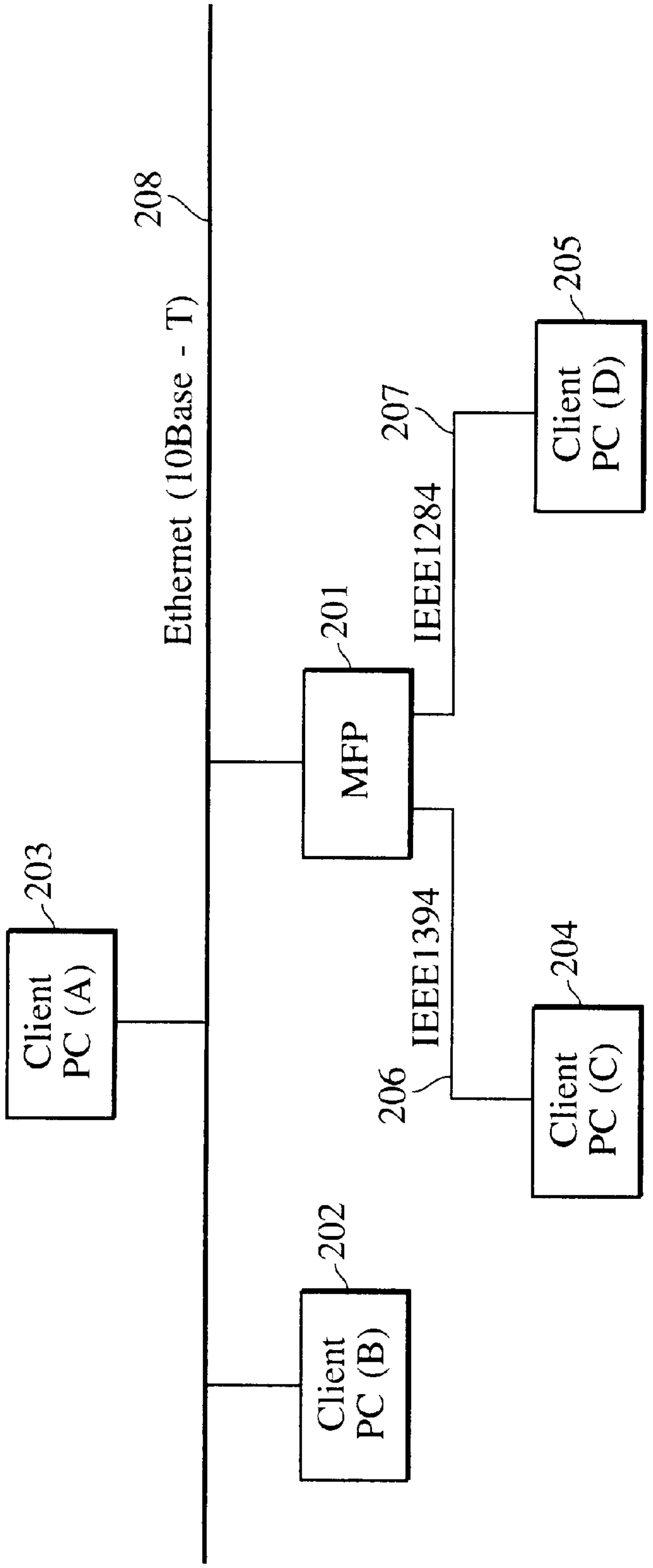
FIG. 2 is a diagram illustrating the system configuration of a first embodiment of the present invention.

FIG. 2 is a diagram illustrating the system configuration of the present embodiment. In FIG. 2, reference numeral 201 denotes the multi-functional peripheral device (MFP) shown in FIG. 1, with the multi-functional peripheral device 201 being connected to client PCs 202, 203, 204, and 205 (i.e., information processing devices), by a network interface cable 208 (10-BASE-T), IEEE 1394 interface cable 207, and IEEE 1284 interface cable 206.

Figure 78:
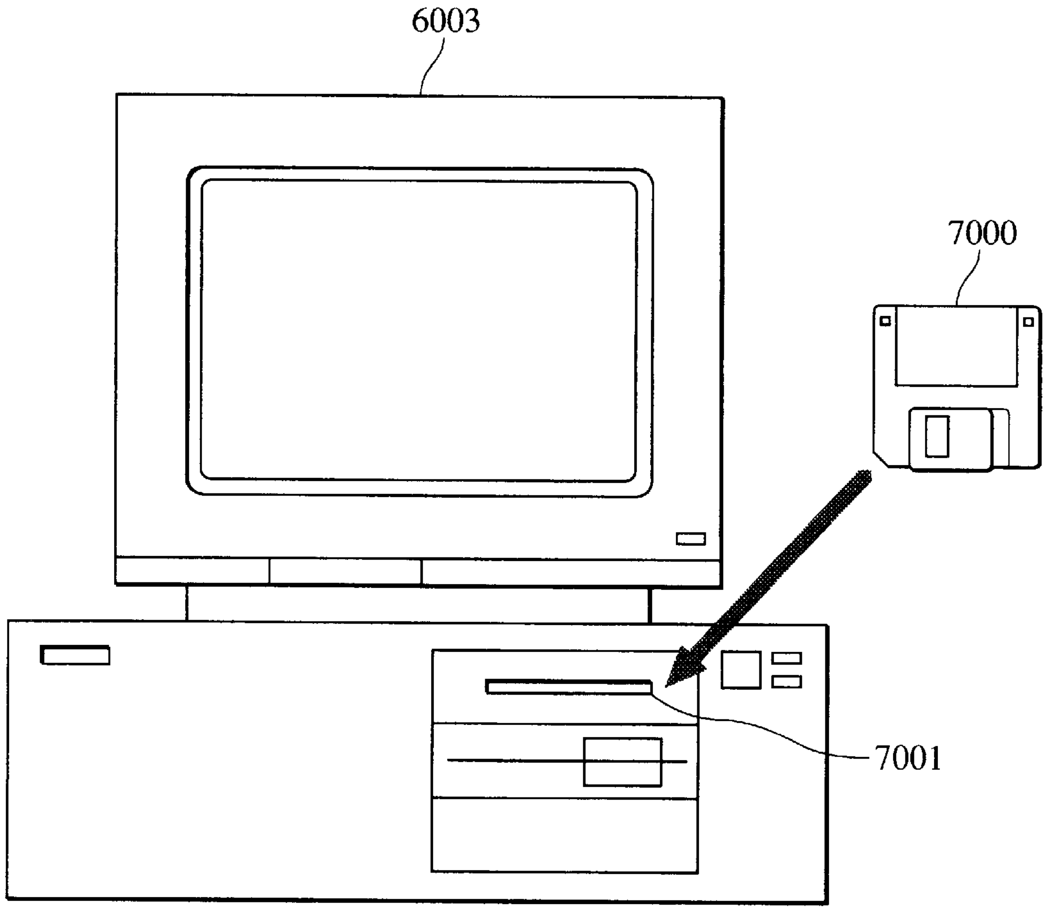
FIG. 78 is a diagram illustrating the configuration of the Client PC.

With the client PCs such as shown in FIG. 78, software (control programs) stored in the below-described disk 6009 shown in FIG. 77 serving as a storage medium is running. The client PCs 202 and 203 connected to the Ethernet 208 specify IP address and port No. to connect to the multi-functional peripheral device 201, and output IP packet data. The client PC 204 connected to the IEEE 1394 interface cable 206 specifies node ID and LUN (logical unit number) to connect to the multi-functional peripheral device 201, and output SBP-2 packet data. The client PC 205 connected to the IEEE 1284 interface cable 207 specifies socket No. to connect to the multi-functional peripheral device 201, and output IEEE 1284.4 packet data.

(Hardware Configuration of Controller)

FIG. 3 is a diagram illustrating the hardware configuration of the controller 101 according to the present embodiment shown in FIG. 1. Inside the controller 101, the CPU 301 is connected with the memory (RAM) 302, an LCD display 303 and keyboard 304 making up the user interface (operating unit) 110 (see FIG. 1), ROM 314, and a disk 315 via a bus 313. The programs and data shown in FIG. 76 are stored in the disk 315 (storage medium), which is a hard disk, floppy disk, or the like, and are sequentially read out to the memory (RAM) 302 as necessary, and are executed by the CPU 301. This disk 315 may either be detachable from the MFP 201 or built into the MFP 201. Further, the configuration may be such that the programs shown in FIG. 76 are downloaded from the client PCs 202, 203, 204, and 205 or other MFPs via the network interface cable 208 (10-BASE-T), IEEE 1394 interface cable 207, and/or IEEE 1284 interface cable 206, and stored in the disk 315.

The LCD display 303 and keyboard 304 make up the user interface (operating unit) 110 shown in FIG. 1, wherein the CPU 301 writes data to the LCD display 303 to make a display thereof, and the CPU 301 reads data from the keyboard 304 to input instructions from the user.

Also, a network interface connector 305, IEEE 1394 interface connector 306, and IEEE 1284 interface connector 307 are connected to the bus 313, each corresponding to the network interface 107, IEEE 1394 interface 108, and IEEE 1284 interface 109 shown in FIG. 1, to which the Ethernet (10 BASE-T) cable 208, IEEE 1394 interface cable 206, and IEEE 1284 interface cable 207, shown in FIG. 2, are connected. The CPU 301 performs communication using each of the interfaces by reading or writing data from or to each.

Further, connected to the bus 313 are: the laser beam printer engine 308, finisher 309, scanner engine 310, laser beam printer engine 311, and ink-jet printer engine 312, these corresponding with the laser beam printer engine 103, finisher 106, scanner engine 102, laser beam printer engine 104, and ink-jet printer engine 105 shown in FIG. 1, and the CPU 301 performs engine operation such as printing and scanning, and obtains status, by reading and writing data from and to these engines. Incidentally, the laser beam printer engine 308, finisher 309, scanner engine 310, laser beam printer engine 311, and ink-jet printer engine 312 may exist as individual stand-alone peripheral devices on the network instead of inside the MFP 201, and be controlled by the controller 101 of the MFP 201.

(Software Configuration of Controller 101)

Figure 4:
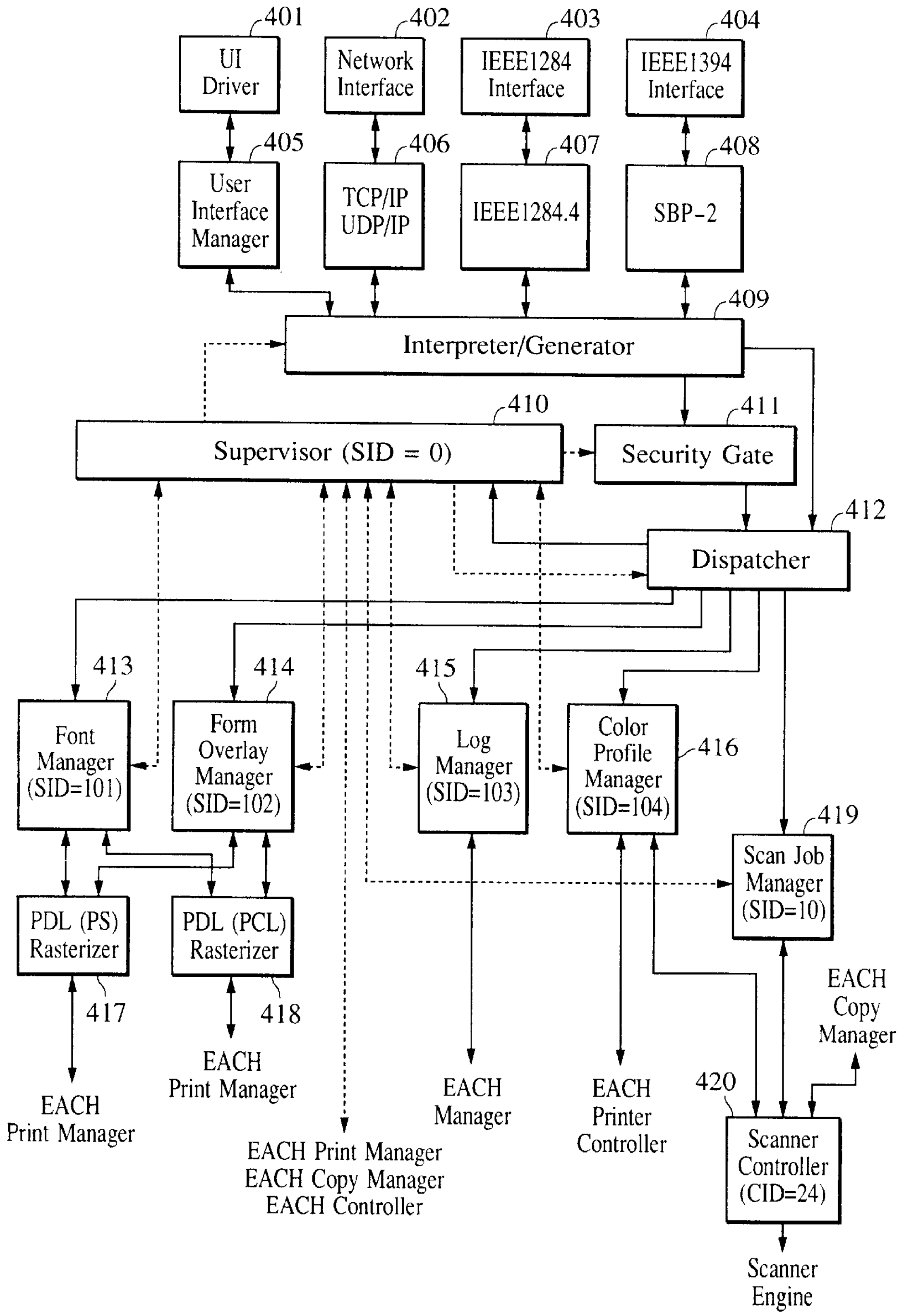
FIG. 4 is a diagram illustrating the software configuration of the controller of the MFP shown in FIG. 1.

FIG. 4 is a diagram illustrating the configuration of the software (control program) on the disk 315 within the controller 101, this software (control program) being executed by the CPU 301. In this Figure, the solid lines represent data and control, and the dotted lines represent obtaining of settings and functions. Reference numeral 401 denotes a user interface driver, performing control of the LCD display 303 and the keyboard 304. Reference numeral 405 denotes a user interface manager (control program), which interprets the input information from the user that has been input from the UI driver 401, and generates command packets shown in FIG. 46, which are output to an interpreter (control program) 409. The user interface manager 405 interprets the command packet input from the interpreter 409, and performs a display on the LCD display 303 via the UI driver (control program) 401.

Reference numeral 402 denotes a network interface driver (control program), for performing control of the network interface connector 305, and processing of the physical layer of network packets (physical packets), i.e., extracting transport packets from physical packets and generation of physical packets from transport packets. Reference numeral 406 denotes a TCP/IP-UDP/IP processing module, for processing transport packets output from the network interface 402 and extracting command packets which are output to the interpreter 409. Also, transport packets are generated from the command packets output from the interpreter 409, and output to the network interface 402.

Reference numeral 403 denotes an IEEE 1284 driver (control program), which performs control of the IEEE 1284 interface 307. Reference numeral 407 denotes an IEEE 1284.4 processing module (control program). This IEEE 1284.4 is a standard for the transport layer, mainly intended for use with an IEEE 1284 interface. The IEEE 1284.4 processing module (control program) 407 performs processing of transport packets output from the IEEE 1284 driver 403, extracts command packets, and outputs these to the interpreter 409. Also, transport packets are generated from the command packets output from the interpreter 409, which are output to the IEEE 1284 driver 403. Reference numeral 404 denotes an IEEE 1394 driver (control program), which performs control of the IEEE 1394 interface 306.

Reference numeral 408 denotes a module (control program) for processing a SBP (serial bus control)-2 which is a transport layer at the IEEE 1394. The processing module 408 of the SBP-2 processes the transport packets output from the IEEE 1394 driver 404, extracts command packets, and outputs these to the interpreter 409. Also, transport packets are generated from the command packets output from the interpreter 409, and output to the IEEE 1394 driver 404. Reference numeral 409 denotes a packet interpreter which interprets the command packets input from the transport processing units 406, 407, and 408, and the user interface manager 405, and which generates commands. The packet interpreter 409 also generates command packets, upon being requested by other modules (control programs). The packet interpreter 409 follows the sub-address/serving ID correlation table which the supervisor (central administration manager) 410 has (FIG. 9), to process only command packets input from valid sub-addresses, and discard command packets input from invalid sub-addresses.

Reference numeral 410 is a supervisor (central administration manager) which stores the data shown in FIG. 7 (attributes table), FIG. 9 (sub-address/serving ID correlation table), FIG. 11 (service ID/task type correlation table), FIG. 13 (user verification table), FIG. 14 (access control table), FIG. 16 (event setting table), and FIG. 17 (event format table) in the disk 315, and which centrally manages the operations of the controller 101. The supervisor 410 makes reference to and changes: various types of data held in the supervisor 410 itself; various types of data held in the managers (font manager 413, form overlay manager 414, log manager 415, color profile manager 416, printer managers 501 through 509, scan job manager 419, and copy job managers 601 through 608); and various types of data held in the controllers (printer controllers 510 through 512 and scan controller 420); this is done according to input commands.

Reference numeral 411 denotes a security gate, and restricts input of commands from command packets interpreted by the interpreter 409 for making the multi-functional peripheral device 201 available for use to those from only authorized users, according to a user verification table (FIG. 13) and access control table (FIG. 14) which the supervisor 410 (control program) has. Reference numeral 412 denotes a dispatcher (control program) which distributes commands input from the interpreter 409 to the control programs for processing these, i.e., the resource managers (font manager 413, form overlay manager 414, log manager 415, color profile manager 416), and the job managers (printer managers 501 through 509, scan job manner 419, and copy job managers 601 through 608). Reference numeral 413 denotes a font manager, which manages fonts. The font manager 413 saves data such as shown in FIG. 26 (attributes table) and FIG. 28 (font table) to the disk 315. The fonts (stored in the disk 315 or ROM 314) managed by the font manager 413 are handed to the PDL rasterizers 417 and 418, and are used at the time of processing print jobs.

Reference numeral 414 denotes a form overlay manager which manages form overlay. The form overlay manager 414 saves data such as shown in FIG. 29 (attributes table) and FIG. 31 (form table) to the disk 315. The form overlay (stored in the disk 315 or ROM 314) managed by the form overlay manager 414 is handed to the PDL rasterizers 417 and 418, and is used at the time of processing print jobs. Reference numeral 415 denotes a log manager which manages logs. The log manager 415 saves data such as shown in FIG. 32 (attributes table) and FIG. 34 (log table) to the disk 315. Logs are output from the respective managers and placed under the administration of the log manager. Implementation log files are stored in the RAM 302 or disk 315, and updated periodically.

Reference numeral 416 denotes the color profile manager which manages color profile data for color scanners and color printers to perform color matching. The color profile manager 416 saves data such as shown in FIG. 37 (attributes table) and FIG. 39 (color profile table) to the disk 315. The color profiles managed by the color profile manager 416 are handed to the printer controllers (control programs) 510, 511, and 512 and the scanner controller (control program) 420, and are used at the time of processing print jobs, copy jobs, and scan jobs. Reference numeral 417 denotes a PDL rasterizer which processes document data written in PostScript (registered trademark) which is a type of PDL (page description language), and outputs image data. Reference numeral 418 also denotes a PDL rasterizer which processes document data written in PostScript (registered trademark) which is a type of PDL, and outputs image data. Reference numeral 419 denotes the scan job manager which manages scan jobs. The scan job manager 419 saves data such as shown in FIG. 22 (attributes table) to the disk 315. The scan job manager 419 instructs the scanner controller 420 to execute scans. The scanner controller 420 is a scanner controller for controlling the scanner engine 310. The scanner controller 420 saves data such as shown in FIG. 44 (attributes table) representing the functions and status and capabilities of the scanner engine 310, to the disk 315. Both the scan job manager 419 and the scanner controller 420 have data representing the functions and capabilities (FIGS. 22 and 44), and the functions indicated by these two sets of data do not necessarily have to be the same. The function can be restricted by the scan job manager 419 re-writing the data (FIG. 22) it holds through the supervisor 410.

The above-described font manager 413, form overlay manager 414, log manager 415, and color profile manager 416 are resource managing programs, and the scan job manager 419, print job managers 501 through 509 and copy job managers 601 through 608 are logical device (scanner, printer) control programs, and the laser beam printer controller 510 and 511, ink-jet printer controller 512, and scanner controller 420 are physical device (printer, scanner) control programs.

(Configuration of Print Job Managers)

Figure 5:
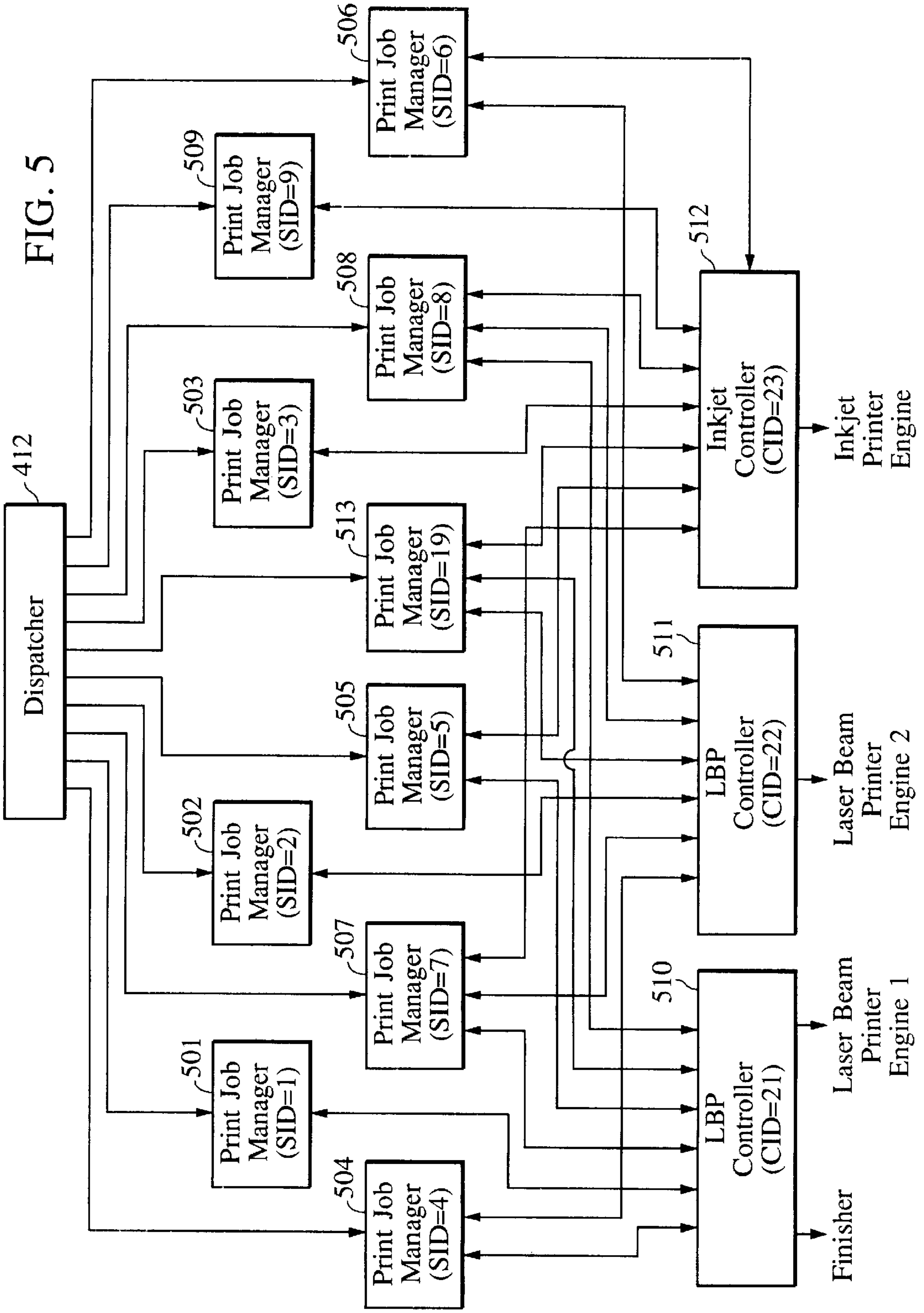
FIG. 5 is another diagram illustrating the software configuration of the controller of the MFP shown in FIG. 1.

FIG. 5 is a diagram for supplementing the software (control program) configuration diagram shown in FIG. 4. The dispatcher 412 shown here is the same as the dispatcher 412 shown in FIG. 4, and distributes command packets to the print job managers (control programs) 501 through 509 and 513. The print job managers 501 through 509 and 513 manage print jobs. The print job managers each have data such as shown in FIG. 18 (attributes table) in the disk 315. The print job managers are allocated print controllers (LBP controller 510 or LBP controller 511 or ink-jet controller 512 or an arbitrary combination of the controllers 510–512) for processing print jobs and print engines connected thereto, with which printer controller (control program) to use being described in the data indicated in the attribute ID 2001 shown in FIG. 18. However, the print job managers 508 and 513 have functions for dynamically selecting the print engine to be used, and the fact that the printer managers 508 and 513 have this function is described in the data (attributes table) that the printer managers 508 and 513 have. The print managers have saved in the disk 315 input print jobs, and the following data indicating which printer controllers will execute the print jobs as what sort of jobs, i.e., data shown in FIG. 20 (job table), FIG. 21 (job request table), FIG. 90 (job scheduling table), and FIG. 91 (execute-by-time job queue table). Print controllers 510 through 512 are print controllers which control the print engines 308, 311 and 312. The printer controller 510 also controls the finisher 309. The printer controllers have in the disk 315 data such as that shown in FIG. 40 (attributes table) indicating the functions, status and capabilities of the corresponding printer engines. The controllers hold in the disk 315 data indicated in FIG. 42 (job queue table) representing the status of input print jobs.

(Functions of Interruption Print Job Manager)

The print job manager 513 shown in FIG. 5 has a special function which none of the other print job managers have, and is called an "interruption print job manager". That is, the print job manager 513 has the function of interrupting at least one of the print jobs being provided to the print controllers and executed by the print job managers, so as to execute a job before the print job that is being interrupted. In the event that job is being executed and then is interrupted, the execution thereof is preferably interrupted at a good stopping place (e.g., at the point of discharging a page) that the print engine can provide. With the present embodiment, the print engine does not have the concept of a job, and simply repeats a mono-function of recording an image on a single recording sheet and discharging the sheet.

Accordingly, essential print job interruption is realized by the function of the print controller. Taking the urgency of an interruption job into consideration, the interruption print job manager 513 has a function for dynamically selecting from among all printer controllers existing on the system to execute a job. In reality, a printer controller which is not executing a job or a printer controller having a high printing speed is selected, and the print job is issued to the interruption control functions of that print controller along with interruption instructions. Though the interruption print job manager 513 also has in the disk 315 data such as that shown in FIG. 90 (job scheduling table) and FIG. 91 (execute-by-time job queue table), as with the other print managers, but in light of the nature of the print job manager 513, job execution priority or job execution time specification is meaningless as far as the interruption print job manager 513 is concerned. Accordingly, even in the event that the above options (job execution priority and job execution time specification) are specified for the interruption print job manager 513, these are ignored.

(Print Controller Functions)

All print controllers (510, 511, 512) internally hold the status (context) of the job currently being executed as variables. Examples include the output bin position (bin ID) of the print engine 308 which has a finisher unit, the reading position (file pointer) of a job file held within, the number of pages remaining to be printed, and so forth. Also, all print controllers have an area for storing these contexts, separate from the normal holding area in the disk 315. Further, job interruption instructions are supervised during job execution as well, so in the event that a job is provided along with this instruction, the context of the job currently being executed is saved in the above storing area, and initialization is performed for the provided interruption job. Subsequently, the print engine records images. New interruption instructions cannot be accepted during execution of an interruption job. At the point that the interruption job is completed, the context of the job which was interrupted and saved is restored, and the job is resumed from the point of interruption.

The print job managers 501 through 509 and the printer controllers 510 through 512 each have in the disk 315 data such as that shown in FIG. 18 (attributes table) and FIG. 40 (attributes table), indicating functions and capabilities. Generally, the capabilities of the print job manager are the sum of capabilities of the controllers used by the print job manager, and the print job manager has functions common to the controllers. However, a portion of the function can be changed by re-writing the data (FIG. 18) held by the print job manager, through the supervisor 410. For example, the print job manager 503 and the print job manager 509 both use the same printer controller 512, and thus the same functions and capabilities can be provided, but settings can be made such that the print job manager 503 can perform color printing and that the print job manager 509 cannot perform color printing, by the below-described setting process of the data held by the print job manager. Also, the print job managers except for the interruption print job manager 513 are subjected to setting by the attribute ID 2006 as to whether job management settings (job execution priority, job execution time, time limit remaining for job) can be made. This attribute is set to YES by default.

(Configuration of Copy Job Manager)

Figure 6:
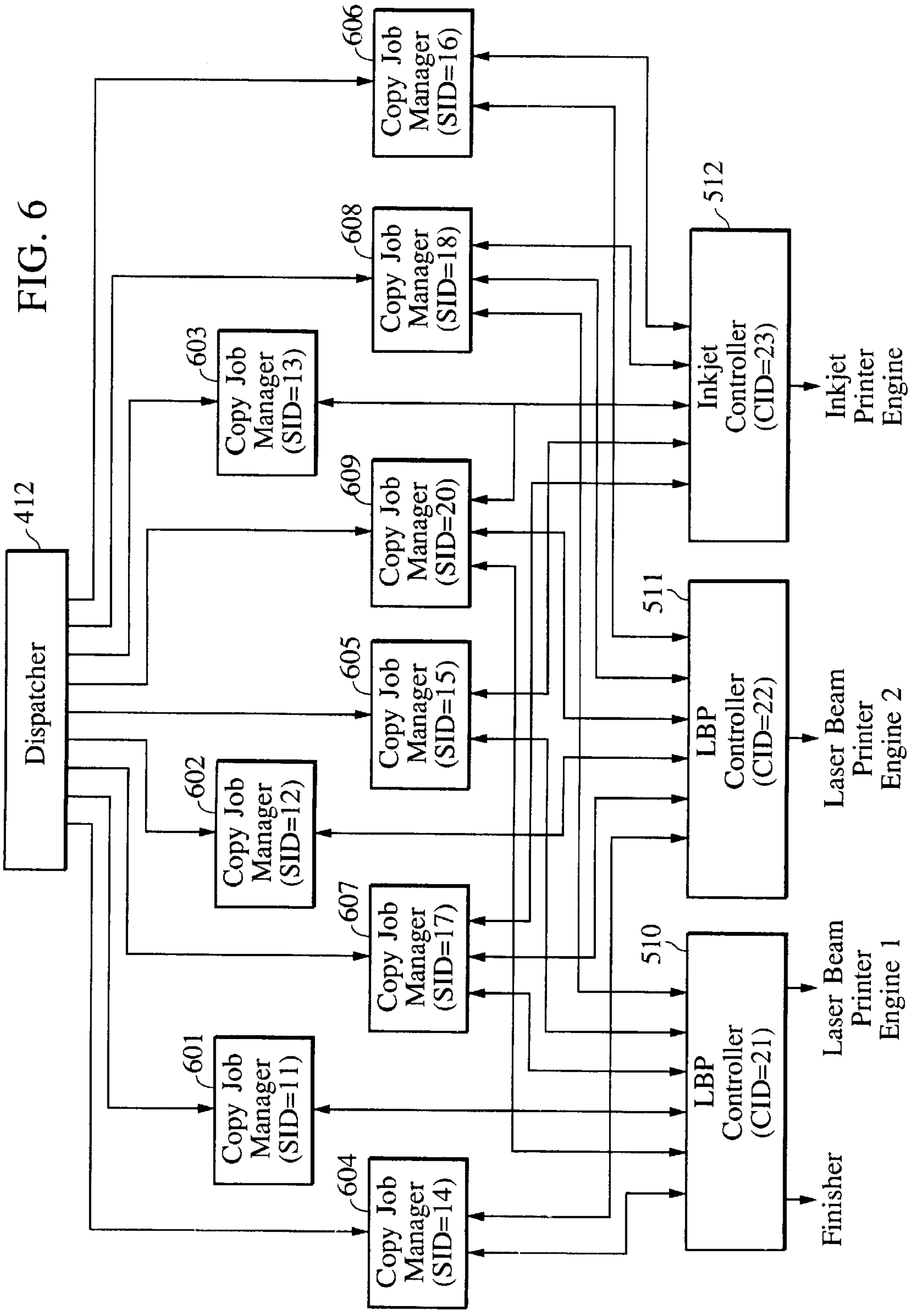
FIG. 6 is another diagram illustrating the software configuration of the controller of the MFP shown in FIG. 1.

FIG. 6 is a diagram supplementing the software (control program) configuration diagram shown in FIGS. 4 and 5. The dispatcher 412 shown here is the same as the dispatcher 412 shown in FIG. 4, and distributes command packets to the copy job managers (control programs) 601 through 609. The copy job managers 601 through 609 manage copy jobs. The copy job managers each have data such as shown in FIG. 24 (attributes table) in the disk 315. The print job managers are allocated print controllers and scanner controllers for processing copy jobs (and print engines and scanner engines connected thereto), with which printer controller and scanner controller to use being described in the data indicated in the attribute ID 2001 shown in FIG. 24. However, the copy job managers 608 and 609 have functions for dynamically selecting the print engine to be used, and the fact that the copy job managers 608 and 609 have this function is described in the data (attributes ID 2002) that the copy job managers 608 and 609 have. Though FIG. 24 will be described in detail later, as with the case shown in FIGS. 18 and 19, the copy job managers (except for the interruption copy job manager 609) are subjected to setting by the attribute ID 2006 regarding whether job management settings (job execution priority, job execution time, time limit remaining for job) can be made. This attribute is set to YES by default.

Figure 90:
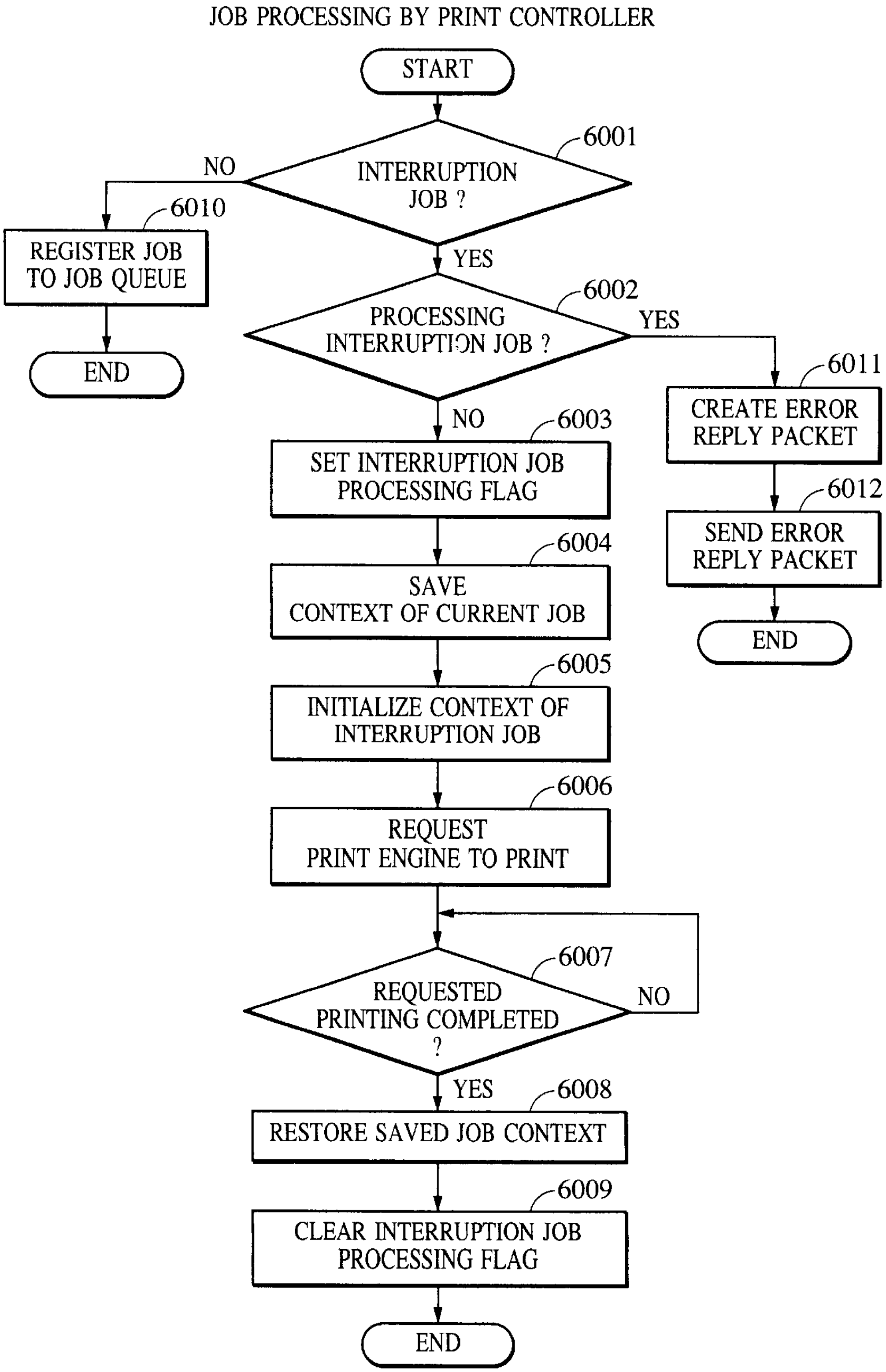
FIG. 90, including
Figures 91, 91A:
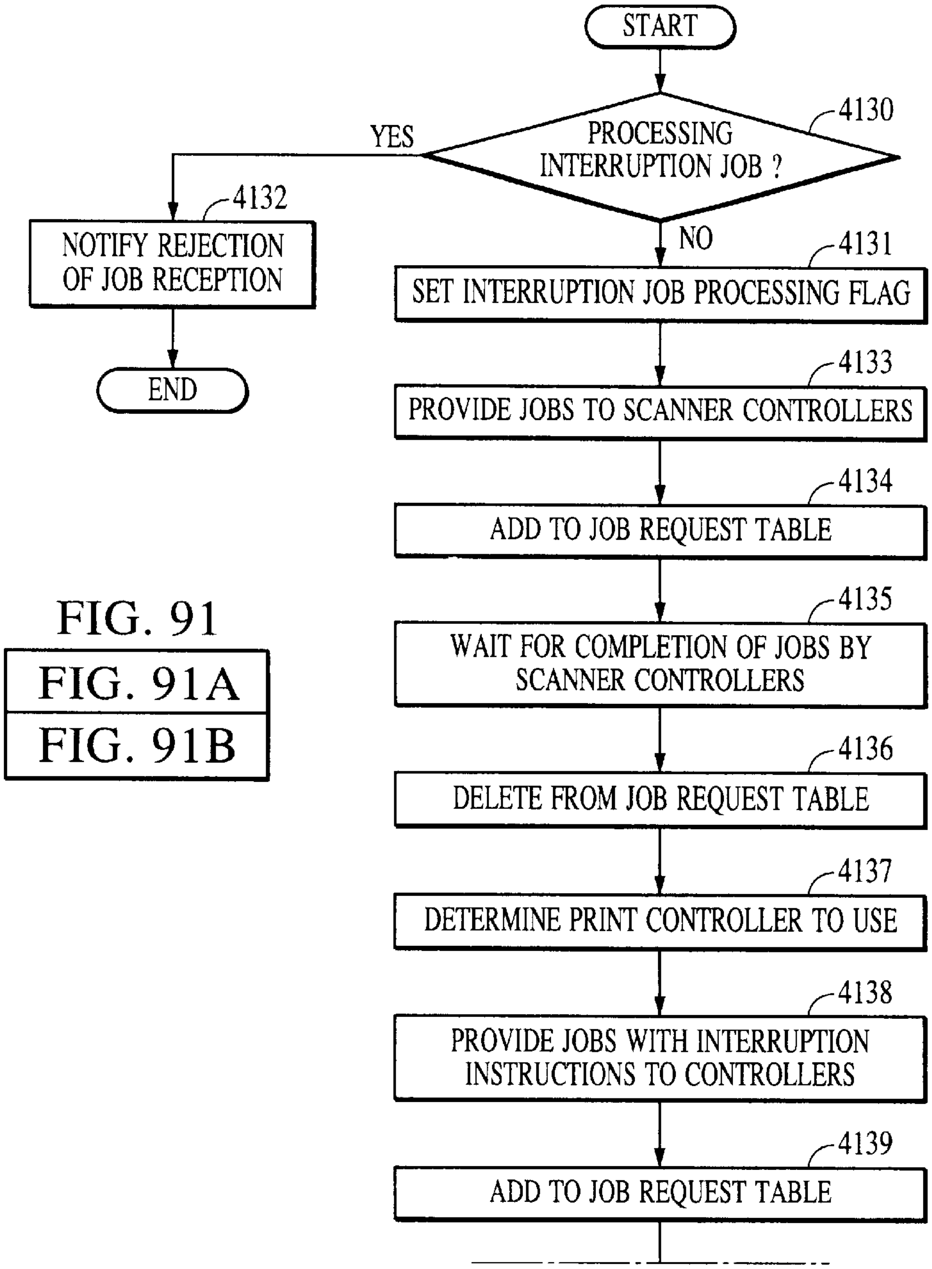
FIGS. 91A and 91B, is a diagram illustrating job processing of the print controller.
FIG. 91 is a diagram illustrating job processing with the interruption copy job manager.
Figure 91B:
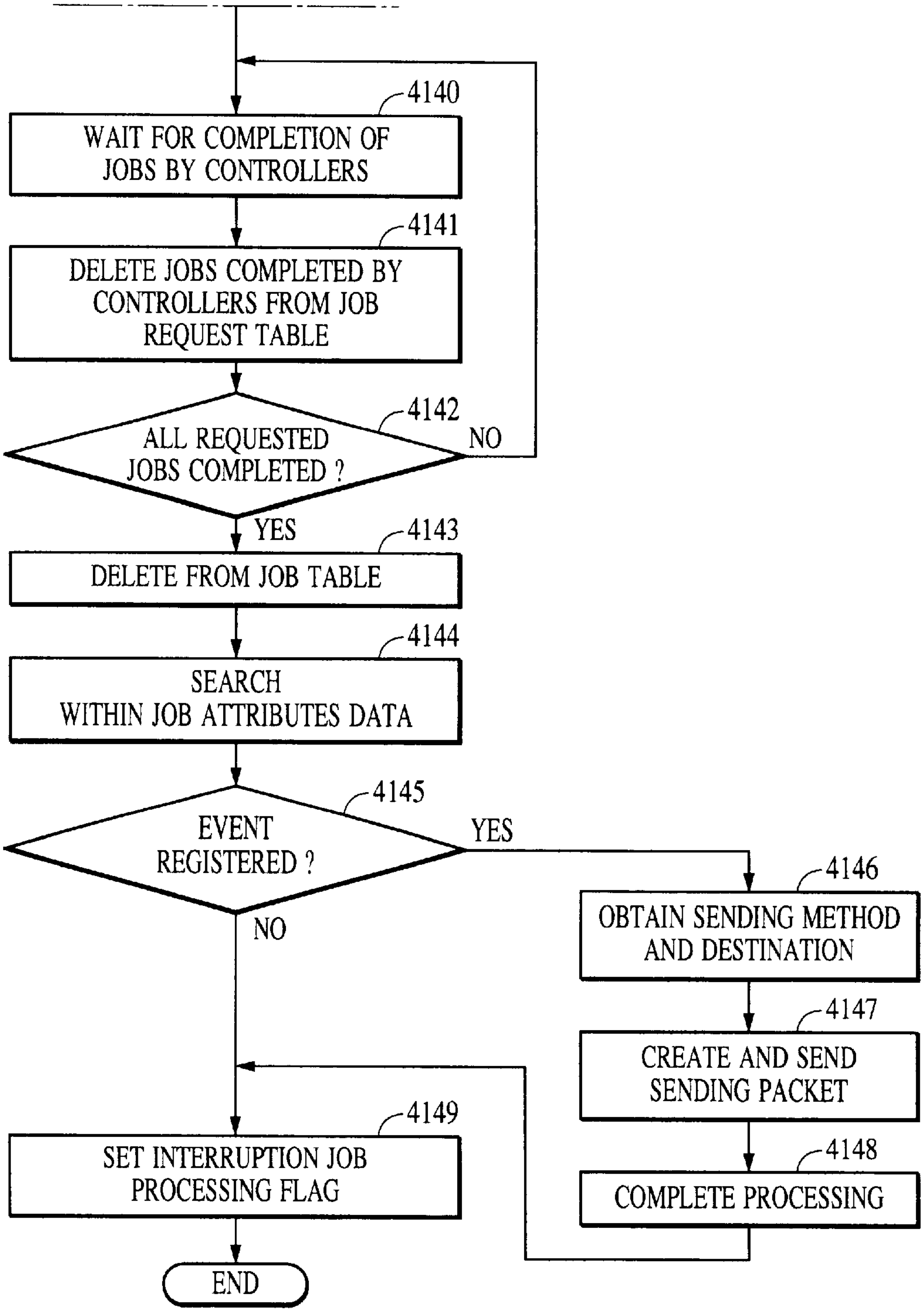

The copy managers hold in the disk 315 the input copy jobs, and data such as FIG. 20 (job table), FIG. 21 (job request table), FIG. 90 (job scheduling table), and FIG. 91 (execute-by-time job queue table), indicating which print controllers or scanner controllers are being used to execute the copy jobs as what sort of jobs. The printer controllers 510 through 512 are printer controllers for controlling the print engines, and are the same as the printer controllers 510 through 512 shown in FIG. 5. Copy job managers differ from print job managers in that copy job managers use a scanner controller to read documents and receive image data, but the subsequent procedures for providing jobs to print controllers are exactly the same.

(Functions of Interruption Copy Job Manager)

The copy job manager 609 shown in FIG. 6 has a special function which none of the other copy job managers have, and is called an "interruption copy job manager". That is, the copy job manager 609 has the function of interrupting at least one of the print jobs being provided to the print controllers and executed by the copy job managers, so as to execute a job before the current print job. The copy job manager executes copy jobs in two steps, by providing a job to the scanner controller and then providing the job to the print controller. With the present embodiment, the interruption copy job does not interrupt jobs provided to the scan controller, but only jobs provided to the print controller. In other words, the image data read by the scanner engine is not processed with the initially planned printer engine, and another printer engine is used for the interruption processing.

(Attributes Table of Supervisor)

FIG. 7 represents the data (attributes table) that the supervisor (control program) 410 holds and manages in the disk 315. This table represents the functions overview of the multi-functional peripheral device 201, connection information, security information, and so forth. In the table, each row represents one information unit (record), with the data being comprised of a collection of multiple records. Each record is made up of an attribute ID 701, type ID 702, and attribute value 703, thereby representing the attributes of the supervisor. The attribute ID 701 represents the type of information, indicating what sort of meaning the value 703 has. The attribute ID 701 is unique in the device, and those with the same attribute ID represent the same sort of information. The type ID 702 indicates what sort of data type the value 703 has, and is used for interpreting the value 703. The type ID is uniquely determined by the attribute ID, and is uniquely defined within the device. In the present embodiment, both the attribute ID 701 and type ID 702 are included in the attributes table, but an arrangement may be used wherein a correlation table for the attribute ID and type ID is separately provided from the attributes table and the attribute ID and type ID are saved therein as data, with only the attribute ID value being placed in the attributes table. The value 703 indicates the attribute value following the attribute ID 701.

FIG. 8 is a diagram illustrating the details of the attribute ID 701 and type ID 702 in the attributes table shown in FIG. 7. Here, the "list of supported security levels" of the attribute ID 102 holds a list of settable security levels deemed necessary to issue operations to the supervisor. The security levels will be described in the description of the access control table shown in FIG. 14. The "current security level" of the attribute ID 103 represents the security level which is currently set to the supervisor. The "current count data" of the attribute ID 401 represents a list of information that is the object of counting within the supervisor, and what this implies is represented in the "count data format" of attribute ID 402. For example, count data 45, 78, 34, and 13 represent the number of sheets printed of sizes represented by the count data format. The "count data format" of attribute ID 402 is represented as an attribute ID list. Attribute IDs are uniquely defined within the device, so specifying attribute IDs enables the meaning of the count data to be specified. For example, the attribute value 565 of the attribute ID 402 means the number of A2 size sheets printed, the attribute value 537 means the number of A3 size sheets printed, the attribute value 545 means the number of A4 size sheets printed, and the attribute value 523 means the number of A5 size sheets printed. The count restriction data of the attribute ID 403 represents the maximum value possible for the "current count data" of the attribute ID 401, and in the event that even one of the values of the "current count data" exceeds this maximum value, the CPU 301 sets all of the valid flags in the sub-address/service ID correlation table to invalid, thereby invalidating all services (by managers). The count unit price data of attribute ID 404 represents the unit price per count of the attribute ID held in the "count data format" of the attribute ID 402, in currency units. The current billing data of the attribute ID 405 is a value obtained by taking the sum of the multiplied corresponding values of the "current count data" of the attribute ID 401 and the "count unit price data" of attribute ID 404. The billing restriction data of attribute ID 406 represents the maximum value that the "current billing data," of the attribute ID 405 can have, and in the event that the "current billing data" of the attribute ID 405 exceeds the "billing restriction data" of attribute ID 406, the CPU 301 sets all of the valid flags in the sub-address/service ID correlation table shown in FIG. 9 to invalid, thereby invalidating all services (by managers). The "list of supported events" of attribute ID 501 represents events which can be set to notify the supervisor, as a list of uniquely defined even IDs for each sort of event. Setting of actual event sending is performed by setting both the connection format of event notification and destination along with the event ID to the event setting table shown in FIG. 16. The values in the attributes table in FIG. 7 which as described with "table data" means that the data has a table format (52 through 104) wherein the value is represented by a type ID.

(Sub-address/service ID Correlation Table)

FIG. 9 shows a sub-address/service ID correlation table. This table is saved in the disk 315 as the attributes values of the attribute ID 1001 (sub-address/SID correlation table) of the attributes table shown in FIG. 7. The sub-address/SID correlation table indicates providing which sub-address command packet with yield which service (e.g., printing, font downloading, etc.). Also, the interpreter 409 controls whether or not to provide job services for each connection form, based on the valid flags and the like in this table. In the table, each row represents one information unit (record), with the data being comprised of a collection of multiple records. Each record is made up of a connection type ID 801, sub-address 802, service ID 803, valid flag 804, list of valid users 805, and list of invalid users 806. The connection type ID 801 indicates an identifier representing the connection type. FIG. 10 is a diagram illustrating the meaning of the connection type ID, wherein 0 represents "internal" (user interface), 1 represents TCP/IP (network), 2 represents IEEE 1284.4 (IEEE 1284), and 3 represents SBP-2 (IEEE 1394).

The sub-address 802 represents the sub-address for each connection type. Though the user interface does not have a sub-address, a sub-address is appropriated thereto for the sake of handiness, and command packets are provided from the user interface along with the sub-address information.

Service ID 803 is an identifier representing service. The service ID 803 is appropriated to the managers shown in FIGS. 4 through 6 on a one-on-one basis.

The valid flag 804 represents whether the sub-address is valid or not. In the event that the value is true (YES), the sub-address is valid, and the user can issue a command packet to the sub-address. In the event that the value is false (NO), this means that the sub-address is invalid, and that if the user issues a command packet to the sub-address, it will be discarded. In the case of FIG. 8, this represents that the service of the service ID 8 (print job manager) cannot be provided in the event that the connection form of the connection type ID 2 (IEEE 1284) is used.

The list of valid users 805 represents a list of user IDs which can receive a service in the event that the sub-address is valid. The list of invalid users 806 represents a list of user IDs which cannot receive a service even in the event that the sub-address is valid. The list of valid users 805 and list of invalid users 806 can only be set to one value or the other.

(Service ID/task Type Correlation Table)

FIG. 11 represents a service ID/task type correlation table. This table is held on the disk 315 as attribute values of the attribute ID 1002 (SID: task type table) of the attributes table shown in FIG. 7. The service ID/task type table represents what type of service a service ID provides. In the table, each row represents one information unit (record), with the data being comprised of a collection of multiple records. Each record is made up of a service ID 901 and task type 902. The task type 902 indicates what type of service the service is. FIG. 12 is a diagram illustrating the meaning of the value of the task type 902. The numeral 0 represents service performed by the supervisor, 1 represents printing, 2 represents scanning, 3 represents copying, 11 represents interruption printing, 13 represents interruption copying, 101 represents font, 102 represents form overlay, 103 represents log, and 104 represents color profile. Service IDs correlate with the managers providing the service, on a one-on-one basis. Accordingly, the service ID is also used for accessing the functions table that each manager has. Each printer controller and scanner controller also has a functions table, so controller IDS corresponding to service IDs are also appropriated to the printer controllers and scanner controllers, to facilitate access thereto, and the service ID/task type correlation table manages what type of controller the controller ID is. The task type 201 represents a printer controller, and 202 represents a scanner controller. The controller IDS correlate with the controllers shown in FIGS. 4 and 5, on a one-on-one basis.

The meaning of the service IDs is as follows:

0: Supervisor 410
1: Print job manager 501
2: Print job manager 502
3: Print job manager 503
4: Print job manager 504
5: Print job manager 505
6: Print job manager 506
7: Print job manager 507
8: Print job manager 508
9: Print job manager 509
10: Scan job manager 419
11: Copy job manager 601
12: Copy job manager 602
13: Copy job manager 603
14: Copy job manager 604
15: Copy job manager 605
16: Copy job manager 606
17: Copy job manager 607
18: Copy job manager 608
19: Interruption print job manager 513
20: Interruption copy job manager 609
101: Font manager 413
102: Form overlay manager 414
103: Log manager 415
104: Color profile manager 416
21: Printer controller 510
22: Printer controller 511
23: Printer controller 512
24: Scanner controller 420

(User Verification Table)

FIG. 13 represents a user verification table which the supervisor holds, and represents verification information for users which can use the device. This table is held in the disk 315 as attributes values of the attribute ID 1003 (user verification table) of the attributes table shown in FIG. 7. The user verification table holds a set of a valid user ID and a password along with information regarding whether that user has administrative authority. In the table, each row represents one information unit (record), with the data being comprised of a collection of multiple records. Each record is made up of a user ID ("UID") 1001, password 1002, and administrative authority flag 1003. The administrative authority flag 1003 indicates whether the user has rights as an administrator.

(Access Control Table)

FIG. 14 represents an access control table which the supervisor holds, and represents the security level for each service. This table is held in the disk 315 as attributes values of the attribute ID 1004 (access control table) in the attributes table shown in FIG. 7. The access control table holds a list of security levels necessary for each service ID, and users that have been given permission to be provided with the services. In the table, each row represents one information unit (record), with the data being comprised of a collection of multiple records.

Each record is made up of a service ID 1101, security level 1102, and user ID list 1103. The security level 1102 represents verification information necessary for receiving services specified by the service ID 1101, i.e., necessary for issuing command packets to the manager indicated by the service ID 1101. FIG. 15 is a diagram illustrating the meaning of the security levels. Security level 0 means that user verification is not necessary, 1 means that only the administrator is distinguished, 2 means that only verified users are permitted to use the service and the a user ID is used for verification but a password is not, and 3 means that only verified users are permitted to use the service and that a user ID and password are required for verification. The user ID list 1103 represents a list of user IDs which have been given permission to use (access) the service in the event that the security level 1102 is 2 or 3.

(Event Setting Table)

FIG. 16 represents an event setting table which the supervisor holds. This table is held in the disk 315 as attributes values of the attribute ID 502 (event setting table) in the attributes table shown in FIG. 7. The event setting table holds the method and destination to send an event notification to in the event that a specified event occurs within the device, for each kind of event. In the table, each row represents one information unit (record), with the data being comprised of a collection of multiple records. Each record is comprised of an event ID 1201, connection format 1202, and notification destination address 1203. The destination is comprised of a connection format and a notification destination address which is dependent on the connection format. The event ID 1201 represents the type of event, and is defined uniquely within the device. For example, event ID 200 means no paper, ID 399 means no toner, ID 432 means no ink, and ID 234 means that the cover of the multi-functional peripheral device is open. The connection format ID 1202 represents the connection format for sending the event notification, and the same values as those used in the sub-address/service ID correlation table shown in FIG. 9 are used here. The notification destination address 1203 represents the notification destination of an event matching the connection format 1202.

(Event Format Table)

FIG. 17 represents an event format table which the supervisor holds, and represents the contents of the event. This table is held in the disk 315 as attributes values of the attribute ID 503 (event format table) in the attributes table shown in FIG. 7. The event format table holds the format of attached data to be sent as event notifications, regarding each event ID uniquely defined within the device. In the table, each row represents one information unit (record), with the data being comprised of a collection of multiple records. Each record is comprised of an event ID 1301 and event format 1302. The event format 1302 is the format of the attached data sent as an event notification, and is represented as an attribute ID list. The attribute ID is uniquely defined within the device, and the type thereof is also uniquely defined by the attribute ID thereof, so the format of the attached data can be represented by specifying the attribute ID. For example, attribute ID 676 of the event format 1302 indicates the paper size, ID 756 the type of paper, ID 666 the type of toner, ID 698 the type of ink, and ID 600 the cover position. As described later, the method and destination for sending an event is set in the data (attributes table) held by the managers and controllers, so that events occurring within these managers and controllers can be notified, and the format of the attached data for these events are also held in the event format table shown in FIG. 13. In the event that a specified event occurs, the contents defined by the event format are notified along with the data determined beforehand for each event ID.

(Print Job Manager Attributes Table)

FIG. 18 shows the data (attributes table) which the print job managers (control programs) 501 through 509 and 513 hold in the disk 315. This table represents the capabilities and functions of print jobs the print job managers are able to handle. In the table, each row represents one information unit (record), with the data being comprised of a collection of multiple records. Each record is comprised of the same contents as those held by the supervisor as shown in FIG. 7, and consists of an attribute ID 1401, type ID 1402, and value 1403. FIG. 19 is a diagram showing the values of the attribute ID 1401 and type ID 1402 shown in FIG. 18 in the attributes table. Other than the type ID 203 (job table format), type ID 204 (job request table format), type ID 205 (job schedule table format), type ID 81 (No. 1 type list of combination of attributes forbidden to set), type ID 82 (No. 2 type list of combination of attributes forbidden to set), type ID 83 (No. 3 type list of combination of attributes forbidden to set), type ID 84 (No. 4 type list of combination of attributes forbidden to set), and type ID 85 (No. 5 type list of combination of attributes forbidden to set), of the attributes table in FIG. 19, the type IDs are identical to those used in the supervisor attribute table in FIG. 7.

The "method for downloading supported data" of attribute ID 601 represents the method of sending the document data to print to the device, and the present embodiment supports two methods: No. 1 is a method wherein the document data is included in the job, and No. 2 is a method for including a document data reference pointer (i.e., a URL, or Unified Resource Locator) in the job, for reading document data indicated by the reference pointer as necessary from the device.

Attribute IDS 801, 802, 803, 804, and 805 are forbidding settings attributes, representing restrictions regarding attributes set in print jobs to be provided to the print job managers. These are used to represent restriction items, such as invalidating finisher settings in the event that the number of copies exceeds 100, for example. There are basically five types of restriction expression methods for the forbidding settings attributes. Attribute ID 801 has a plurality of pairs of lists such as an attribute ID 2 to an attribute ID 1, as shown in {Attribute ID 1: {Attribute ID 2}}. This means that in the event that the settings of the attribute ID 1 have been set, the settings for the attribute ID 2 cannot be performed in the print job script.

Attribute ID 802 has a plurality of pairs of lists such as an attribute ID 2 to an attribute ID, operator identifier, and value 1, as shown in {Attribute ID 1: operator identifier: value: {Attribute ID 2}}. This means that in the event that the results of applying the operator indicated by the operator identifier to the value is true as to the attribute ID 1, the settings for the attribute ID 2 cannot be performed in the print job script. The operator identifier has an integer value corresponding to binary operations in a one-on-one manner. For example, 0 (zero) means "=(equal)".

Attribute ID 803 has a plurality of pairs of lists of sets comprised of such as an attribute ID 2, operator identifier 2 and value 2, to an attribute ID 1, operator identifier 1, and value 1, as shown in {Attribute ID 1: operator identifier 1: value 1: {Attribute ID 2: operator identifier 2: value 2}}. This means that in the event that the results of applying the operator indicated by the operator identifier 1 to the value 1 is true as to the attribute ID 1, settings wherein the results of applying the operator indicated by the operator identifier 2 to the value 2 would be true as to the attribute ID 2, cannot be performed in the print job script.

Attribute ID 804 has a plurality of pairs of lists of such as an attribute ID 3, to an attribute ID 1, operator identifier 1, and value 1, and operator identifier 3, and another attribute ID 2, operator identifier 2, and value 2, to as shown in {(Attribute ID 1: operator identifier 1: value 1) operator identifier 3: (Attribute ID 2: operator identifier 2: value 2): {Attribute ID 3}}. This means that, in the event that the results of applying the operator indicated by the operator identifier 1 to the value 1 as to the attribute ID 1, and the results of applying the operator indicated by the operator identifier 2 to the value 2 as to the attribute ID 2, are subjected to an operation indicated by the operator identifier 3 and the results thereof are true, settings to the attribute ID 3 cannot be performed in the print job script.

Attribute ID 805 has a plurality of pairs of lists of sets comprised of such as attribute ID 4, operator identifier 4, and value 4, to an attribute ID 1, operator identifier 1, and value 1, and operator identifier 3, and another attribute ID 2, operator identifier 2, and value 2, to as shown in {(Attribute ID 1: operator identifier 1: value 1): operator identifier 3: (Attribute ID 2: operator identifier 2: value 2): {Attribute ID 4: operator identifier 4: value 4}}. This means that, in the event that the results of applying the operator indicated by the operator identifier 1 to the value 1 as to the attribute ID

1, and the results of applying the operator indicated by the operator identifier 2 to the value 2 as to the attribute ID 2, are subjected to an operation indicated by the operator identifier 3 and the results thereof are true, settings wherein the results of applying the operator indicated by the operator identifier 4 to the value 4 would be true as to the attribute ID 4, cannot be performed in the print job script.

Attribute ID 2001 "List of controller IDs (which have a possibility) to execute job" is a list of controller IDs of controllers which execute print jobs, and all print job managers except for print job manager 508 always comprise the list of controllers for executing jobs. The print job manager 508 dynamically selects a controller according to functions requested by the job, so this attribute represents the range of controller selection. Attribute ID 2002 "Whether automatic selection of controller is available" represents whether or not the print job manager automatically selects the controller. In the present embodiment, only the print job manager 508 holds this value as true. The other attribute IDs are the same as those used in the attributes table of the supervisor in FIG. 7. However, the range of settings and the range of effects are restricted to those under the management of the print job manager to which the attributes table belongs. For example, the attribute value 101 "supported operations" is a list of operations which can be issued to this print job manager, and the attribute value 406 "billing restriction data" applies restrictions to the limit of billing regarding the print job executed within this print job manager. Handling contents exceeding the limit of billing only invalidates the services of this print job manager, and has no effect on the services of other managers. Incidentally, the attributes table of print job managers shown in FIG. 18 is an attributes table with a service ID 4 (print job manager 504), with attribute tables for the print job managers 501, 502, 503, 505, 506, 507, 508, 509, and 513 corresponding to service IDs 1, 2, 3, 5, 6, 7, 8, 9, and 13 respectively, these attribute tables being stored on the disk 315 and mutually differing.

(Job Table)

Figure 52:
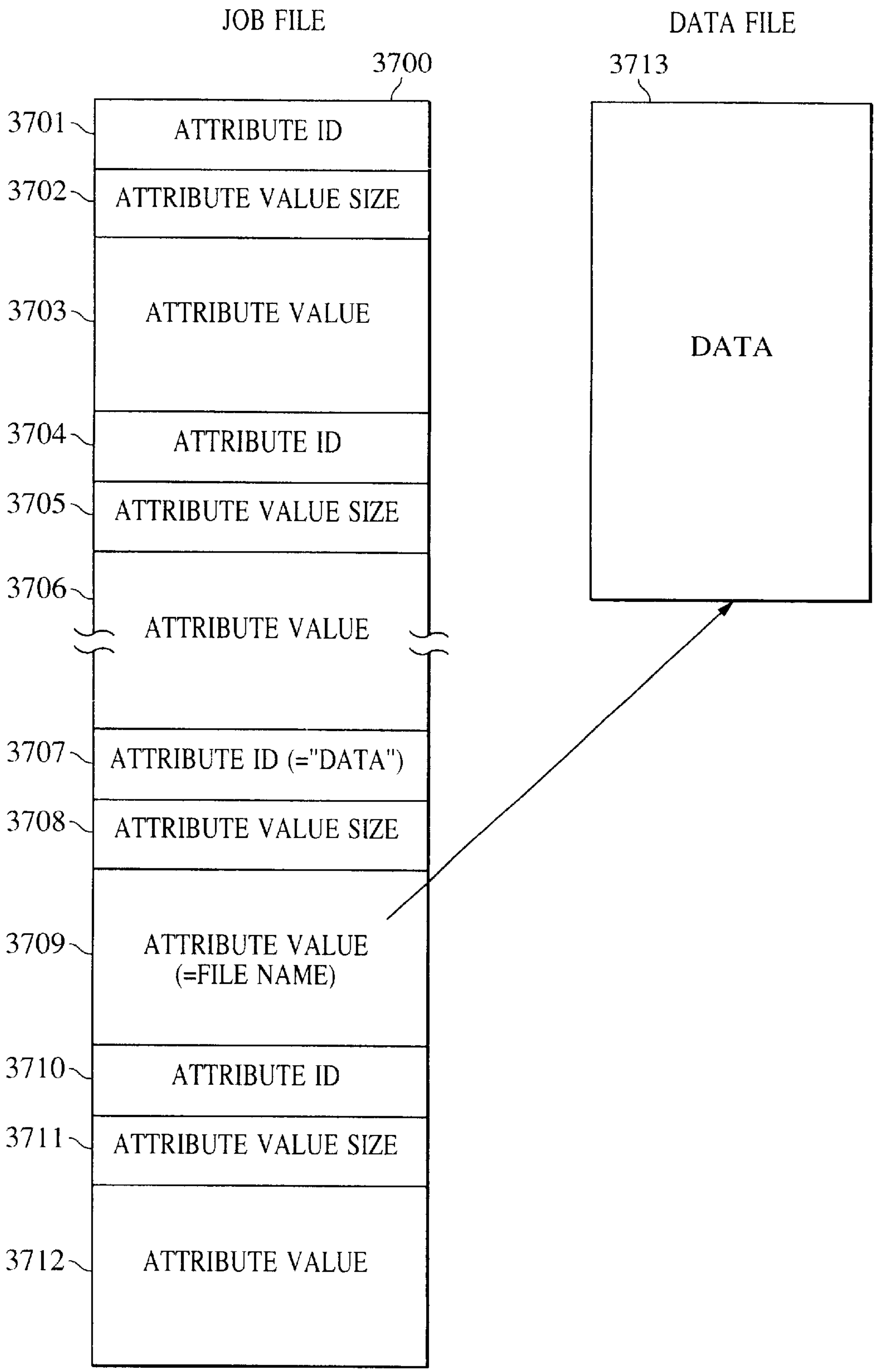
FIG. 52 is a diagram illustrating a job structure.

FIG. 20 is a diagram representing data (job table) held by each print job manager, representing a correlation table between the file name holding the actual job to be managed by the print manager, and the job ID. The table is stored in the RAM 302 as the attributes value of the attribute ID 2003 (job table) of the attributes table shown in FIG. 18. Each print manager dynamically alters the job table on the RAM 302 and stores this in the disk 315 if necessary. In the table, each row represents one information unit (record), with the data being comprised of a collection of multiple records. Each record is comprised of a job ID 1501 and the file name 1502 which holds the actual job, execution priority 1506, specified execution time 1507, and remaining limit time 1508. The job ID 1501 is an identifier regarding a job allocated by the print job manager at the time that a job packet is provided from a client PC (202 through 205) and a job is provided to the print job manager. The job file name 1502 is the name of the file holding the actual job. The actual job is comprised by having a plurality of sets of attribute ID, attribute value size and attribute value, as shown in FIG. 52.

Though details will be described later, the execution priority 1506, specified execution time 1507, and remaining limit time 1508 are attributes specified based on specification information contained in the job packet from the client PC (202 through 205), simultaneous with the job being provided to the print job manager, with all specification values thereof being stored in the job table shown in FIG. 20. The execution priority 1506 has natural numbers with a range as the contents thereof. With the present embodiment, the execution priority has a range of 1 to 3, and the smaller the value (of the execution priority) is, the higher the priority of executing the job is. In the event that the party requesting the execution of the job desires that the job be executed relatively quickly, this value can be set to 2 or 1. In the event that there is no specification, the default execution priority 3 is dynamically provided and stored in this job table. The job is registered to a later-described job scheduling table according to the execution priority, and is sent to a relevant controller in order of priority. Incidentally, this priority can be changed even after providing the job, via the supervisor. In this case, the priority value in the table is changed, and at the same time the scheduling table is immediately updated and job execution scheduling according to the new priority is carried out.

The specified execution time 1507 is specified in the event that there is the need to specify the time of execution of the job. In the event that there is no specification thereof, the execution of the job is processed according to the priority as described above. In the event that the specified execution time has been specified, the execution priority is forcibly set to 1 (minimum priority), regardless of the specification of execution priority. The specified execution time must be set further in the future than the time at which the job is provided. A job specified with the specified execution time is not registered to the job scheduling table immediately upon being provided. Instead, the job is registered to an execute-by-time job queue table. At the point that the specified execution time arrives, the registration is deleted from the execute-by-time job queue table, and immediately registered to the scheduling table with priority of 1. In other words, all jobs provided are registered to either the job manager job scheduling table or execute-by-time job queue table. Incidentally, the specified execution time may be set as an absolute time, e.g., in the event that the current time is 10 o'clock AM and the user wants the job to be executed at 11 o'clock AM, where 11 o'clock AM is set at the user interface of the client PC (202 to 205). Or, the specified execution time may be set as a relative time, e.g., in the event that the user wants the job to be executed within 30 minutes of the current time, where 30 minutes from the current time is set at the user interface of the client PC (202 to 205). The former is effective in cases wherein the user takes conservation into consideration and executes massive jobs at nighttime, or during lunch break. The latter is effective in cases wherein the user does not take the current time as such into consideration but desires to execute the job within a time frame according to an arbitrarily planned work schedule. In the event that the specified execution time is specified in relative time, an absolute time is calculated by the CPU 301 based on the current time at which the job is provided to the job managers and the specified relative time, which is registered in the job table shown in FIG. 20 and the execute-by-time job queue table shown in FIG. 84.

The remaining limit time 1508 attribute determines the lifespan of the job in the device. The execution of normal jobs may be delayed according to the execution priority, execution start time, and state of use of the controllers. In such a case, the job will remain stored in the device for a while, unexecuted. However, there are some jobs which should not be left unexecuted in the device for long periods of time, due to considerations such as importance or secrecy. The present embodiment provides for setting a remaining limit time for jobs, to deal with such requests. That is, a job to which this attribute has been set cannot exist unexecuted within the device for a period exceeding the time specified thereby, and will be automatically deleted. The remaining limit time can be used in conjunction with the above execution start time. It is preferable that the remaining limit time be set farther in the future than the execution start time, but if such conditions are not met, the job will be deleted immediately after being provided. Incidentally, the remaining limit time may be set as an absolute time, e.g., in the event that the current time is 10 o'clock AM and the user wants the job deleted at 11 o'clock AM as the limit, where 11 o'clock AM is set at the user interface of the client PC (202 to 205). Or, the remaining limit time may be set as a relative time, e.g., in the event that the user wants the job to be deleted within 30 minutes of the current time as the limit thereof, wherein 30 minutes from the current time is set at the user interface of the client PC (202 to 205). The former is effective in cases wherein, for example, a job with high secrecy is being executed during lunch break, and in the event that the job cannot be executing before lunch break ends, the job is set to be deleted with the end of lunch break as the limit thereof. The later is effective in cases wherein, for example, the user is planning to leave the office for home according to the schedule that he/she is currently planning, and sets the job to be deleted in 30 minutes as the limit thereof, so as to be able to go home. In the event that the remaining limit time is specified in relative time, an absolute time is calculated by the CPU 301 based on the current time at which the job is provided to the job managers and the specified relative time, which is registered in the job table shown in FIG. 20 and the execute-by-time job queue table shown in FIG. 84.

(Job Request Table)

FIG. 21 is a diagram representing a job request table held by the print job managers, and indicates the relationship between the jobs managed by the print managers and the jobs executed by the controllers. This table is held in the disk 315 as attributes values of the attribute ID 2004 (job request table) in the attributes table shown in FIG. 18. The job request table represents which job managed by a print job manager is being executed by which controller. In the table, each row represents one information unit (record), with the data being comprised of a collection of multiple records. Each record is comprised of a job ID 1503, controller ID 1504, and job ID 1505 appropriated within the controller. The job ID 1503 is an identifier for the job appropriated by the print job manager at the time that the job is provided to the print job manager, and corresponds with the job ID 1501 in the job table (FIG. 20). The controller ID 1504 represents the ID of the controller currently executing the job. The job ID 1505 is an identifier appropriated by the controller executing the job. Referring to FIG. 21, there are multiple records having the same value for the job ID 1503 in the job table, but this indicates a case wherein a single job has been split between multiple controllers for execution thereof. For example, the job with the job ID 1503=1 in FIG. 21 has been split into jobs to the two controllers with controller IDs 21 and 22, and has been appropriated the job ID 1505=100 and 101.

(Job Scheduling Table)

FIG. 83 is a diagram illustrating a job scheduling table held by all print job managers, and all copy job managers. Each row in the job scheduling table is a list of job IDs for each job execution priority. That is, the first row in the table has the job IDs of job execution priority 1 in the order of the time at which they where provided from the left (job ID 5, 7, 8). In the same way, the job groups of the execution priorities 2 and 3 are placed in the second and third rows, in the same manner. The job scheduling table is constantly changing according to the state of jobs being provided and executed. The jobs within the job scheduling table are taken out (i.e., deleted) by job managers in order of highest execution priority and newest order of being provided, and provided to the controller.

(Execute-by-time Job Queue Table)

FIG. 84 is a diagram illustrating an execute-by-time job queue table held by all print job managers, and all copy job managers. In the execute-by-time job queue table, each row represents one record comprised of an absolute time at which the job is to be executed, and a job ID, with the table being comprised of a collection of multiple records. The execution time 1561 and job ID 1562 are the same type as the specified execution time 1507 and job ID 1503 in the job request table shown in FIG. 21. Jobs which have the value thereof registered in the specified execution time 1507 of the job table shown in FIG. 21 are sorted in order of closest specified time, and the job ID thereof and execution time are registered in the execute-by-time job queue table. Of the jobs which have been provided to the print job manager or copy job manager, those which have had the execution time thereof specified are temporarily registered to the execute-by-time job queue table, and at the point that the execution time arrives, are deleted from the execute-by-time job queue table and registered to the job scheduling table. Now, as mentioned above, this specified execution time can be specified either as relative time or absolute time, and in the event that the specified execution time is specified in relative time, an absolute time is calculated by the CPU 301 based on the current time at which the job is provided to the job managers and the specified relative time, which is registered in the job table shown in FIG. 20 and the execute-by-time job queue table shown in FIG. 84.

(Scan Job Manager Attributes Table)

FIG. 22 represents an attributes table which is data held by the scan job manager 419. This table represents the capabilities and functions of scan jobs which the scan job manager can handle. In the table, each row represents one information unit (record), with the data being comprised of a collection of multiple records. The contents of each record are the same as those of the supervisor shown in FIG. 7, being comprised of attribute ID 1601, type ID 1602, and value 1603. FIG. 23 is a diagram illustrating the values of the attributes ID 1601 and type ID 1602 in the attributes table shown in FIG. 22. The "method for uploading supported data" of attribute ID 602 represents the method of sending the scanned document data to the device, and the present embodiment supports two methods: No. 1 is a method wherein the document data is included in a job reply, and No. 2 is a method wherein the document data is held within the device and a reference pointer (i.e., a URL, or Unified Resource Locator) to the document data is included in the job reply, for reading document data indicated by the reference pointer as necessary from the host (client). The attribute ID 1201 "list of image formats capable of output" represents image data formats that can be output, and one of these can be specified as a data format at the time of issuing a scan job. The job table of attribute ID 2003 is the same as that which the print job manager shown in FIG. 20 has. Other attribute IDs are the same as those used by the supervisor attributes table shown in FIG. 7. However, the range of settings and the range of effects are restricted to those under the management of the scan job manager to which the attributes table belongs. IDs other than the type ID 203 (job table format) in the attributes table shown in FIG. 23 are the same as those used by the supervisor attributes table shown in FIG. 7.

(Copy Job Manager Attributes Table)

FIG. 24 represents an attributes table which is data held by the copy job managers 601 through 609. This table represents the capabilities and functions of copy jobs which the copy job manager can handle. In the table, each row represents one information unit (record), with the data being comprised of a collection of multiple records. The contents of each record are the same as those of the supervisor shown in FIG. 7, being comprised of attribute ID 1701, type ID 1702, and value 1703. FIG. 25 is a diagram illustrating the values of the attribute ID 1701 and type ID 1702 in the attributes table shown in FIG. 24. Attribute ID 1302 (whether color printing is available), attribute ID 1302 (supported kinds of finishing), attribute ID 1304 (maximum settable resolution), attribute ID 1305 (minimum settable resolution), attribute ID 2002 (whether automatic selection of controller is available), and attribute ID 2003 (job table) are the same as those mentioned in the description of the print job manager and the scan job manager, and the attribute ID 2004 (job request table), attribute ID 2005 (job schedule table), and attribute ID 2006 (whether job management setting is available) are the same as those mentioned in the description of the print job manager. Also, except for the attribute ID 1302 (whether color printing is available), attribute ID 1303 (supported types of finishing), attribute ID 1304 (maximum settable resolution), attribute ID 1305 (minimum settable resolution), attribute ID 2001 (list of controller IDS with possibility to execute job), attribute ID 2002 (whether automatic selection of controller is available), and attribute ID 2003 (job table), attribute ID 2004 (job request table), attribute ID 2005 (job schedule table), attribute ID 2006 (whether job management setting is available), type ID 203 (job table format), type ID 204 (job request table format), and type ID 205 (job schedule table format), all attribute IDs and type IDs are the same as those used in the supervisor attributes table shown in FIG. 7. Incidentally, the attributes table of the copy job manager shown in FIG. 24 is an attributes table with a service ID of 18 (copy job manager 608), with attribute tables for the copy job managers 601, 602, 603, 604, 605, 606, 607, and 609, corresponding to service IDs 11, 12, 13, 14, 15, 16, 17, and 19 respectively, these attribute tables being stored on the disk 315 and mutually differing.

(Font Manager Attributes Table)

FIG. 26 represents an attributes table which is data held by the font manager 413 in the disk 315. This table represents the types of fonts which the font manager can handle, a list of fonts which the font manager is currently managing, and so forth. In the table, each row represents one information unit (record), with the data being comprised of a collection of multiple records. The contents of each record are the same as those of the supervisor shown in FIG. 7, being comprised of an attribute ID 1801, type ID 1802, and value 1803. FIG. 27 is a diagram illustrating the values of the attributes ID 1801 and type ID 1802 in the attributes table shown in FIG. 26. Except for the attribute ID 601 (method for downloading supported data), attribute ID 602 (method for uploading supported data), attribute ID 1501 (list of supported font types), attribute ID 1502 (maximum number of fonts), attribute ID 1503 (current number of fonts), attribute ID 1504 (list of fonts held), and type ID 150 (font table), all attribute IDs and type IDs are the same as those used in the supervisor attributes table shown in FIG. 7. However, the range of settings and the range of effects are restricted to those under the management of the font manager to which the attributes table belongs. The attribute ID 601 (method for downloading supported data) and attribute ID 602 (method for uploading supported data) are the same as those mentioned in the description of the print job manager and the description of the scan job manager, indicating the method for downloading and the method for uploading supported font data.

(Font Table)

FIG. 28 represents font table held by the font manager. This table is held in the disk 315 as attributes values of the type ID 1504 (font table) in the attributes table shown in FIG. 26. This font table represents the types of fonts which the font manager is currently managing. In the table, each row represents one information unit (record), with the data being comprised of a collection of multiple records. Each record is comprised of a font ID 1904, font type 1902, font name 1903, and file name 1901 including font data. The font data is stored in the disk 315, and the font ID 1901 serves as an identifier for the font appropriated by the font manager at the time that the font data is downloaded to the RAM 302.

(Form Overlay Manager Attributes Table)

FIG. 29 represents an attributes table which is data held by the form overlay manager 414 in the disk 315. This table represents the form overlay formats which the form overlay manager can handle, a list of form overlays which the form overlay manager is currently managing, and so forth. In the table, each row represents one information unit (record), with the data being comprised of a collection of multiple records. The contents of each record are the same as those of the supervisor shown in FIG. 7, being comprised of an attribute ID 2001, type ID 2002, and value 2003. FIG. 30 is a diagram illustrating the values of the attributes ID and type ID in the attributes table shown in FIG. 29. Except for the attribute ID 601 (method for downloading supported data), attribute ID 602 (method for uploading supported data), attribute ID 1601 (list of supported formats of form overlay), attribute ID 1602 (maximum number of form overlays), attribute ID 1603 (current number of form overlays), attribute ID 1604 (list of form overlays held), and type ID 160 (form table), all attribute IDs and type IDs are the same as those used in the supervisor attributes table shown in FIG. 7. However, the range of settings and the range of effects are restricted to those under the management of the form overlay manager to which the attributes table belongs. The attribute ID 601 (method for downloading supported data) and attribute ID 602 (method for uploading supported data) are the same as those mentioned in the description of the print job manager and the description of the scan job manager, indicating the method for downloading and the method for uploading supported form overlay data.

(Form Overlay Table)

FIG. 31 represents form overlay table held by the form overlay manager 414. This table is held in the disk 315 as attributes values of the attribute ID 1604 (form overlay table) in the attribute table shown in FIG. 29. This form overlay table represents the types of form overlays which the form overlay manager is currently managing. In the table, each row represents one information unit (record), with the data being comprised of a collection of multiple records. Each record is comprised of a form overlay ID 2101, form overlay data format 2102, form overlay name 2103, and file name 2104 including form overlay data. The form overlay data is stored in the disk 315, and the form overlay ID 2101 serves as an identifier for the form overlay appropriated by the form overlay manager at the time that the form overlay data is downloaded to the RAM 302.

(Log Manager Attributes Table)

FIG. 32 represents data (attributes table) held by the log manager 415 in the disk 315. This table represents a list of logs that the log manager is currently managing. In the table, each row represents one information unit (record), with the data being comprised of a collection of multiple records. The contents of each record are the same as those of the supervisor shown in FIG. 7, being comprised of an attribute ID 2201, type ID 2202, and value 2203. FIG. 33 illustrates the values of the attributes ID and type ID in the attributes table shown in FIG. 32. Except for the attribute ID 602 (method for uploading supported data), attribute ID 1703 (number of logs held), attribute ID 1704 (log table), attribute ID 1705 (log format table), type ID 170 (log table), and type ID 171 (log format table format), all attribute IDs and type IDs are the same as those used in the supervisor attributes table shown in FIG. 7. However, the range of settings and the range of effects are restricted to those under the management of the log manager to which the attributes table belongs.

(Log Table)

FIG. 34 represents a log table held by the log manager 415. This table is held in the disk 315 as attributes values of the attribute ID 1704 (log table) in the attributes table shown in FIG. 32. This table represents the types of logs which the log manager is currently managing. In the table, each row represents one information unit (record), with the data being comprised of a collection of multiple records. Each record is comprised of a log ID 2301 and file name 2302 including log data. The log ID 2301 is a log identifier stipulated to the kind beforehand.

(Contents of Log Data)

FIG. 35 represents the contents of the log data which the log manager manages in the disk 315. The log data is configured of a collection of log records. Each log record is comprised of a log format ID 2401, recorded date-and-time 2402, and log data 2403. The log format ID 2401 makes reference to the log format information recorded in the log format table shown in FIG. 36, and represents the format of the log data 2403. For example, log data "12345, 4, 1.23, 'OK'" of a log format ID 1 means that the user ID which issued the job to the print job manager of the service ID 1 is 12345, the output number of sheets of paper is 4, and the amount of toner used is 1.23, with the completion status of the job being OK.

(Log Format Table)

FIG. 36 represents a log format table held by the log manager 415. This table is held in the disk 315 as attributes values of the attribute ID (log format table) in the attributes table shown in FIG. 32. This log format table represents the formats of logs recorded in the log data which the log manager is currently managing. In the table, each row represents one information unit (record), with the data being comprised of a collection of multiple records. Each record is comprised of a log format ID 2501 and log format 2502. The log format is represented as a list of pairs of service ID and attribute ID. The attribute ID is uniquely defined within the device, and the type thereof is uniquely determined by the attribute ID thereof, so the format of the log data can be represented by specifying the attribute ID. The list of service ID and attribute ID pairs in the log format 2502 and the list of values within the log data 2403 are correlated by order. For example, the third service ID and attribute ID pair in the list of the log format 2502 means the format with the third value in the log data. For example, the format "1:701, 1:565, 1:765, 1:777" of log format ID 1 represents the user ID which issued the job to the print job manager of the service ID 1, the output number of sheets of paper, the amount of toner used, and the completion status of the job. Also, the format "11:701, 11:565, 11:765, 11:777" of log format ID 1 represents the user ID which issued the job to the print job manager of the service ID 11, the output number of sheets of paper, the amount of toner used, and the completion status of the job.

(Color Profile Manager Attributes Table)

FIG. 37 represents data (attributes table) held by the color profile manager 416 in the disk 315. This table represents the color profile formats which the color profile manager can handle, a list of color profiles which the color profile manager is currently managing, and so forth. In the table, each row represents one information unit (record), with the data being comprised of a collection of multiple records. The contents of each record are the same as those of the supervisor shown in FIG. 7, being comprised of an attribute ID 2601, type ID 2602, and value 2603. FIG. 38 is a diagram illustrating the values of the attributes ID and type ID in the attributes table shown in FIG. 37. Except for the attribute ID 601 (method for downloading supported data), attribute ID 602 (method for uploading supported data), attribute ID 1801 (list of supported color profile data formats), attribute ID 1802 (maximum number of color profiles), attribute ID 1803 (current number of color profiles), attribute ID 1804 (color profile table), and type ID 180 (color profile table format), all attribute IDs are the same as those used in the supervisor attributes table shown in FIG. 7. However, the range of settings and the range of effects are restricted to those under the management of the color profile manager to which the attributes table belongs. The attribute ID 601 (method for downloading supported data) and attribute ID 602 (method for uploading supported data) are the same as those mentioned in the description of the print job manager and the description of the scan job manager, indicating the method for downloading and the method for uploading supported color profile data.

(Color Profile Table)

FIG. 39 represents a color profile held by the color profile manager. This table is held in the disk 315 as attributes values of the attribute ID 1804 (color profile table) in the attribute table shown in FIG. 37. This color profile table represents the types of color profiles which the color profile manager is currently managing. In the table, each row represents one information unit (record), with the data being comprised of a collection of multiple records. Each record is comprised of a color profile ID 2701, color profile format 2702, and file name 2703 including color profile data. The color profile ID 2701 serves as an identifier for the color profile appropriated by the color profile manager at the time that the color profile data is downloaded. The color profile data is correction data for correcting the data sent from the scanner engine 102 and the data sent to the ink jet printer engine 105, so as to perform color matching.

(Print Controller Attributes Table)

FIG. 40 represents data (attributes table) held by the print controllers 510, 511, and 512 in the disk 315. This table represents the capabilities and functions of the printer engine and finisher controlled by the printer controllers, and values regarding capabilities and functions cannot be overwritten. In the table, each row represents one information unit (record), with the data being comprised of a collection of multiple records. The contents of each record are the same as those of the supervisor shown in FIG. 7, being comprised of an attribute ID 2801, type ID 2802, and value 2803. FIG. 41 is a diagram illustrating the values of the attributes ID and type ID in the attributes table shown in FIG. 40. Except for the attribute ID 12 (controller type), attribute ID 13 (controller ID), attribute ID 5001 (whether color printing is available), attribute ID 5002 (supported types of finishing), attribute ID 5003 (maximum settable resolution), attribute ID 5004 (minimum settable resolution), attribute ID 5005 (job queue table), and type ID 500 (job queue table format), all attribute IDs and type IDs are the same as those used in the supervisor attributes table shown in FIG. 7. However, the range of settings and the range of effects are restricted to those under the management of the printer controller to which the attributes table belongs. Incidentally, the attributes table of the printer controller shown in FIG. 40 consists of the attributes table with the service ID 21 (i.e., printer controller 510), and the attribute tables for the printer controllers 511 and 512 corresponding to the service IDs 22 and 23 are stored in the disk 315 and are mutually different.

(Job Queue Table)

FIG. 42 represents a job queue table held by all printer controllers. This table is held in the disk 315 as attributes values of the attribute ID 5005 (job queue table) in the attributes table shown in FIG. 40. The job queue table represents the state of the jobs to be managed and executed by the printer controllers. In the table, each row represents one information unit (record), with the data being comprised of a collection of multiple records. Each record is comprised of a job ID 2901, job status 2902, and file name 2903 holding the actual job. The job ID 2901 serves as an identifier for the job appropriated by the printer controller at the time that the job is provided to the printer controller. FIG. 43 is a diagram representing the state of the job status 2902 shown in FIG. 42. Numeral 1 means that the job is in the process of completing, 2 means that the job is being executed at the engine, 3 means waiting, and 4 means that the job is suspended due to an interruption job. The file name 2903 of the job is the file name of the file where the actual job is hold. As shown in FIG. 52, the actual job is comprised of a plurality of sets of attribute ID, attribute value size, and attribute value.

(Job Context Table)

FIG. 85 represents a job context table held by all printer controllers. This table consists of job IDs (1563) issued by the printer controller to printer job managers and copy job managers, file pointers (1564) indicating the position within the provide job file, the remaining number of copies (1565), and the finisher bin ID (1566).

(Scan Controller Attributes Table)

FIG. 44 represents data (attributes table) held by the scan controller 420 in the disk 315. This table represents the capabilities and functions of the scanner engine ;controlled by the scanner controller, and capabilities and functions of the scanner engine cannot be overwritten. In the table, each row represents one information unit (record), with the data being comprised of a collection of multiple records. The contents of each record are the same as those of the supervisor shown in FIG. 7, being comprised of an attribute ID 3001, type ID 3002, and value 3003. FIG. 45 is a diagram illustrating the values of the attributes ID and type ID in the attributes table shown in FIG. 44. Except for the attribute ID 12 (controller type), attribute ID 13 (controller ID), attribute ID 6001 (whether color scanning is available), attribute ID 6002 (maximum original size), attribute ID 6003 (maximum settable resolution), and attribute ID 6004 (minimum settable resolution) all attribute IDs are the same as those used in the supervisor attributes table shown in FIG. 7. However, the range of settings and the range of effects are restricted to those under the management of the printer controller to which the attributes table belongs.

(Command Packet Structure)

Figure 46:
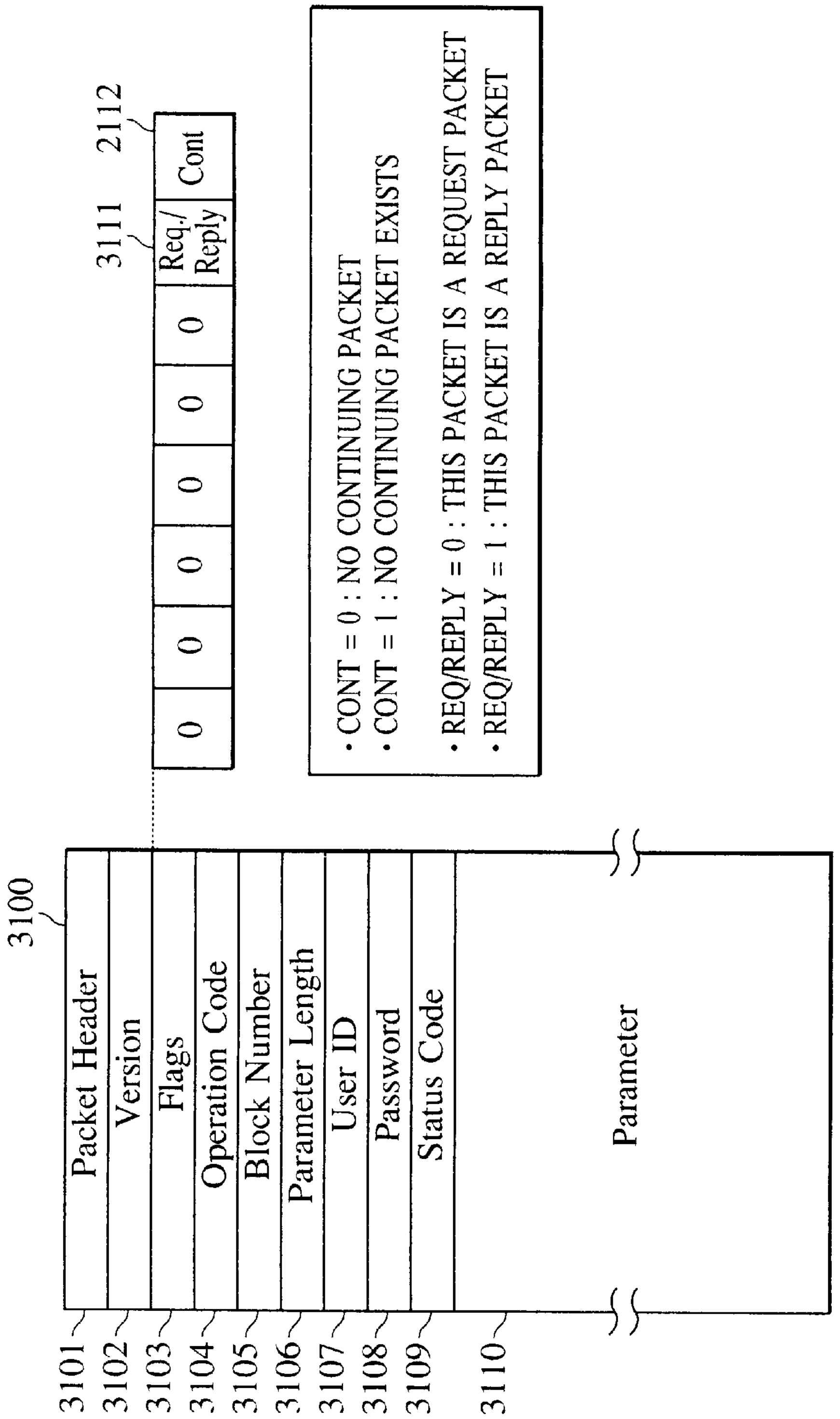
FIG. 46 is a diagram illustrating the structure of a command packet.

FIG. 46 represents the structure of command packets output to the interpreter 409 from the user interface manager 405, TCP/IP-UDP/IP processing module 406, IEEE 1284.4 processing module 407, and SBP-2 processing module 408. The command packet here also represents the structure of reply packets and event packets output from the interpreter 409 to the user interface manager 405, TCP/IP-UDP/IP processing module 406, IEEE 1284.4 processing module 407, and SBP-2 processing module 408. The packets are comprised of a packet header 3101 representing the head of the packet, a packet version 3102 representing the structure version of the packet, a flag 3103 representing the nature of the packet, an operation code 3104 representing what sort of operation is to be performed, a block No. 3105 used by the client (PC) for recognizing reply packets, a parameter length 3106 representing the length of the parameter 3110, a user ID 3107 and password 3108 used for user verification, a status code 3109 used only for reply packets and representing a general state for replying, and parameters 3110 having a format determined by each operator code 3105. The parameters 3110 include the ID of the service to be accessed, the attribute ID to be accessed, and so forth. There are two types of flags 3104; 3111 which means that the packet is a command packet, event packet, or a reply packet, and a continuation flag 3112 which means that the data to be sent did not all fit into the parameters 3110, and the subsequent packet will contain continuing data. The length of the parameters 3110 is restricted to the length represented by the parameter length 3106 (i.e., 64 Kbytes). Specifically, the client PCs 202 and 203 connected to the Ethernet 208 specify the IP address and port No. to connect to the multi-functional peripheral device 201, and output IP packet data to the Network Interface 305 (107). The client PC 204 connected to the IEEE 1394 interface 206 specifies the node ID and LUN (logical unit number) to connect to the multi-functional peripheral device 201, and outputs SBP-2 packet data to the IEEE 1394 interface 306 (108). The client PC 205 connected to the IEEE 1284 interface 207 specifies the socket No. to connect to the multi-functional peripheral device 201, and outputs IEEE 1284.4 packet data to the IEEE 1284 interface 307 (109). Transport packets comprised of the command packets shown in FIG. 46 having an IP header, 1284 header, and 1394 header to the heads thereof by a network interface driver 402, IEEE 1284 interface driver 403, and IEEE 1394 interface driver 404 respectively, are output to the TCP/IP-UDP/IP processing module 406, IEEE 1284.4 processing module 407, and SBP-2 processing module 408. The TCP/IP-UDP/IP processing module 406, IEEE 1284.4 processing module 407, and SBP-2 processing module 408 process the input transport packets, extract the command packets shown in FIG. 46, and output these to the interpreter/generator 409.

(Processing Command Packets)

Figure 47:
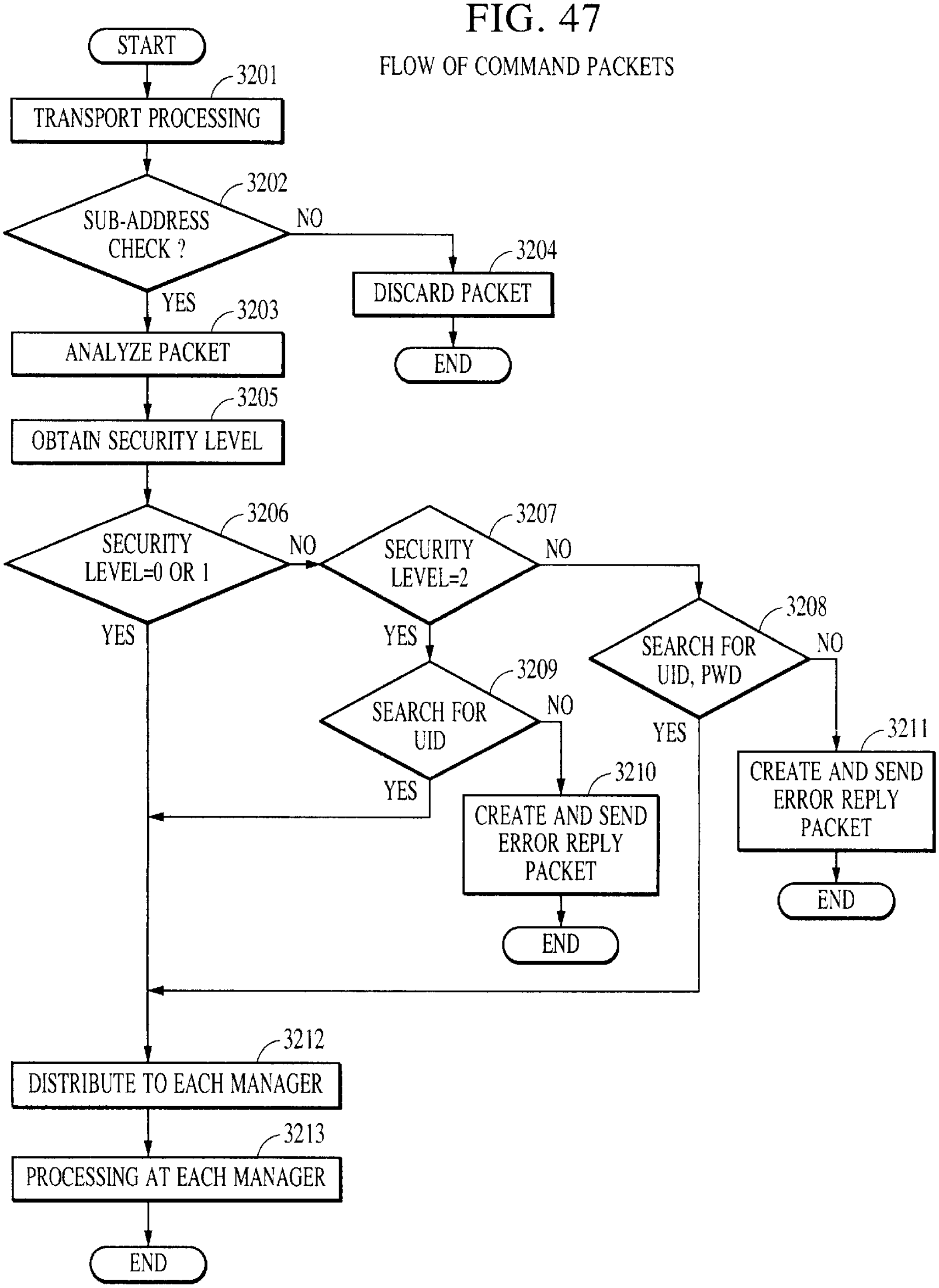
FIG. 47 is a flowchart illustrating processing of command packets.

FIG. 47 represents the flow for processing command packets with the multi-functional peripheral device 201. In step 3201, the data input from the interfaces 401, 402, 403, and 404 is processed by the transport processing modules 405, 406, 407, and 408, and the command packets in FIG. 46 are extracted. The extracted command packets are input to the interpreter 409 from the TCP/IP-UDP/IP processing module 406, IEEE 1284.4 processing module 407, and SBP-2 processing module 408, along with connection type information with data input (connection format ID) and a sub-address. In step 3202, the interpreter 409 makes reference to the sub-address/service ID correlation table (FIG. 9) held by the supervisor 410, and compares the input connection format ID with the sub-address, thereby obtaining the service ID and also checking whether or not the data input is valid. In the event that the check shows that the data input is not valid, the command packet is discarded in step 3204, and the flow ends. In the event that the data input is valid, analysis of the command packet is performed in step 3203 based on the packet structure shown in FIG. 46. As a result of the packet analysis, all items shown in FIG. 46 are output as independent and individual pieces of information. In step 3205, the security level corresponding to the service ID is obtained by making reference to the access control table (FIG. 14) based on the service ID.

In step 3206, the flow checks whether the security level obtained in step 3205 is 0 or 1. In the event that the security level is 0 or 1, input is made to the dispatcher 412 without performing a security level check at the security gate 411. In step 3206, in the event that the security level is other than 0 or 1, the flow checks in step 3207 whether the security level obtained is 2. In the event that the security level is 2, the flow checks in step 3209 whether or not the user ID contained in the command packet exists within the user verification table (FIG. 13). In the event that the user ID is not contained therein, error reply information is generated in step 3210 since the user ID has no authority, a packet is generated by the interpreter 409 (i.e., error information is embedded in the status code 3109), which is sent to the original sender of the command packet. In the event that a user ID is contained therein, input is made to the dispatcher 412. The address of the original sender is extracted from the header of the transport packet. In step 3207, in the event that the security level is other than 2, a check is made in step 3208 regarding whether the user ID/password pair contained in the command packet exists in the user verification table (FIG. 13). In the event that the user ID/password pair is not contained therein, error reply information is generated in step 3211 since the user ID has no authority, a packet is generated by the interpreter 409, which is sent to the original sender of the command packet. In the event that the user ID is contained therein, input is made to the dispatcher 412. In step 3212, the dispatcher 412 determines the manager to which to distribute to based on the service ID, and distributes to the manager decided upon the following: the connection format ID with data input, the sub-address, the address of the original sender, operation code, block no., flag information, user ID, password, parameter length, and parameters (including the above-described job managing setting information, i.e., job execution priority, job specification execution time, job remaining limit time). Then, in step 3213, the managers process this information.

(Processing Access to the Attributes Tables)

Figure 48:
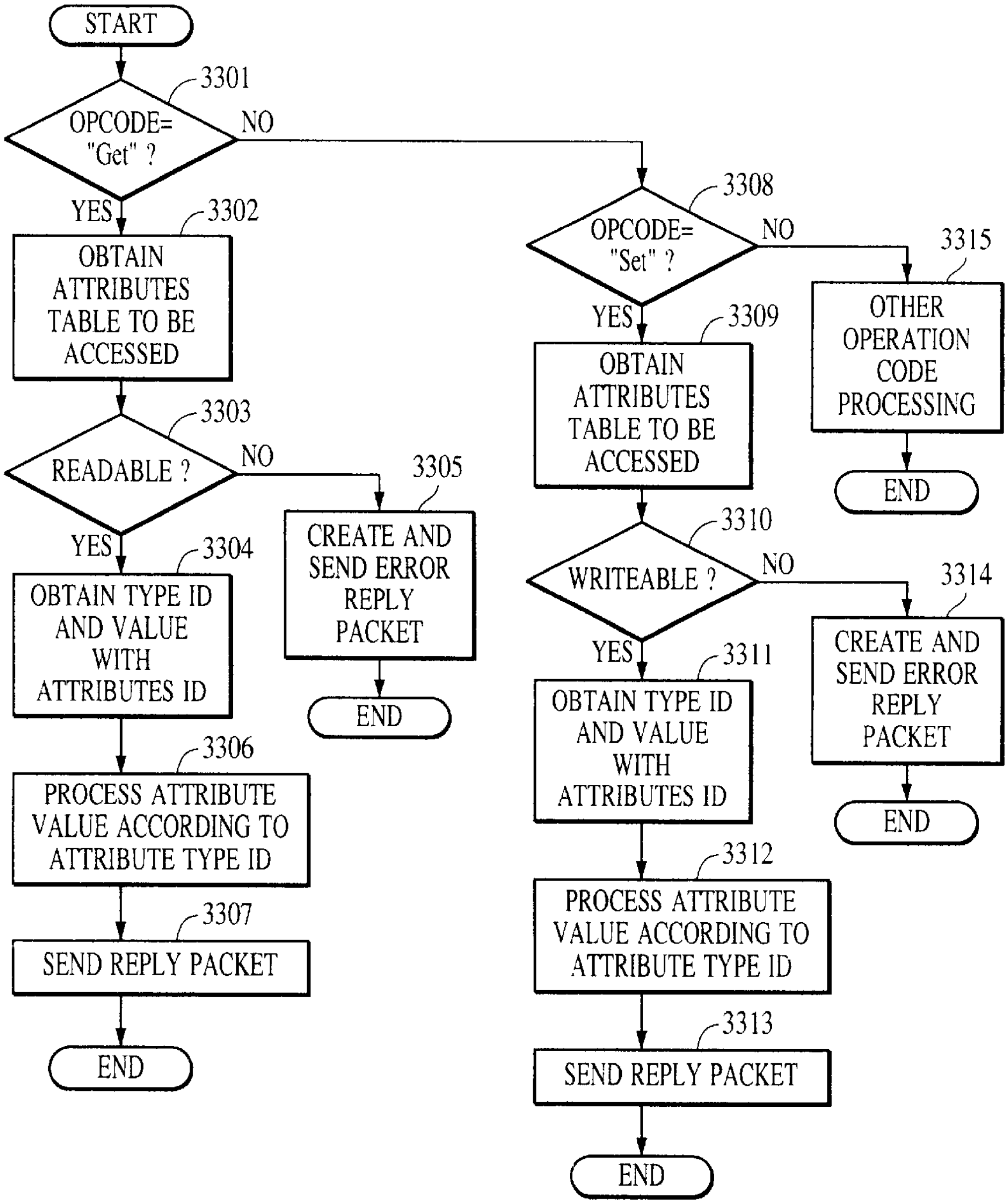
FIG. 48 is a flowchart illustrating access processing for attribute tables.

FIG. 48 represents the processing performed in the event that a client instructs reading/writing to attribute tables of the managers and controllers of the multi-functional peripheral device 201. Reading from and writing to the attribute tables held by the managers and controllers is performed by sending an appropriate command packet to a sub-address held by the supervisor. The attributes table reading command packet contains the ID of the service to be accessed and the ID of the attributes to be accessed, as the parameters thereof. The attributes table writing command packet contains the ID of the service to be accessed, the ID of the attributes to be accessed, and an attributes value corresponding to the attribute ID, as the parameters thereof. The packet data sent from the client to the multi-functional peripheral device 201 is processed by the flow shown in FIG. 47, and is distributed to the supervisor. In step 3301, the flow checks whether the operation code 3104 is "get", which is the attributes value reading code. In the event that the operation code is "get", the entire attributes table to be accessed is obtained in step 3301, based on the service ID. In the event that the service ID is 0, the attributes table of the supervisor 410 shown in FIG. 7 is obtained; in the event that the service ID is 1, 2, 3, 4, 5, 6, 7, 8, or 9, the attributes table of the print job manager shown in FIG. 18 is obtained; in the event that the service ID is 10, the attributes table of the scan job manager 419 shown in FIG. 22 is obtained; in the event that the service ID is 11, 12, 13, 14, 15, 16, 17, or 18, the attributes table of the copy job manager shown in FIG. 24 is obtained; in the event that the service ID is 101, the attributes table of the font manager 413 shown in FIG. 26 is obtained; in the event that the service ID is 102, the attributes table of the form overlay manager 414 shown in FIG. 29 is obtained; in the event that the service ID is 103, the attributes table of the log manager 415 shown in FIG. 32 is obtained; in the event that the service ID is 104, the attributes table of the color profile manager 416 shown in FIG. 37 is obtained; in the event that the service ID is 21, 22, or 23, the attributes table of the printer controller shown in FIG. 40 is obtained; and in the event that the service ID is 24, the attributes table of the scanner controller 420 shown in FIG. 44 is obtained. Incidentally, the attributes table of the print job manager shown in FIG. 18 is the attributes table with the service ID 4 (print job manager 504), and the attributes of the print job managers 501, 502, 503, 505, 506, 507, 508, and 509 corresponding to the service IDs 1, 2, 3, 5, 6, 7, 8, and 9, are stored in the disk 315. In the same way, the attributes table of the copy job manager shown in FIG. 24 is the attributes table with the service ID 18 (copy job manager 608), and the attributes of the copy job managers 601, 602, 603, 604, 605, 606, and 607, corresponding to the service IDs 11, 12, 13, 14, 15, 16, and 17, are stored in the disk 315. Further, in the same way, the attributes table of the printer controller shown in FIG. 40 is the attributes table with the service ID 21 (printer controller 510), and the attributes of the printer controllers 511 and 512, corresponding to the service IDs 22 and 23, are stored in the disk 315.

Subsequently, in step 3303, an inspection is performed regarding whether the specified attribute values are obtainable or not. This inspection is performed by obtaining the values of the "Attributes ID list which only administrator can obtain" (attribute ID=105) for the attribute table in interest, and checking whether the specified attribute ID is contained therein or not. In the event that the attribute ID is contained therein, the value cannot be obtained, so an error reply packet is created at step 3305, which is then sent, and the flow ends. In the event that the attribute ID is not contained therein, the attributes table is searched based on the attribute ID specified in step 3304, and the type ID and attribute value of the attribute ID at interest is obtained. In step 3306, a reply packet is generated based on the type ID, which is sent in step 3307, and the flow ends. In the event that the operation code is not "Get" in step 3301, and in step 3308 the flow checks whether or not the operation code is the attribute value writing code "Set". In the event that the operation code is "Set", the entire attributes table to be accessed is obtained in step 3309, based on the service ID. Subsequently, in step 3310, an inspection is made regarding whether the specified attribute values can be set or not. This inspection is performed by obtaining the values of the "Attributes ID list which only administrator can set" (attribute ID=104) for the attribute table in interest, and checking whether the specified attribute ID is contained therein or not. In the event that the attribute ID is contained therein, the value cannot be obtained, so an error reply packet is created at step 3314, which is sent and the flow ends. In the event that the attribute ID is not contained therein, the attributes table is searched based on the attribute ID specified in step 3311, and the type ID and attribute value of the attribute ID at interest is obtained. In step 3312, the attribute value specified based on the type ID is set, and a reply packet is generated to notify that the setting was successful. In step 3313, this reply packet is sent, and the flow ends. In the event that the operation code is not "Set" in step 3308, another later-described processing step 3315 is performed according to the operation code, and the flow ends.

(Processing Service ID List Inquiries)

Figure 49:
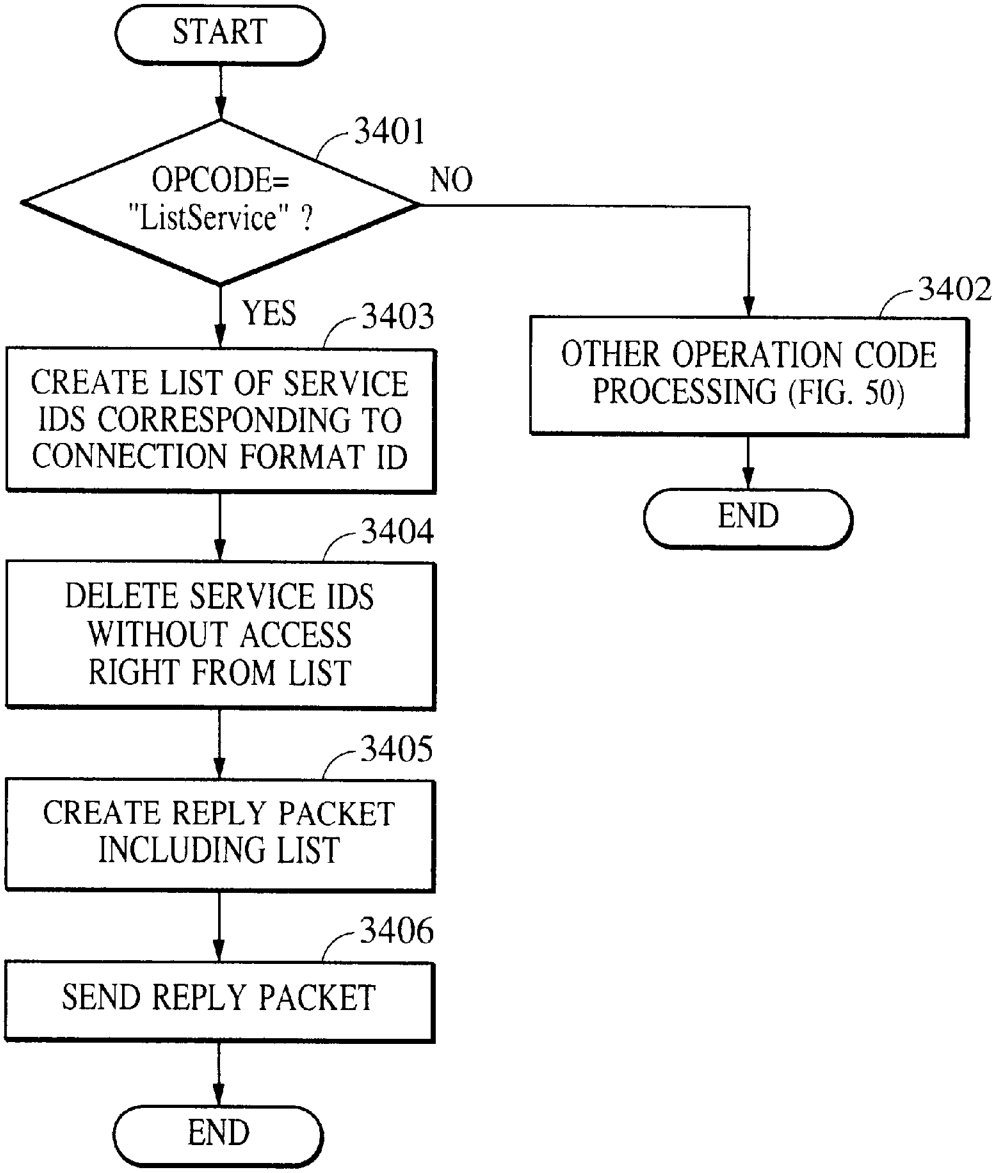
FIG. 49 is a flowchart illustrating service ID inquiry processing.

FIG. 49 represents the processing performed in the event that a client inquires for a list of the services provided by the multi-functional peripheral device 201 (i.e., a service ID list). Inquiring for a list of the services is performed by sending an appropriate command packet to a sub-address held by the supervisor, and reading and processing the sub-address/service ID correlation table shown in FIG. 9. The flow shown in FIG. 49 is a detailed flow for step 3315 (processing of other operation code) shown in FIG. 48. In step 3401, the flow checks whether or not the operation code is the service list obtaining code "list service". In the event that the operation code is not "list service", another later-described processing step 3402 according to the operation code is performed, and the flow ends. In step 3401, in the event that the operation code is "list service", only the items in the sub-address/service ID correlation table which match the connection format ID used for the inquiry are extracted therefrom, and a list thereof is created in step 3403. In step 3404, each record in the list created in step 3403 is inspected, and in the event that the valid flag 804 is valid and there is a value in the valid user list 805, the records that do not match the user ID used for the inquiry are deleted from the list, and in the event that there is a value in the invalid user list 806, the records that match the user ID used for the inquiry are deleted from the list. In step 3405, a reply packet containing the list of service IDs updated in step 3404 is created, and the created reply packet is set in step 3406.

(Processing Sub-address Inquiries)

Figure 50:
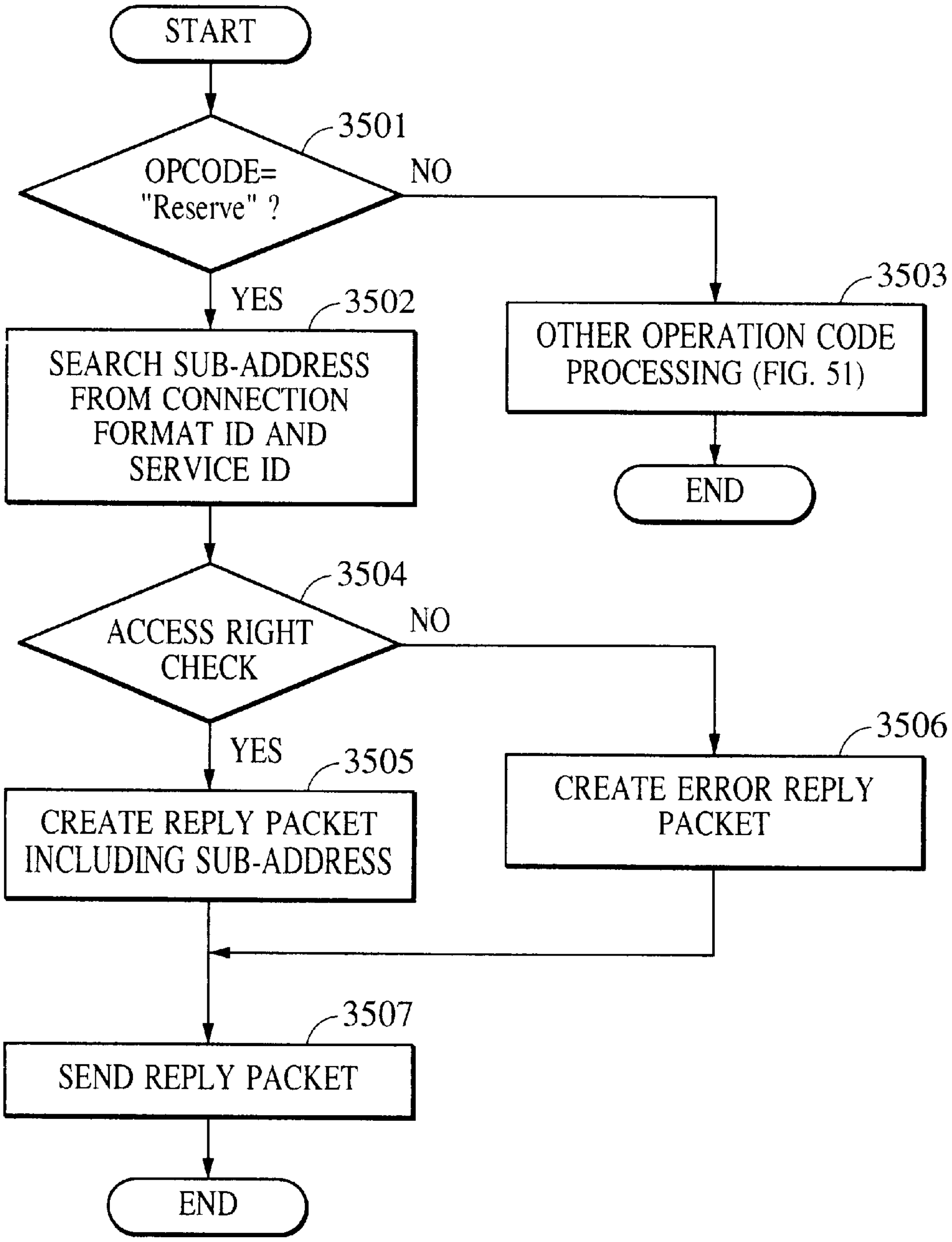
FIG. 50 is a flowchart of sub-address inquiry processing.

FIG. 50 represents the processing performed in the event that a client specifies a service ID to inquire for sub-address information necessary when using the services provided by the multi-functional peripheral device 201. Inquiring for sub-addresses is performed by sending an appropriate command packet to a sub-address held by the supervisor 410, and reading and processing the sub-address/service ID correlation table shown in FIG. 9. The sub-address inquiry command packet has a service ID as a parameter thereof. The flow shown in FIG. 50 is a detailed flow for step 3402 (processing of other operation code) shown in FIG. 49. In step 3501, the flow checks whether or not the operation code is the sub-address obtaining code "Reserve". In the event that the operation code is not "Reserve", another later-described processing step 3503 according to the operation code is performed, and the flow ends. In step 3501, in the event that the operation code is "Reserve", in step 3502, the sub-address/service ID correlation table is scanned using the connection format ID used for the inquiry and the service ID specified in the parameters, searching for the record at interest. In step 3404, a check is made regarding the record searched, whether the valid flag is set to valid, whether or not there is the user ID used for the inquiry in the list in the event that there is a value in the valid user list, and whether or not the user ID used for the inquiry is not in the list in the event that there is a value in the invalid user list. In the event that any of these do not yield an OK as a result of the check, the user is judged to not have access authority (usage rights) to the specified service, so an error reply packet is created in step 3506, and this packet is sent in step 3507 and the flow ends. In the event that all of these yield an OK as a result of the check, a reply packet containing the sub-address is created in step 3505, and this packet is sent in step 3507 and the flow ends.

(Processing Service ID Inquiries With Task Type Specified)

Figure 51:
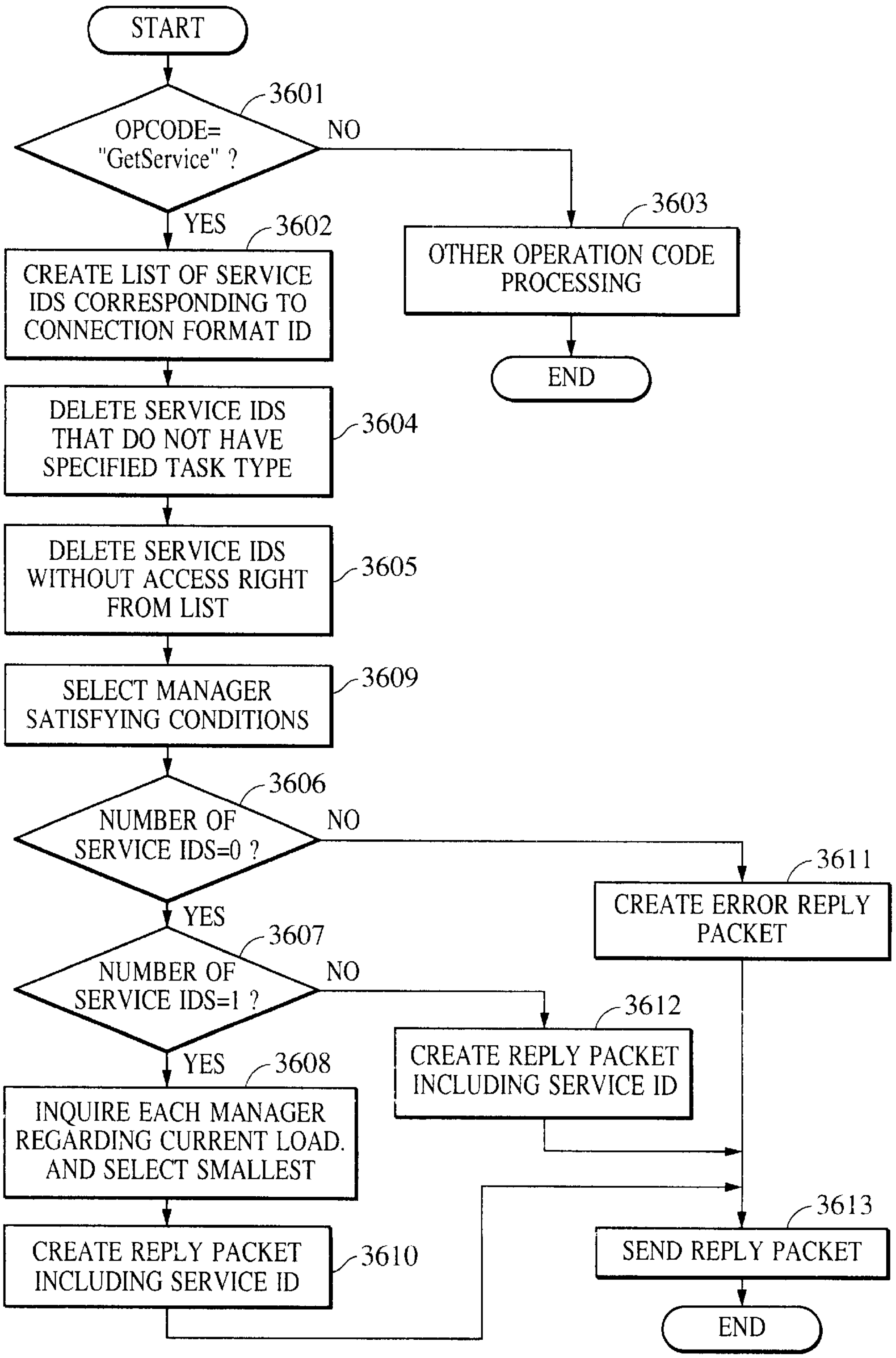
FIG. 51 is a flowchart illustrating service ID list inquiry processing with a specified task type.

FIG. 51 represents the processing flow performed in the event that a client specifies a service kind to inquire for service ID optimal for processing a certain type of service, out of all the services provided by the multi-functional peripheral device 201. Inquiring service ID with the service type specified is performed by sending an appropriate command packet to a sub-address held by the supervisor, and reading and processing the sub-address/service ID correlation table shown in FIG. 9 and the service ID/task type correlation table shown in FIG. 11. The sub-address ID inquiry command packet has a task type for specifying the kind of service, and combinations for restricting the service (conditions information) as parameters thereof. The conditions information is represented as a list of attribute ID/value pairs. The flow shown in FIG. 51 is a detailed flow for step 3503 (processing of other operation code) shown in FIG. 50. In step 3601, the flow checks whether or not the operation code is the sub-address obtaining code "Get Service". In the event that the operation code is not "Get Service", another later-described processing step 3603 according to the operation code is performed, and the flow ends. In the event that the operation code is "Get Service" in step 3601, a list of service IDs having the connection format ID used for inquiry is compiled from the connection format ID used for inquiry and the sub-address/service ID correlation table in step 3602. In step 3604, reference is made to the service ID/task type correlation table, and a list is made of the items in the above list which have the specified task type. In step 3605, each record in the list created in step 3604 is inspected, and in the event that the valid flag 804 is valid and there is a value in the valid user list 805, the records wherein the user ID used for the inquiry do not match that value are deleted from the list, and in the event that there is a value in the invalid user list 806, the records wherein the user ID used for the inquiry match that value are deleted from the list. In step 3609, the conditions information contained in the parameters and the attributes table of the managers corresponding to the service IDs in the lest are compared, and all except the values which match the conditions are deleted from the list. In step 3606, the number of records in the list changed in step 3605 is checked, and in the event that the number is 0 (zero), an error reply packet to the effect that the requested service does not exist is created in step 3611, which is sent in step 3613, and the flow ends. In step 3606, in the event that the number is other than 0 (zero), the number of records in the list is checked in step 3607 whether the number is 1 or not. In the event that the number is 1, a reply packet containing the service ID obtained is created in step 3612, and the replay packet is sent in step 3613 and the flow ends. In the event that the number is other than 1 in step 3607, an inquiry is made in step 3608 to the managers corresponding to the service IDs in the list, regarding the current load status. The managers each return the number of jobs being processed as the current load status, and the manager having the smallest load is selected. In step 3610, a reply packet containing the service ID corresponding to the selected manager is created, the reply packet is sent in step 3613, and the flow ends.

(Job Structure)

FIG. 52 illustrates the internal structure of a file (job file) holding the actual job to be managed by the managers. The file name of the job file is held in the file name 1502 of the job table (FIG. 20). Also, this file structure also indicates the internal structure of the file holding the actual job to be managed by the controllers. This file name is held in the file name 2903 of the job queue table (FIG. 42). The actual job is represented as a sequence of a plurality of sets comprised of an attribute ID 3701, attribute value size 3702, and attribute value 3703. In the event that the job contains data, as shown by 3707, 3708, and 3709, values representing data as attribute IDs, file name sizes as attribute values, and the file names of files holding document data as attribute values are held therein. Included in the attributes are: the method for sending data, data format (PDL used, etc.), an event kind and information of the destination to send the event notification to in the event that the event occurs and so forth, and information dependent on the kind of job, e.g., in the case of a print job, the number of copies, specifications for the finishing process, specifications for the font to be used, specifications for the form overlay to be used, job execution priority which is job management setting information, specified job execution time, job remaining limit time, and so forth.

(Processing Job Script With the Managers)

Figure 53:
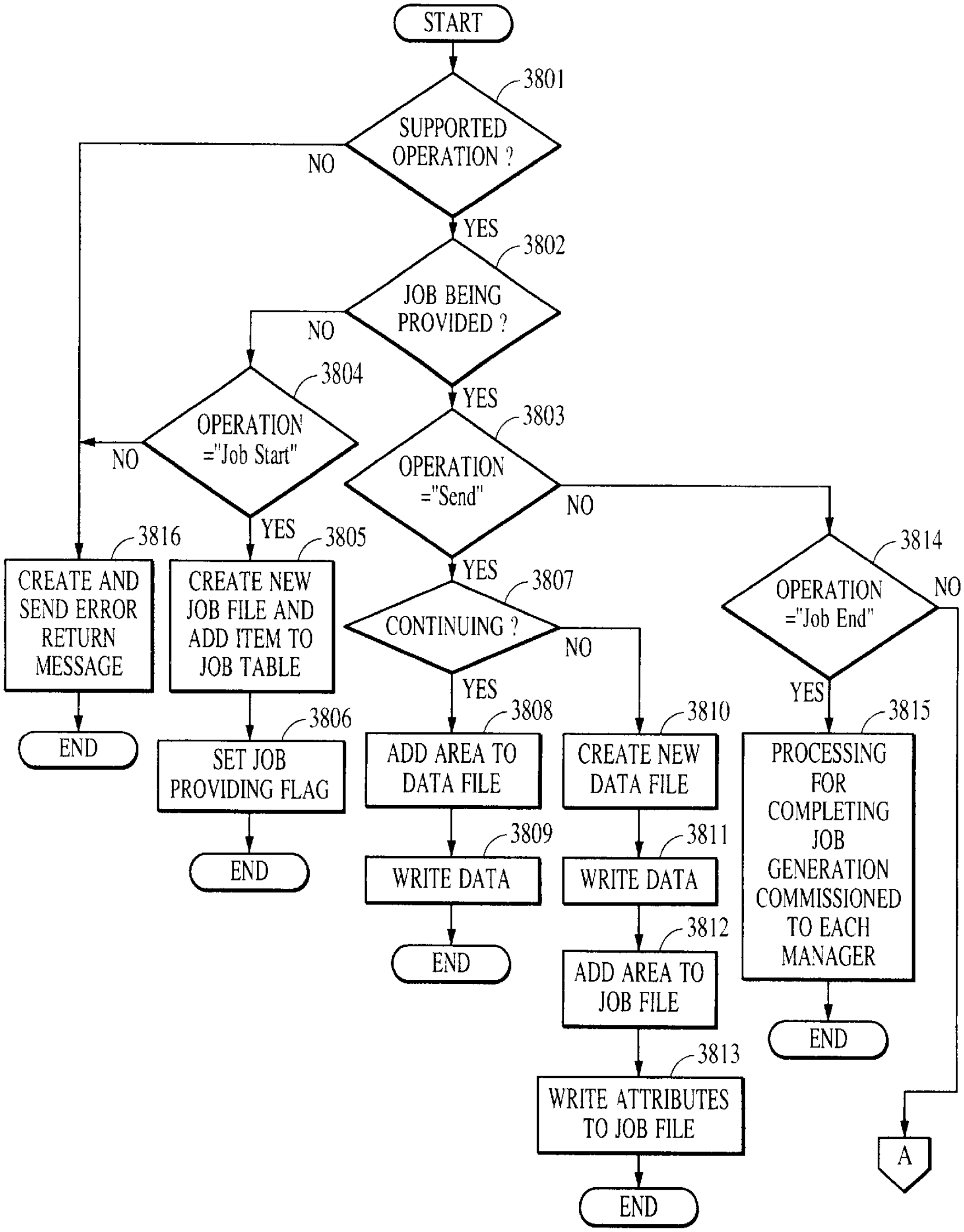
FIG. 53 is a flowchart of job script processing with each manager.
Figure 54:
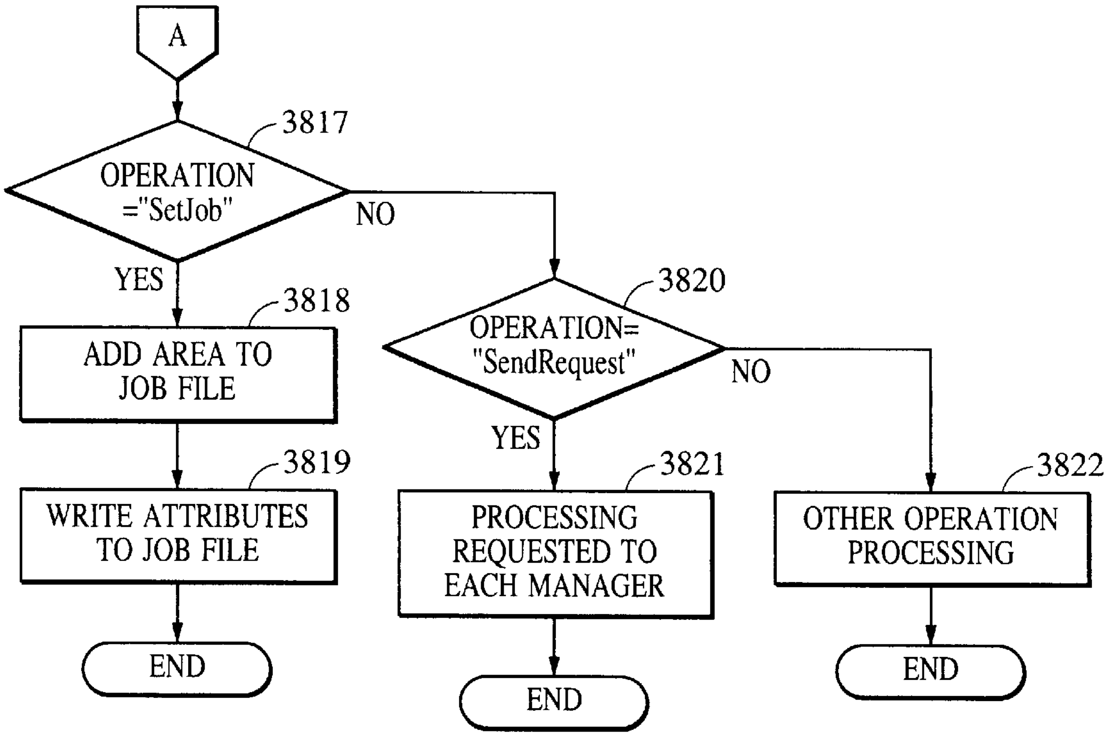
FIG. 54 is another flowchart of job script processing with each manager.

FIGS. 53 and 54 represent the processing flow for job script in the managers. A job script is made up of a continuation of command packets shown in FIG. 46, stipulated as starting with a "Job start" operation code and ending with a "Job end" operation code. The packets making up the job script are provided to the sub-addressees indicated by the sub-address/service ID correlation table shown in FIG. 9, and distributed to the managers by the command packet processing flow shown in FIG. 47. The processing flow shown in FIG. 53 is a processing flow processing the command packets distributed to the managers and creating the job file and data file shown in FIG. 52. The operations distributed to the managers are subjected to a check regarding whether or not the operation codes are supported operation codes, in step 3801. This check is carried out by comparing with the value of the "supported operations" attribute (attribute ID 101) which each of the managers holds within the attributes table. In the event that the check shows that an operation is unsupported, an error replay packet is created in step 3816, which is sent, and the flow ends. In the event that the check shows that the operation code in step 3801 is supported, a check is made in step 3802 regarding whether or not the job is being provided. This check is carried out by inspecting whether or not the job providing flag (the flat set in step 3806) stored in a certain area of the RAM 302 is true. The default setting for this job providing flag is false. Then, in the event that the job providing flag is shown to be false by the inspection, meaning that the job is not being provided, a check is made in step 3804 whether or not the operation code is "Job start". In the event that the check shows that the operation code is not "Job start", an error replay packet is created in step 3816, which is sent, and the flow ends.

In the event that the results of the check in step 3804 are OK, a job ID is appropriated in step 3805 and the item is added to the job table (FIG. 20) based on the parameters (job execution priority, execution start time, remaining limit time) which are job start operation options, and a new job file is created in the disk 315. As described earlier, the specified execution time and remaining limit time are specified in relative time or absolute time, but in the event that the specified execution time and remaining limit time are specified in relative time, an absolute time is calculated in step 3805 by the CPU 301 based on the current time and the specified relative time, which is registered in the job table shown in FIG. 20. Then, in step 3806, the job providing flag is set to true, and the command packet processing is completed. In the event that the job providing flag is true in the check in step 3802, a check is made in step 3803 whether or not the operation code is "Send". The operation code "Send" instructs the managers that data comprising the job is contained in the parameters. In the event that the operation code is "Send" in step 3803, the continuation flag input along with the commands in step 3807 is checked, and in the event that the continuation flag is true, a new area is added to the already-existing data file 3713 in step 3808, and the parameters are written to that area in step 3809 and the flow ends. In the event that the job providing flag is false in step 3807, a new data file 3713 is created in the disk 315 in step 3810, and the parameters are written to that data file in step 3811. Subsequently, in step 3812, area is added to the job file, and in step 3813, attribute ID 3707 which represents data and the size of the file name 3708 of the newly-created file are written to this area, and the flow ends. In the event that the operation code is not "send" in step 3803, a check is made in step 3814 whether or not the operation code is "Job end". In the event that the operation code is "Job end", a process for completing the generation of the job is performed in step 3815, and the flow ends. This process for completing the generation of the job includes processes such as closing the job file, and differs according to the kind of manager (print job, scan job, copy job, font, form overlay, log, and color profile).

In step 3814, in the event that the operation code is not "Job end", a check is made in step 3817 whether or not the operation code is "Set job". The operation code "Set job" instructs the managers that attributes (attribute ID and attribute value) making up a job are contained in the parameters. In the event that the job operation code is "Set job", an area is added to the job file in step 3818, and in step 3819, attribute ID, attribute value size and attribute value are written to this newly-added area, and the flow ends.

In step 3817, in the event that the job operation code is not "Set job", a check is made in step 3820 whether or not the job operation code is "Send request". The job operation code "Send request" instructs sending of data to the managers, and the method of sending data is included as a parameter thereof. In the event that the job operation code is "Send request", the processing commissioned to the managers is executed in step 3821 and the flow ends. This processing in step 3821 consists of: in the case of a scan job manager, instructing the scanner controller to scan the original according to the attribute values held in the job file; sending the obtained data according to the specified method; or in the case of a font manager, includes immediately sending the font data specified as the attribute value in the job file by the specified sending method, and so forth. In step 3820, in the event that the operation code is not "Send request" in step 3822, processing of other operation codes is performed and the flow ends.

(Job Processing With the Print Job Manager (1): From Reception of Job Data to Registration to the Job Scheduling Table)

Figure 55:
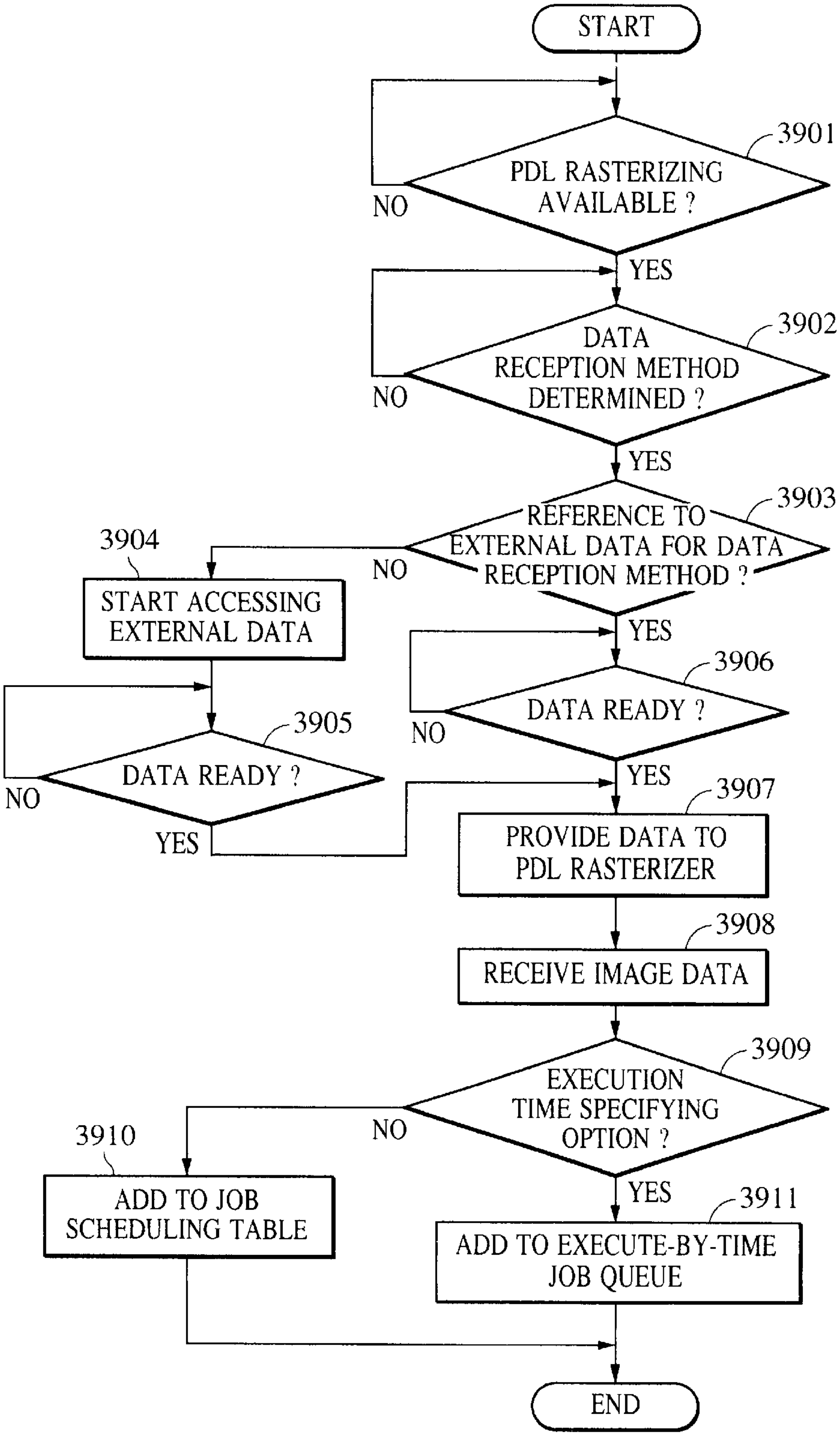
FIG. 55 is a flowchart of job processing with a print job manager.

FIG. 55 represents a part of the job processing flow of the print job managers 501 through 509 and 513 shown in FIG. 5, the portion from reception of job data to registration of the job to the job scheduling table or the execute-by-time job queue table. The print job manager performs the job script processing flow shown in FIG. 54 and the "Job Start" operation code is input, whereby a new item is added to the job table in step 3805, following which the CPU 301 executes the processing flow shown in FIG. 55. In step 3901, the flow waits for an attribute indicating the kind of PDL (Page Description Language) used for expressing the data (document data) to be added to the job file, and once the kind of PDL is determined, the flow waits for the PDL rasterizer (PDL rasterizer 417 or PDL rasterizer 418) to be used to become available. Once the PDL rasterizer becomes available in step 3901, the flow waits in step 3902 for attributes indicating the method for receiving data to be added into the job file. Once the attribute indicating the method for receiving data is added into the job file, a check is made in step 3903 regarding the data reception method. In the event that the data reception method is a method for accessing externally from the multi-functional peripheral device MFP 201 (e.g., a client PC on the network or the like), a task for reading specified data is generated in step 3904, and external access is carried out. Then, in step 3905, the flow waits for data reading to start. In step 3903, in the event that the data is contained in the job (a case wherein data is received by the "Send" operation code in FIG. 54), the flow waits in step 3906 for data reception to start. At the point that the data reading or reception is started in step 3905 or 3906, providing of the data to the PDL rasterizer is started in step 3907. Then, in step 3908, the image data is received from the PDL rasterizer. In step 3909, judgment is made from the job table shown in FIG. 20, regarding whether or not the specified execution time option has been specified for this job. In the event that this has been specified, the job is linked to the execute-by-time job queue table shown in FIG. 84, not the job scheduling table shown in FIG. 83 (step 3911). At this time, judgment is also made from the job table shown in FIG. 20 regarding whether or not the remaining limit time has been specified as well, and in the event that this has been specified, the specified execution time and the remaining limit time are compared, and in the event that a contradictory setting has been made such as the latter being greater (later time-wise) than the former, the job is not registered to a table but is discarded. Also, in step 3090, in the event that the specified execution time option is not specified, the job is linked to the tail end of the execution priority specified in the job scheduling table, in step 3910. In the event that the execution priority is not specified at the time of providing the job, a default priority 3 (lowest priority) is provided thereto.

(Job Processing With the Print Job Manager (2): Registration to the Job Scheduling Table From the Execute-by-time Job Queue Table)

Figure 86:
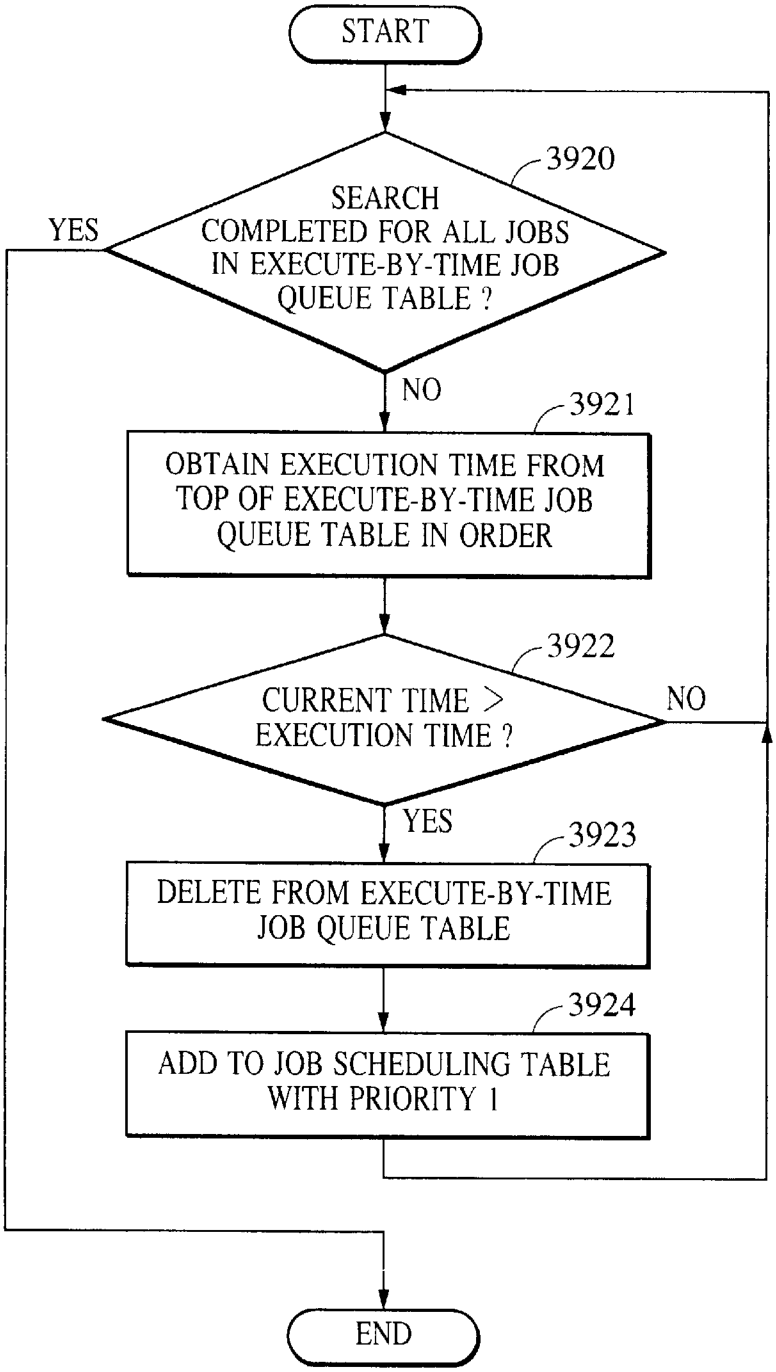
FIG. 86 is a diagram illustrating job processing (2) with the print job manager.

The print job manager periodically runs a task for monitoring the execute-by-time job queue table (hereafter referred to as an execution time monitoring task), which detects that the execution time specified for a job within the table has arrived, and performs registration to the job scheduling table. FIG. 86 shows the processing of the execution time monitoring task. In step 3920, a check is made whether a search for all jobs linked to the execute-by-time job queue table has been completed. In the event that the check has been completed, the process ends. In the event that the search for all linked jobs is not completed, the next job is traced from the link in step 3921 and the execution time thereof is obtained. The processing performed in step 3921 starts the search from the job at the top in the table and updates a pointer indicating the job being searched for each time the flow loops, so a job searched once is not searched again. In step 3921, the obtained specified execution time of the job is compared with the current time. In the event that the specified execution time has exceeded the current time, the job should be executed, so the job is deleted from the link in step 3923, and then is added to the job scheduling table in step 3924 with a priority of 1. This processing continues until the executing time is compared with the current time for all of the jobs in the execute-by-time job queue table. Once comparison is completed for all jobs, the execution time monitoring task quits, but is activated a cycles sufficiently short to monitor the passage of time.

(Job Processing With the Print Job Manager (3): From the Job Scheduling Table to Completion of Execution)

Figure 61:
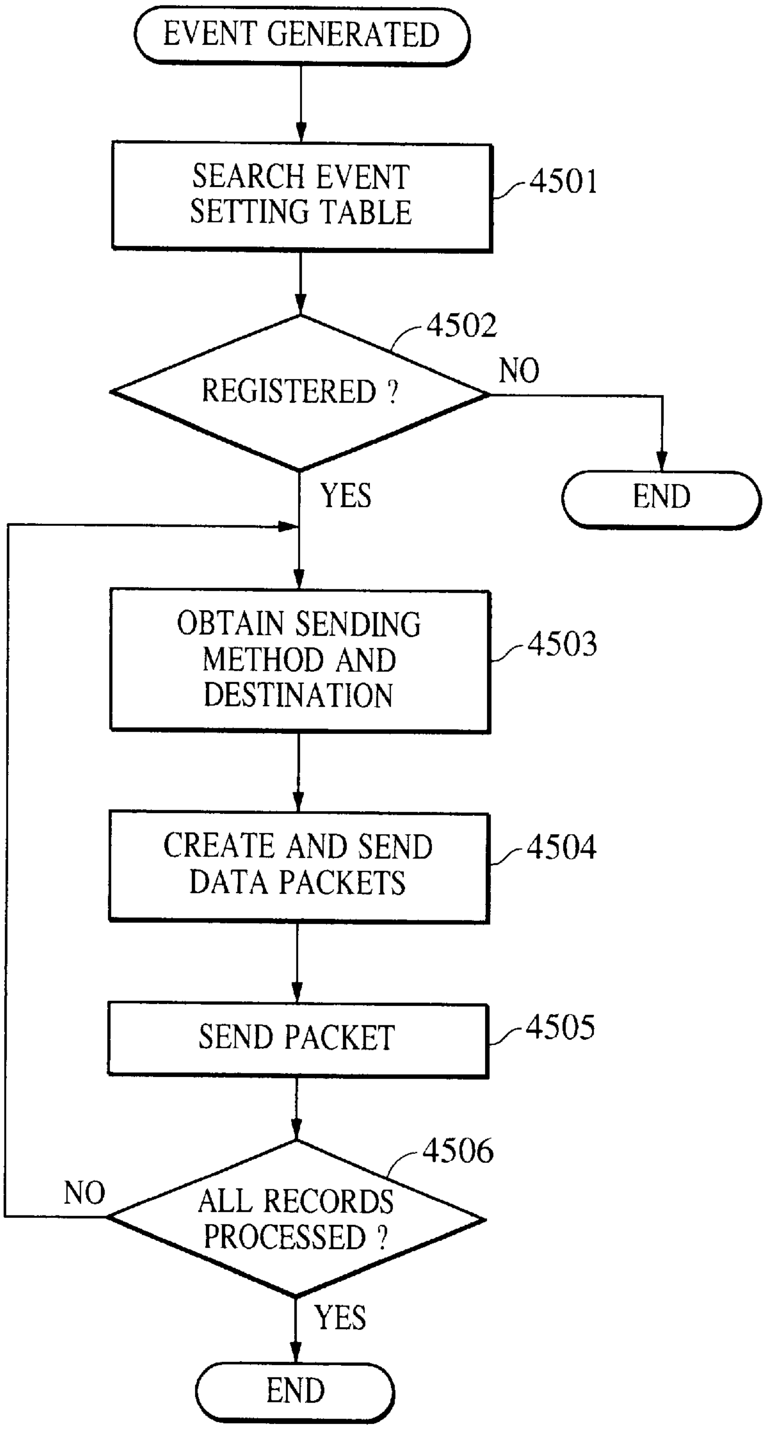
FIG. 61 is a flowchart of event sending.
Figure 87:
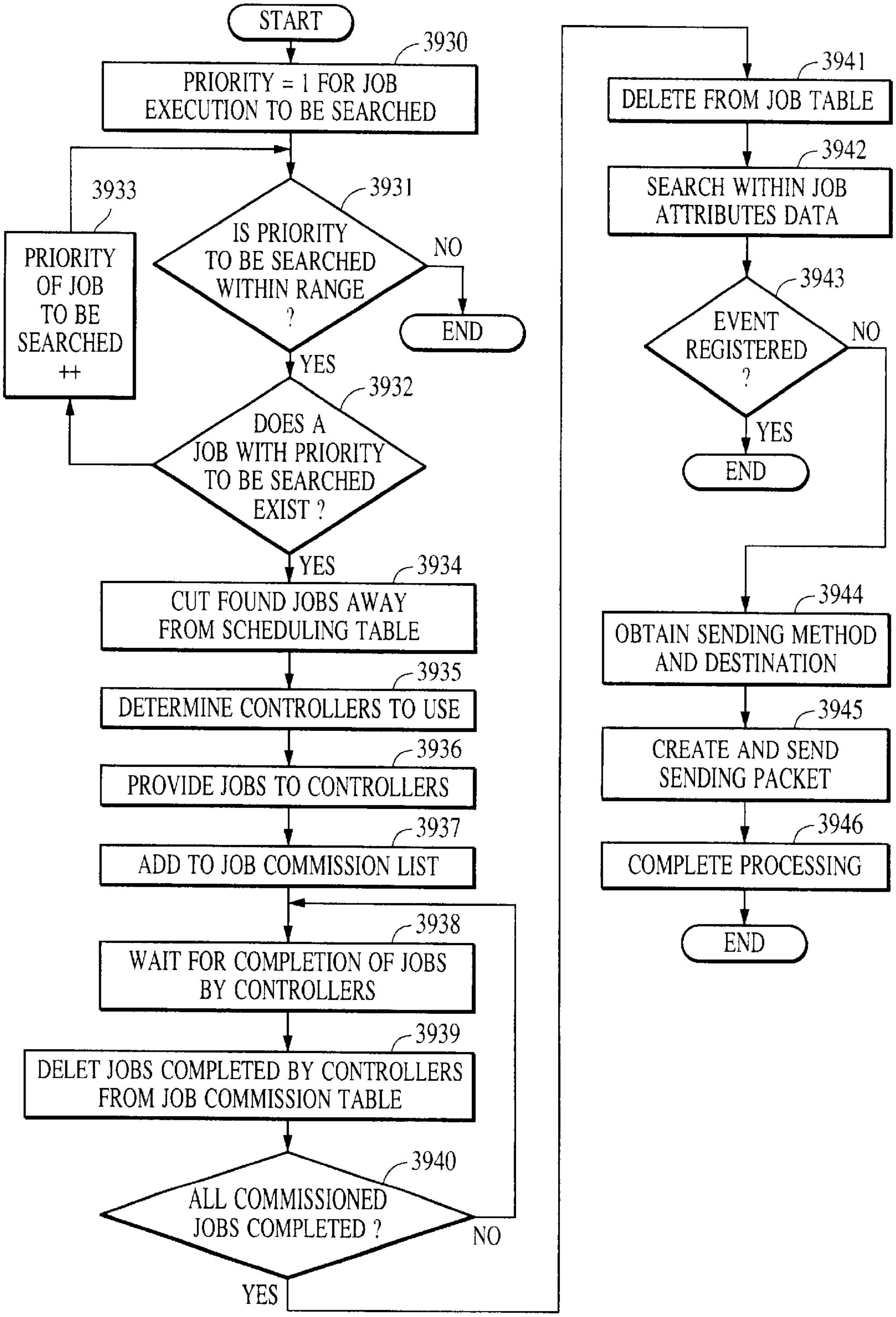
FIG. 87 is a diagram illustrating job processing (3) with the print job manager.

The print job manager periodically runs a task for monitoring the job scheduling table (hereafter referred to as a job scheduler task), which detects that a new job has been added to the table, or that the priority of a job has been changed, and takes the job which should be executed next from the job scheduling table and provides the job to the printer controller as shown in FIG. 87. The job scheduler task performs a process of extracting the jobs with the highest priority and which are at the head of the linking, out of the jobs registered (linked) to the job scheduling table, with the processing performed in steps 3930 through 3932, as shown in FIG. 87. Specifically, with the object of searching the job scheduling table of the print job manager in step 3930 as priority 1, a check is made in step 3931 whether or not the range of the range of priority which is the object of searching is within the range of priority in the job scheduling table (with the present embodiment, the range of priority is from 1 to 3). In the event that this is outside of the range, this means that there are no registered jobs in the table waiting for execution, so the flow ends. Step 3932 is a process for searching for jobs linked at the head, of jobs linked at a certain priority. In the event that none exist, in step 3933, the priority object of searching is incremented, the flow returns to step 3931, and the search is repeated. In the event that a job is found in step 3932, this determines that the job should be provided to the print controller. In step 3934, the detected job is deleted from the table, and in step 3935 the print controller to provide the job to is selected. There are different ways in which this is performed, one being the case wherein the print controller has already been determined by the attributes ID 2001 of the attribute table of the print job managers 501 through 507 and 509 and 513 (controller ID list for executing jobs), and the other is the case wherein "true" is specified for the attribute ID 2002 of the print job manager 508 (whether automatic selection of the controller is available or not) and the printer controller necessary for printing is dynamically determined by reading the contents of the print job file (the attribute I and attributes values of the job file shown in FIG. 52). In this case, for example, a specification of color printing with the attribute ID and attribute values within the job file will determine using the ink-jet controller 512 (CID 23), and in the event that usage of the finisher is specified by the attribute ID and attribute values, the LBP controller 510 (CID 21) is determined. In step 3936, the job extracted in step 3934 is provided to the one or multiple selected print controller(s). Following providing the job, the job ID, the print controller ID, and the job ID received from the print controllers are added to the job request table of the print job manager as a record, in step 3937. Subsequently, the print job manager waits in step 3938 for the job to be completed by the print controller, and when completion of the job is notified from the printer controller, the correlating record is deleted from the job request table in step 3939. In step 3940, a check is made whether all jobs requested to the print controllers have ended, and in the event that there are jobs remaining in the print controller, the flow returns to step 3938 and waits for the jobs to end at the printer controllers. In step 3940, in the event that all requested jobs at the printer controller have ended, the job records are deleted from the job table (FIG. 20) in step 3941. At this time, the event sending processing shown in FIG. 61 is performed. In step 3942, the inside of the job file is inspected, and a check is made in step 3943 regarding whether or not there is an attribute value instruction sending of an event relating to job completion. In the event that such does not exist, the flow ends, but in the event that such an instruction does exist, the flow obtains the sending method and sending destination by reading the attribute values in step 3944. In step 3945 a sending packet is created for the event, and the event is sent by the specified sending method to the specified destination. In step 3946, completion processing such as deleting job and data files is performed, thereby ending the processing of the job.

(Job Processing With the Print Job Manager (4): Deleting a Job With a Remaining Limit Time Specified)

Figure 88:
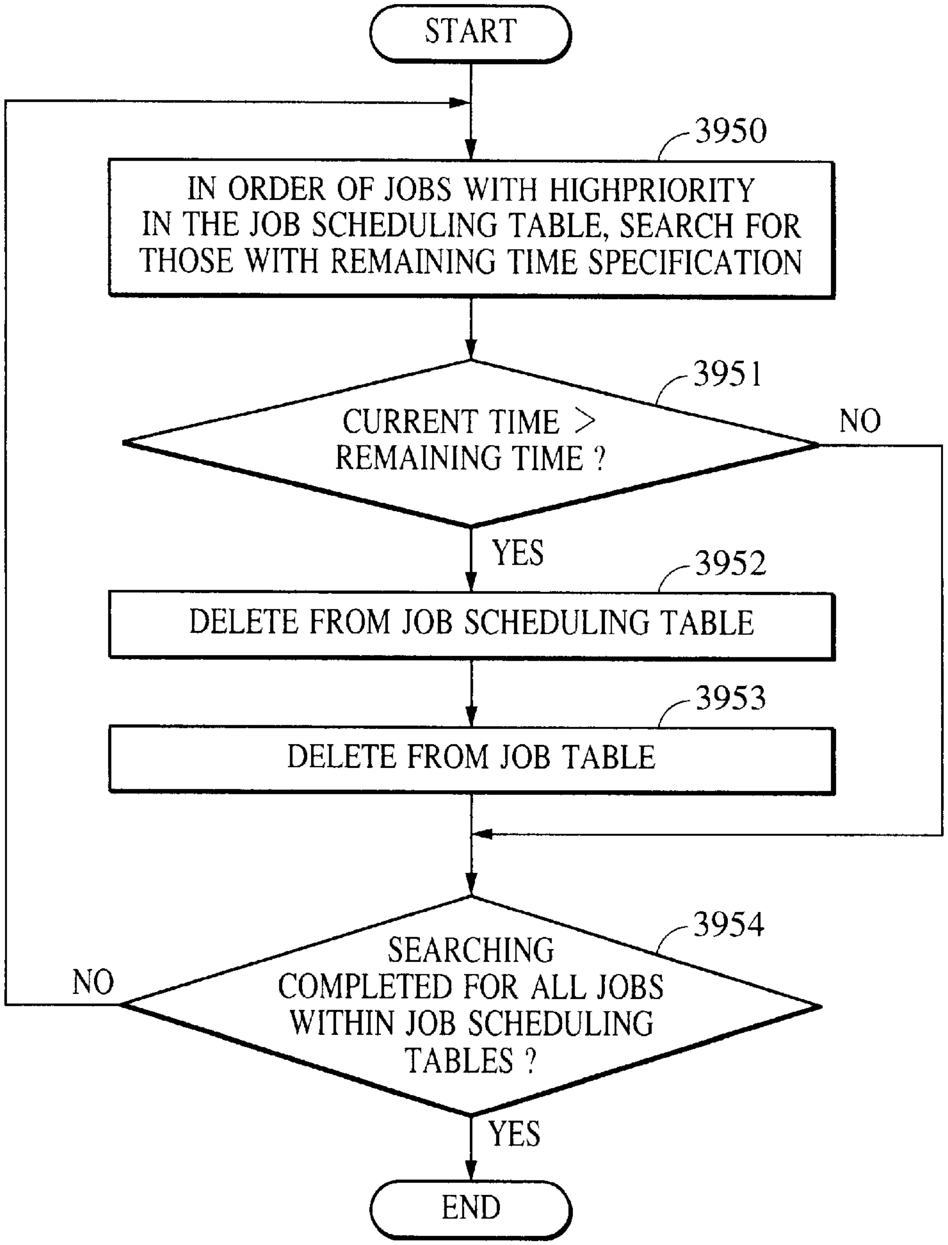
FIG. 88 is a diagram illustrating job processing (4) with the print job manager.

A remaining limit time may be specified as a parameter to one job table of the attribute table of the print job manager at the time of providing the job. This is an attribute to be specified in the event that a substantial amount of time is required from the time of providing the job to the time of execution, but the user does not want to leave the job in the device in an unexecuted state, due to considerations such as secrecy. That is, the print manager periodically checks jobs with this remaining limit time specified, and in the event that the limit time has elapsed and the job is unexecuted, the print manager deletes the job. Unexecuted jobs exist in the job scheduling table, execute-by-time job queue, or in the job queue of the print controllers, but with the present embodiment, comparison is made with the current time only for jobs with the remaining limit time specified that are in the registered job scheduling table, so as to delete such jobs from the table in the event that the limit has been exceeded. The print job manager periodically activates a task (remaining monitoring task) for realizing such functions. FIG. 88 is a processing flow of this remaining monitoring task. In step 3950, a search is made for jobs with the remaining limit time specified, starting from the jobs with the highest execution priority in the job scheduling table, and the time set in those with the remaining limit time specified is compared with the current time (step 3951). In the event that a job with a time exceeding the limit is found in this comparison, the job is deleted from the table in step 3952, and is also deleted from the job table in the corresponding print job manager in the subsequent step 3953. This processing is performed for all jobs in the job scheduling table, and then the remaining monitoring task quits itself. The print job manager sets the system so that the remaining monitoring task is activated again after a certain amount of time elapses.

(Job Processing With the Interruption Print Job Manager)

Figures 89, 89A:
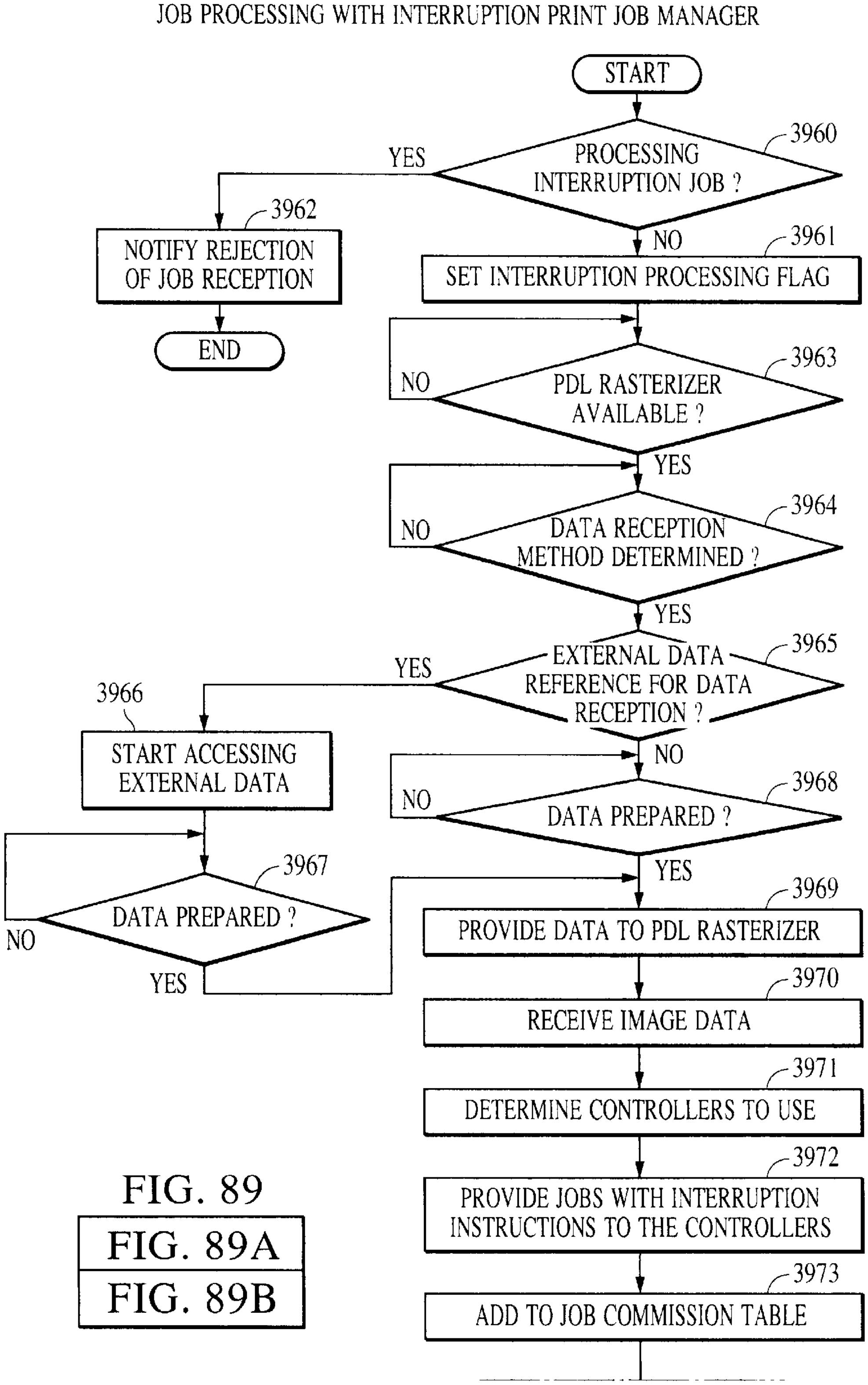
FIG. 89 is a diagram illustrating job processing with the interruption print job manager.
Figure 89B:
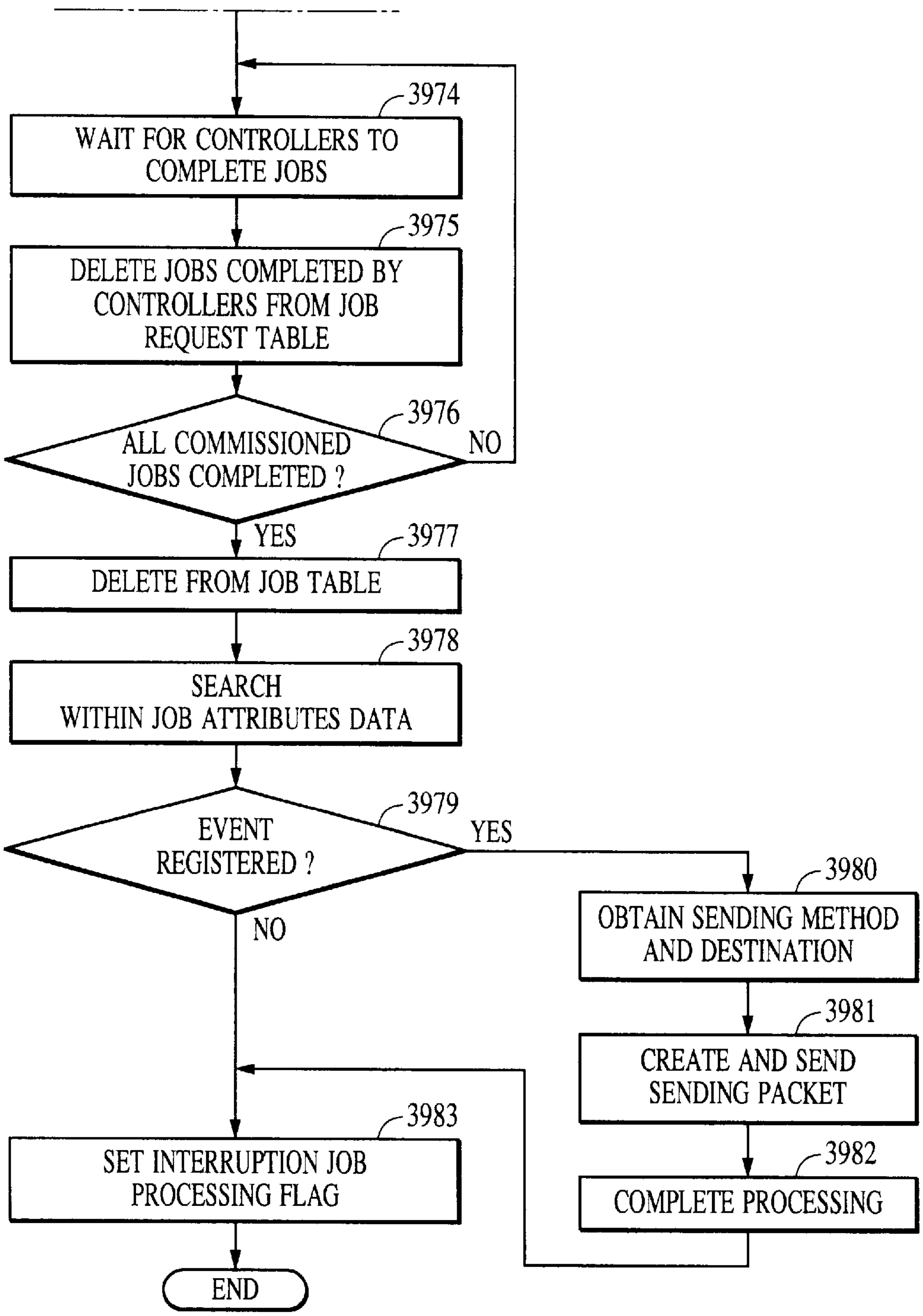

Of the print job managers, the one which can process interruption jobs is called the interruption print job manager in particular. Reference numeral 513 in FIG. 5 denotes the interruption print job manager. This can be understood from the fact that the print job manager 513 has a service ID of 19, and further that the task type is 11 from FIG. 11, and FIG. 12 shows that task type 11 is interruption printing. As with the other print managers, the interruption print job manager follows the job script processing flow shown in FIG. 54, and in the event that a providead job is added to the job table, performs the processing shown in FIG. 89. First, in step 3960, a check is made regarding whether or not an interruption job process is already underway. The interruption print job manager does not permit multiple interruption jobs to be provided. Accordingly, in the event that interruption processing is being performed, a return value refusing acceptance of the job is written to a command packet in step 3962, which is returned to the originator, and the flow ends. In the event that interruption processing is not being performed, the interruption processing flag is set in step 3961, so as to prevent multiple interruption jobs. Steps 3963 through 3970 perform the identical processes as the job processing with the normal print job managers shown in steps 3901 through 3908, thereby receiving image data, as shown in FIG. 55. In step 3971, the job is not registered to the job scheduling table or execute-by-time job table, and is processed without consideration of such. In step 3971, the print controller to use is determined, and in step 3972, the selected print controller is provided with the job and interruption instructions. Normal print job managers do not provide interruption instructions when providing a job to the print controller. This is the greatest difference between the interruption print job manager and the normal print job managers. The subsequent steps 3973 through 3982 are the same as the normal print job manager processing steps 3937 through 3946 shown in FIG. 87. The interruption flag is cleared in the last step 3983 following completion of the job, and the flow ends.

(Job Processing With the Print Controller)

FIG. 90 shows the job processing flow of the print controller. The print controller receives jobs from the print job manager or copy manager and starts the processing thereof. At the time of processing, the print controller runs a task for monitoring change in the job queue, and this task extracts one job linked to the job queue, and performs a job request to the print engine, thereby processing the job. Request of the job to the print engine is provided in units which the print engine can process (normally units of pages), and is executed under handshake between the print engine and print controller. Once all of the jobs linked to the job queue have been processed, the task waits for a new job to be provided. Now, execution mode specifications are provided as a parameter at the time of providing a job to a print controller. There are two kinds of execution modes, the execute-by-order mode and the interruption execution mode. Only the print job manager 513 and the interruption copy manager 609 provide jobs with the interruption execution mode specified. In step 6001 of FIG. 90, a check is performed of the execution mode which is a parameter for providing the job. In the event that interruption execution is not specified, the job is added to the job queue of the print controller in step 6010. In the event that interruption execution is specified, an inspection is made in step 6002 whether another interruption job is being processed or not. This can be found by checking the interruption job execution flag in the print controller. An interruption job execution flag is set in step 6003, so as to block multiple processing of other interruption jobs. In step 6004, the context (See FIG. 85) of the job being currently executed in the print engine is saved to a context saving area within the disk 315, and at the same time the task handshaking with the print engine is suspended. Then, in step 6005, the context is initialized for the interruption job. In step 6006, the job is divided into units to be processed by the print engine, and thus provided to the print engine. When one provided unit is completed, the print controller updates the context, and this is repeated until the interruption job is completed (step 6007). Once execution of the interruption job is completed, in step 6008, the saved context of the job which was interrupted is restored from the saving area, and the suspended task is resumed, and further, in step 6009, the interruption job execution flag is cleared.

Then, the resumed task resumes the job which was interrupted partway through. During this time, the print engine and the handshaking task do not notice that the job has been interrupted. In the event that another interruption job is being executed in step 6002, an error reply packet is created in step 6011, and the packet is sent to the originator of the packet, thereby ending the flow.

(Job Processing With the Scan Job Manager)

Figure 56:
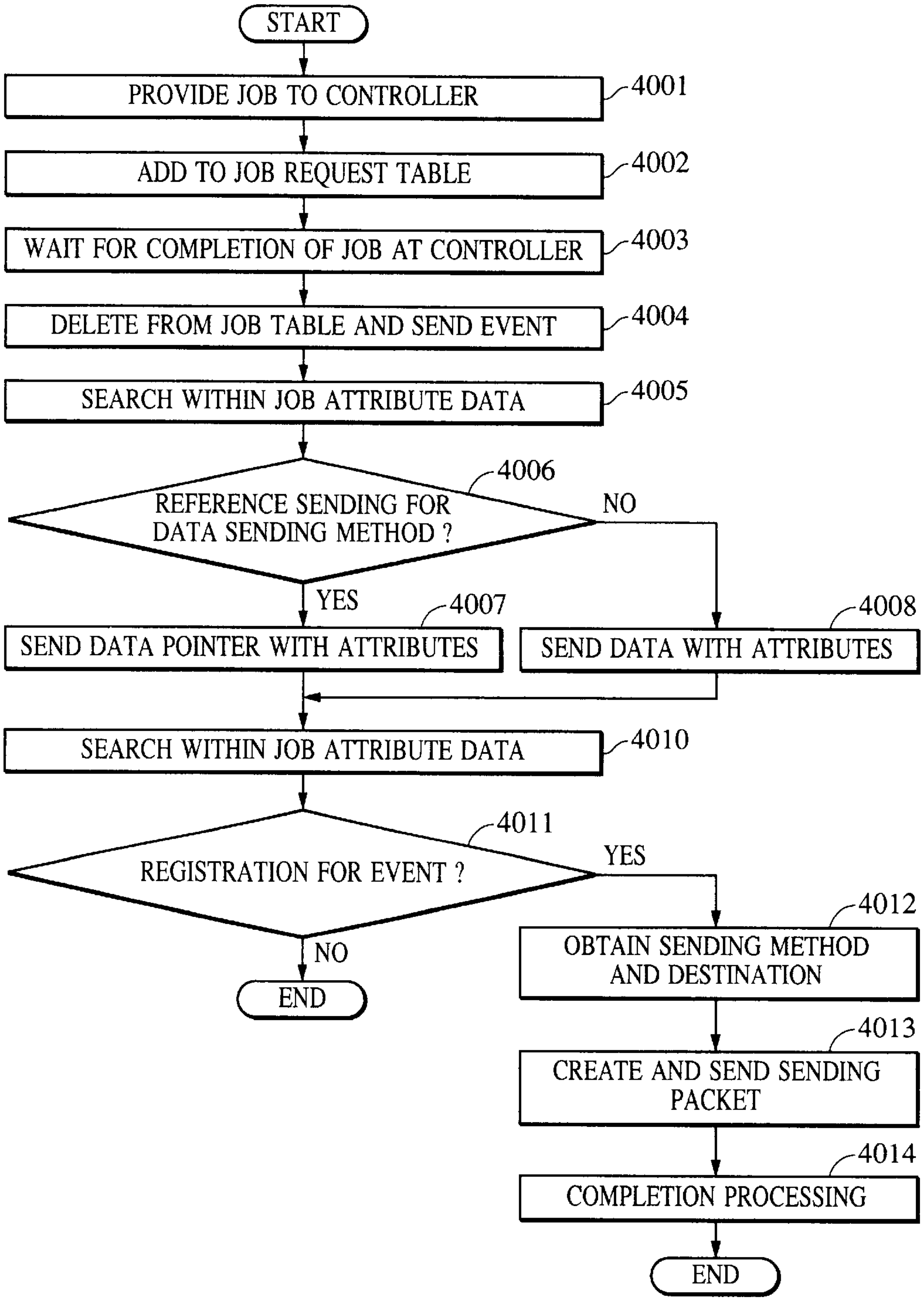
FIG. 56 is a flowchart of job processing with a scan job manager.
Figure 62:
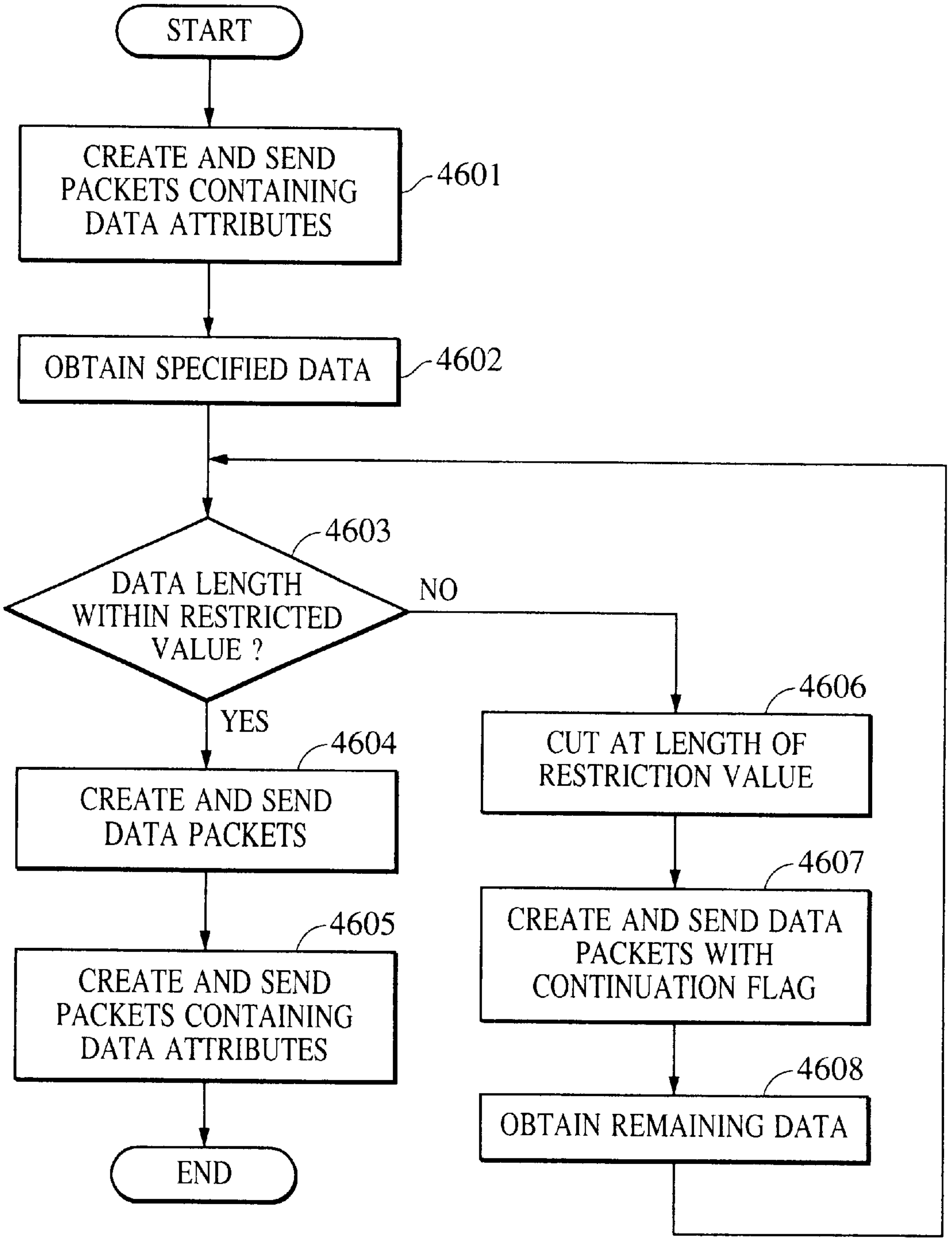
FIG. 62 is a flowchart of sending data (script) from equipment.

FIG. 56 represents the job processing flow with the scan job manager 419. The scan job manager starts processing of the job after the job is provided. Accordingly, the job manager starts the job processing in FIG. 56 as the job completing processing in step 3815 in FIG. 54. In step 4001, the job is provided to the scanner controller 420 and a job ID is received. In step 4002, the job ID, scanner controller ID, and the job ID received from the scanner controller 420, are recorded to the job request table (FIG. 21). In step 4003, job completion from the scanner controller 420 is waited for, and at the time that job completion is notified from the scanner controller 420, the scanned image data is received from the scanner controller 420, and the record of the job is deleted from the job commission table (FIG. 20) in step 4004. At this time, the event sending processing shown in FIG. 61 is performed. In step 4005, the job attributes are searched for one which specifies the method of sending data. In step 4006, in the event that the method of sending data specifies sending data as script, the data is sent as script along with other attributes information in step 4008. Details of the data sending process from the device are shown in FIG. 62. In step 4006, in the event that the instructions are to send by referring to data, the data is saved within the device in step 4007, and reference information corresponding thereof is sent along with other attributes information as script. In step 4010, the inside of the job file is inspected, and a check is made in step 4011 regarding whether or not there is an attribute value instructing sending of an event relating to job completion. In the event that such does not exist, the flow ends, but in the event that such an instruction does exist, the flow obtains the sending method and sending destination by reading the attribute values in step 4012. In step 4013 a sending packet is created for the event, and the event is sent by the specified sending method to the specified destination. In step 4014, completion processing such as deleting job and data files is performed, thereby ending the processing of the job.

(Job Processing With the Copy Job Manager (1): From Request of Scan Job to Registration to the Job Scheduling Table)

Figure 57:
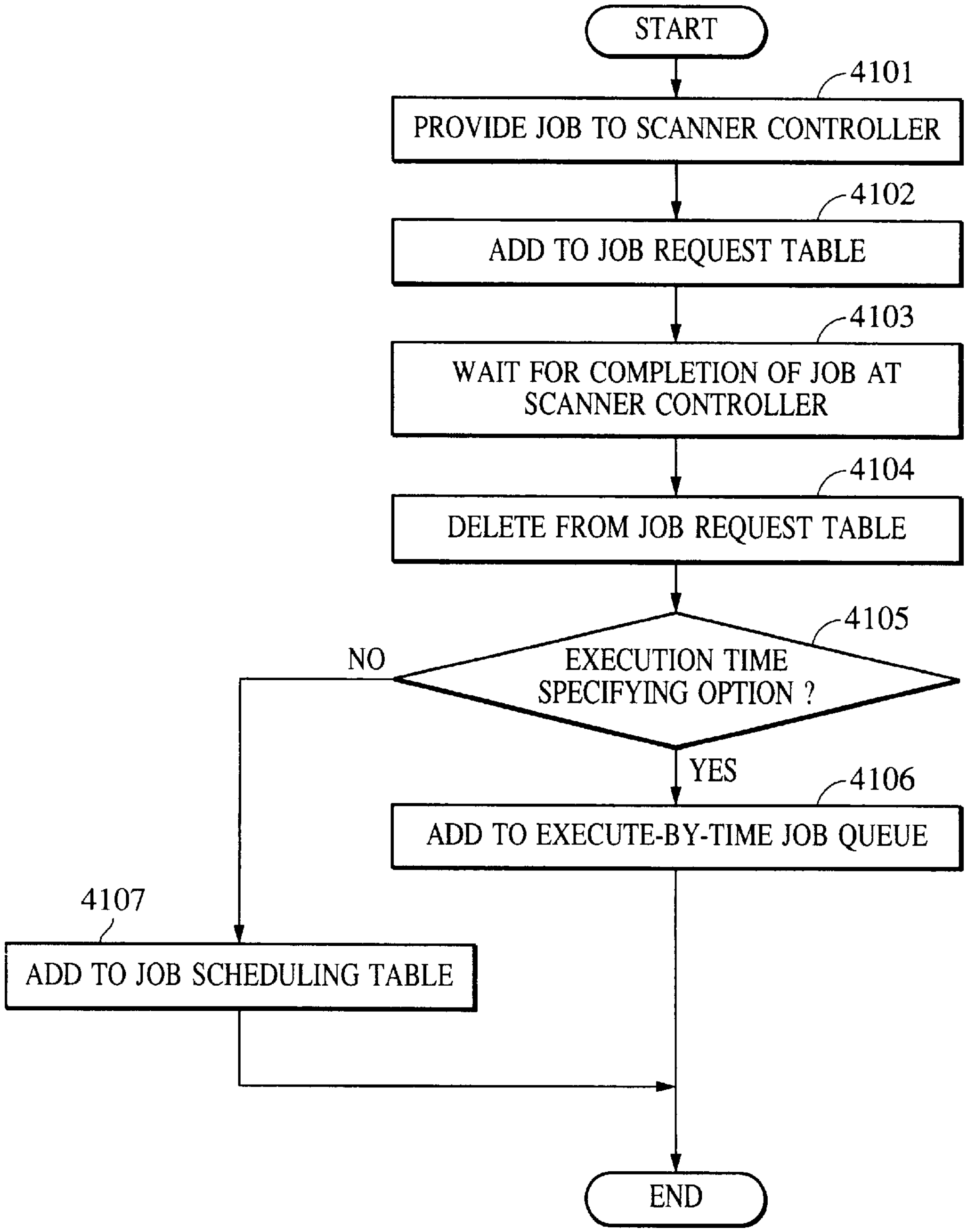
FIG. 57 is a flowchart of job processing with a copy job manager.

FIG. 57 represents the job processing flow of the copy job managers 601 through 609. The copy job manager starts processing of the job after providing of the job is completed. Accordingly, the scan job manager starts the job processing in FIG. 57 as the job completing processing in step 3815 in FIG. 53. In step 4101, the job is provided to the scanner controller 420 and a job ID is received. In step 4102, the job ID, scanner controller ID, and the job ID received from the scanner controller 420, are recorded to the job request table (FIG. 21). In step 4103, job completion from the scanner controller 420 is waited for, and at the time that job completion is notified from the scanner controller 420, the scanned image data is received from the scanner controller 420, and the record of the job is deleted from the job request table (FIG. 21) in step 4104. In step 4105, judgement is made from the job table shown in FIG. 20, regarding whether or not the specified execution time option has been specified for this job. In the event that this has been specified, the job is linked to the execute-by-time job queue table, not the job scheduling table (step 4106). At this time, a check is also made regarding whether or not the remaining limit time has been specified as well, and in the event that this has been specified, the specified execution time and the remaining limit time are compared, and in the event that a contradictory setting has been made such as the latter being greater (later time-wise) than the former, the job is not registered to a table but is discarded. Also, in step 4105, in the event that the specified execution time option is not specified, the job is linked to the tail end of the execution priority specified in the job scheduling table, in step 4107. In the event that the execution priority is not specified at the time of providing the job, a default priority 3 (lowest priority) is provided thereto.

(Job Processing With the Copy Job Manager (2): Registration to the Job Scheduling Table From the Execute-by-time Job Queue Table)

The copy job manager periodically runs an execution time monitoring task for monitoring the execute-by-time job queue table, which detects that the execution time specified for a job within the table has arrived, and performs registration to the job scheduling table. The process of the execution time monitoring task is shown. The process of the execution time monitoring task for the copy job manager is the same as the process flow of the execution time monitoring task for the print job manager shown in FIG. 86, so description here will be omitted.

(Job Processing With the Copy Job Manager (3): From the Job Scheduling Table to Completion of Execution)

The copy job manager periodically runs a job scheduler task for monitoring the job scheduling table, which detects that a new job has been added to the table, or that the priority of a job has been changed, and takes the job which should be executed next from the job scheduling table and provides the job to the printer controller. The process is the same as the processing flow of the job scheduler task for the print job monitor shown in FIG. 87, so description here will be omitted.

(Job Processing With the Copy Job Manager (4): Deleting a Job With a Remaining Limit Time Specified)

A remaining limit time may be specified as a parameter to one job table of the attribute table of the copy job manager at the time of providing the job. This is an attribute to be specified in the event that a substantial amount of time is required from the time of providing the job to the time of execution, but the user does not want to leave the job in the device in an unexecuted state, due to considerations such as secrecy. That is, the copy job manager periodically checks jobs with this remaining limit time specified, and in the event that the limit time has elapsed and the job is unexecuted, the copy job manager deletes the job. Unexecuted jobs exist in the job scheduling table, execute-by-time job queue, or in the job queue of the print controllers, but with the present embodiment, comparison is made with the current time only for jobs with the remaining limit time specified that are in the registered job scheduling table, so as to delete such jobs from the table in the event that the limit has been exceeded. The copy job manager periodically activates a task (remaining monitoring task) for realizing such functions. The processing of the remaining monitoring task for the copy job manager is the same as the processing flow of the remaining monitoring task for the print job manager shown in FIG. 88, so description here will be omitted.

(Job Processing With the Interruption Copy Job Manager)

Of the copy job managers, the one which can process interruption jobs is called the interruption copy job manager in particular. Reference numeral 609 in FIG. 6 denotes the interruption print job manager. This can be understood from the fact that the print job manager 609 has a service ID of 20, and further that the task type is 13 from FIG. 11, and FIG. 12 shows that task type 13 is interruption copying. As with the other copy job managers, the interruption copy job manager follows the job script processing flow shown in FIG. 54, and in the event that a provided job is added to the job table, performs the processing shown in FIG. 91. Steps 4130 through 4132 of the Figure are the same as the steps 3960 through 3962 of the interruption print job manager job processing shown in FIG. 89. Also, steps 4133 through 4136 in FIG. 91 are the same as the steps 4101 through 4104 of the copy job manager job processing shown in FIG. 57. Further, steps 4137 through 4149 in the Figure are the same as the steps 3971 through 3983 of the interruption print job manager job processing shown in FIG. 89.

Subsequently, the print job manager waits in step 4108 for the printer controllers to complete the job, and at the time that job completion is notified from the printer controller, the records of the completed jobs are deleted from the job request table in step 4109. In step 4110, a check is made regarding whether or not all jobs requested to the printer controllers have been completed, and in the event that there are jobs remaining in the printer controllers, the flow returns to step 4108 and waits for the jobs to be completed in the printer controllers. In step 4110, in the event that all jobs requested to the printer controllers have been completed, the record of the jobs is deleted from the job table (FIG. 20) in step 4111. At this time, the event sending processing shown in FIG. 61 is performed. In step 4112, the inside of the job file is inspected, and a check is made in step 4113 regarding whether or not there is an attribute value instructing sending of an event relating to job completion. In the event that such does not exist, the flow ends, but in the event that such an instruction does exist, the flow obtains the sending method and sending destination by reading the attribute values in step 4114. In step 4115 a sending packet is created for the event, and the event is sent by the specified sending method to the specified destination. In step 4116, completion processing such as deleting job and data files is performed, thereby ending the processing of the job.

(Job Processing Download)

Figure 58:
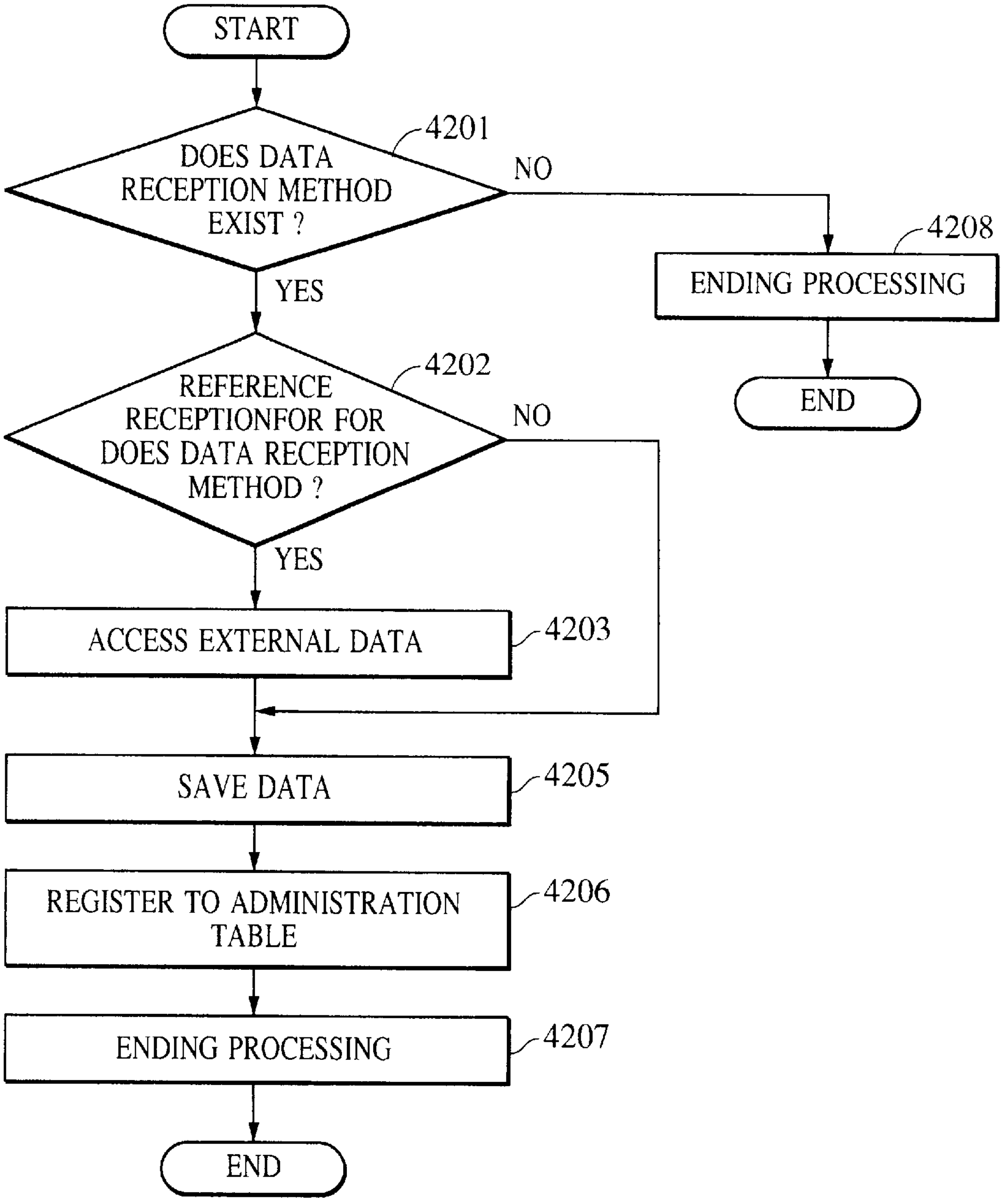
FIG. 58 is a flowchart of job processing (downloading) with the font manager, form overlay manager, log manager, and color profile manager.

FIG. 58 represents the data download functions of the job processing flows of the font manager 413, form overlay manager 414, log manager 415, and color profile manager 416. Jobs for these managers are for downloading and uploading data managed by the managers. Management of the data managed by the managers such as referencing or deleting is performed by providing a command packet to a sub-address managed by the supervisor 410 and accessing attributes table that each manager has, as shown in FIG. 48. Once providing of jobs for each manager is completed, the job processing regarding data downloading is started. Accordingly, each manager starts job processing relating to data downloading in FIG. 58 as completion processing of the job in step 3815 shown in FIG. 53. In step 4201, a job file (FIG. 52) is scanned, and a check is made regarding whether or not attributes relating to the method of receiving data exist. In the event that the results of the check show that attributes relating to the method of receiving data do not exist, the job file relates to uploading and completion processing is performed in step 4208, assuming that the processing flow shown in FIG. 59 has already been performed. Job file deletion is performed at the completion processing in step 4208. In step 4201, in the event that the results of the check show that attributes relating to the method of receiving data exist, the method of receiving data is checked in step 4202. In the event that the method of receiving data is contained in the job (i.e., receiving data by the "Send" operation code in FIG. 53), the data has already been received and the received data is saved as a file in step 4205. In the event that the method for receiving data is outside of the device, access is made to the external source specified in step 4203, data is obtained, and the obtained data is saved as a file in step 4205. The file information saved in step 4205 is newly recorded by writing to the managing table managed by each manager (i.e., the font table (FIG. 28) in the case of the font manager 413, the form overlay table (FIG. 31) in the case of the form overlay manager 414, the log table (FIG. 34) in the case of the log manager 415, and the color profile table (FIG. 39) in the case of the color profile manager 416. In step 4207, completion processing such as deleting job and data files is performed, thereby ending the processing of the job.

(Job Processing Upload)

Figure 59:
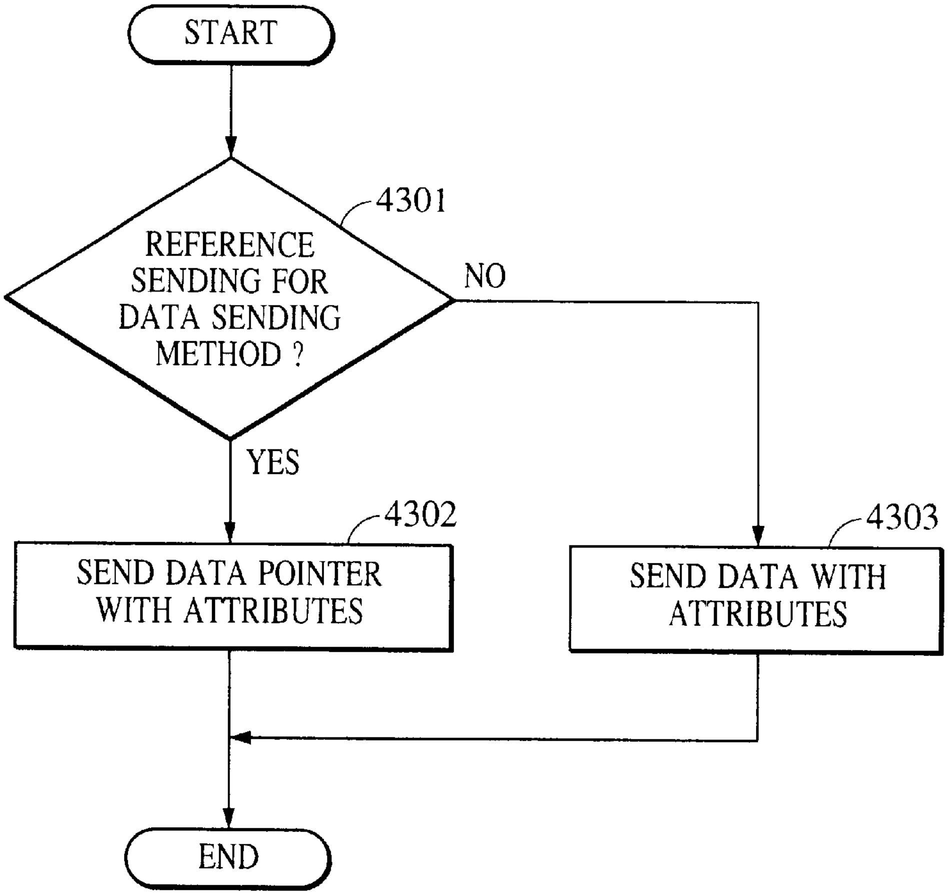
FIG. 59 is a flowchart of job processing (uploading) with the font manager, form overlay manager, log manager, and color profile manager.

FIG. 59 represents the data upload functions of the job processing flows of the font manager 413, form overlay manager 414, log manager 415, and color profile manager 416. Each manager starts job processing relating to data uploading at the point that a "Send request" operation code comprising a cob script is provided. Accordingly, each manager starts job processing relating to data uploading in FIG. 59 as processing dependent on each manager in step 3821 of FIG. 54. In step 4301, a job file (FIG. 52) is checked regarding whether or not attributes relating to the method of sending data exist therein. In the event that the data sending method in step 4301 is an instruction to send the data as a script i.e., (NO) in the flow, the flow in step 4303 sends the data specified within the job along with other attribute information as a script. The details of the data sending process from the device are shown in FIG. 62. In the event that the instruction in step 4301 is to make reference to data and send, reference information for the data specified within the job is sent as script along with the other attribute information.

(Job Management With the Managers (1))

Figure 60:
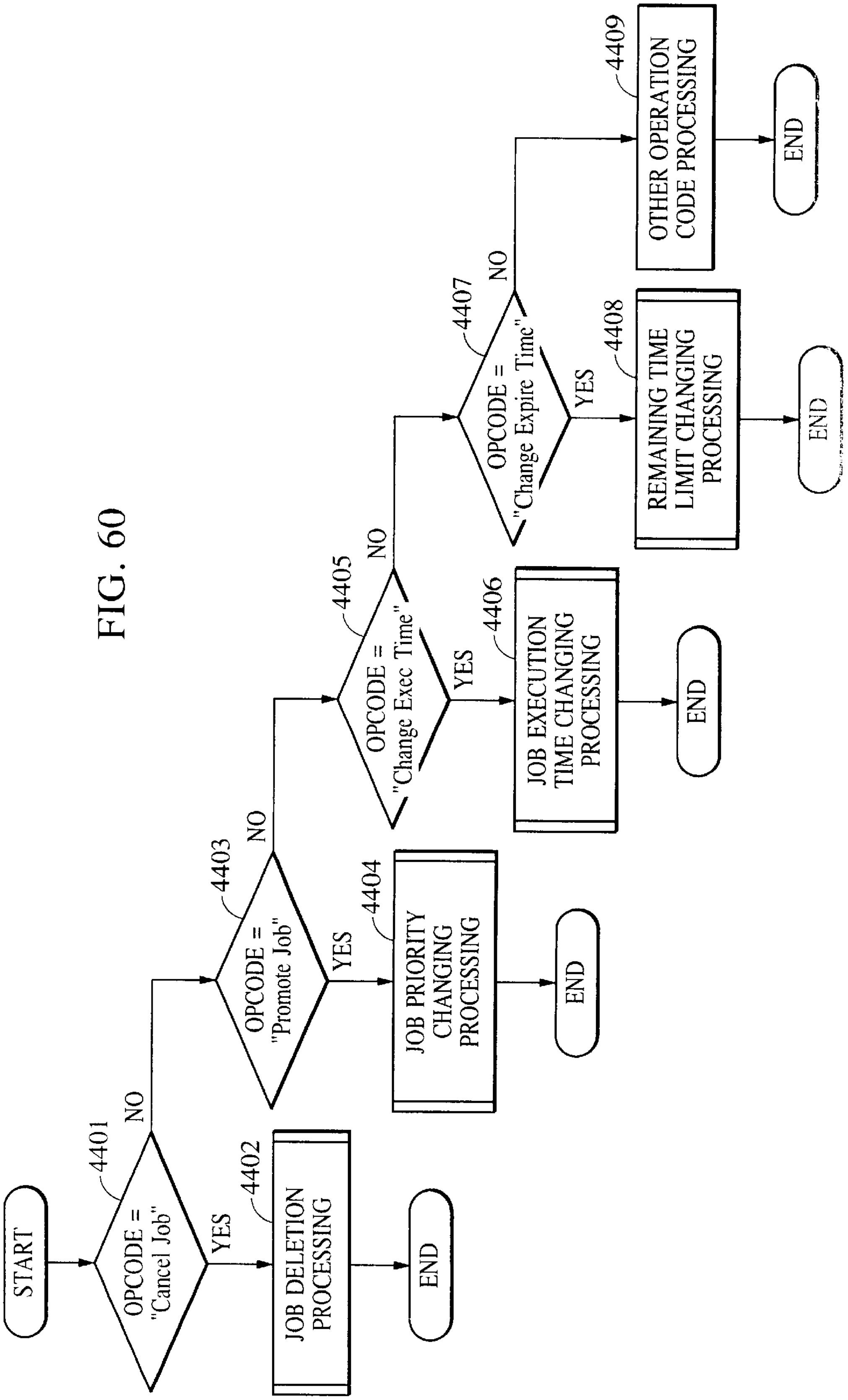
FIG. 60 is a flowchart of job management with each of the managers.

FIG. 60 represents a processing flow performed in the event that the client performs operating instructions (job deletion) for jobs managed by the print job managers 501 through 509, scan job manager 419, and copy job managers 601 through 608, within the multi-functional peripheral device 201. Executing operation to jobs managed by the managers is performed by sending an appropriate command packet to a sub-address of the supervisor. The job managing command packet contains as parameters thereof a service ID for determining the object job manager, and an object job ID. The command packet sent from the client to the multi-functional peripheral device 201 is processed by the flow shown in FIG. 47, and is distributed to the supervisor 410. The processing flow shown in FIG. 60 is a detailed representation of the step 3603 (processing other operation codes) in the flow shown in FIG. 51. In steps 4401, 4403, 4405, and 4407, checking is performed by the supervisor 410 regarding whether the operation code is for deleting a job ("Cancel job"), for changing the priority of a job ("Promote job"), for changing the executing time of a job ("Change exec time"), or for changing the remaining limit time of the job ("Change expire time"), and the corresponding processing (deleting a job in step 4402, changing the priority of a job in step 4404, changing the executing time of a job in step 4406, changing the remaining limit time of the job in step 4408) is performed. In the event that none of the above apply (i.e., NO in step 4407), a later-described processing step 4409 is performed according to the operation code, and the flow ends. Not all job managers have the above processing. For example, the scan job manager 419 has blank processing wherein the processes for changing the job priority, changing the job execution time, and changing the remaining limit time, have no contents.

(Job Management With the Managers (2): Job Deletion Processing)

Figure 92:
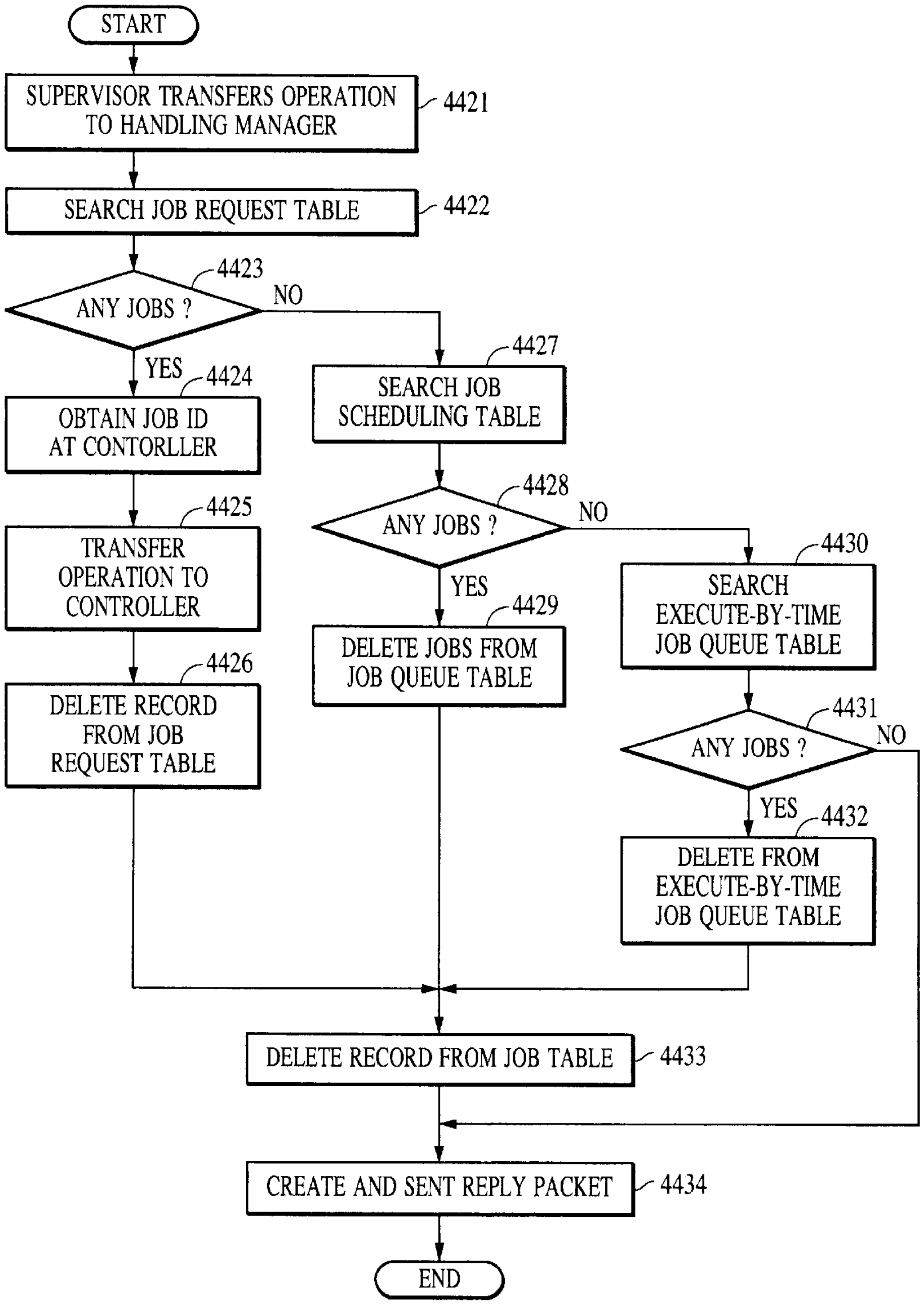
FIG. 92 is a flowchart of job management(2) with each manager.

The job deletion processing in step 4402 of FIG. 60 is shown in detail in FIG. 92. In step 4421 of FIG. 92, parameters are sent to the managers corresponding to the service IDs, according to the service IDs specified in the parameters. In step 4422, the specified job ID is searched for in the job request table (FIG. 21) which each manager manages. In step 4423, in the event that there is a specified job ID in the job request table, the job ID of the controller corresponding to the specified job ID and the controller ID of the controller executing the job are obtained in step 4424. In step 4425, the job ID of the controller is specified as to the controller corresponding to the controller ID, thereby instructing deletion of the job. In step 4426, the pertinent record is deleted from the job request table, and then in step 4433 the record of the job with the job ID is deleted from the job table (FIG. 20), and in step 4434 a reply packet to the effect that deletion of the job was successful is created and sent. In the event that the specified job cannot be discovered in the job request table in step 4423, this is searched from the job scheduling table (FIG. 83) in step 4427. In the event that the specified job is discovered in the job scheduling table (step 4428), the specified job is deleted from the job scheduling table in step 4429, and the flow proceeds to step 4433. In the event that the job cannot be discovered in the job scheduling table in step 4428, this is searched from the execute-by-time job queue table (FIG. 84) in step 4430. In the event that the specified job is discovered in the execute-by-time job queue table (step 4431), the specified job is deleted from the execute-by-time job queue table in step 4432, and the flow proceeds to step 4433. In the event that the specified job cannot be discovered in step 4431, the job is assumed to be already completed at the controller, so a reply packet to the effect that the specified job does not exist is created and sent.

(Job Management With the Managers (3): Job Priority Changing Processing)

Figure 93:
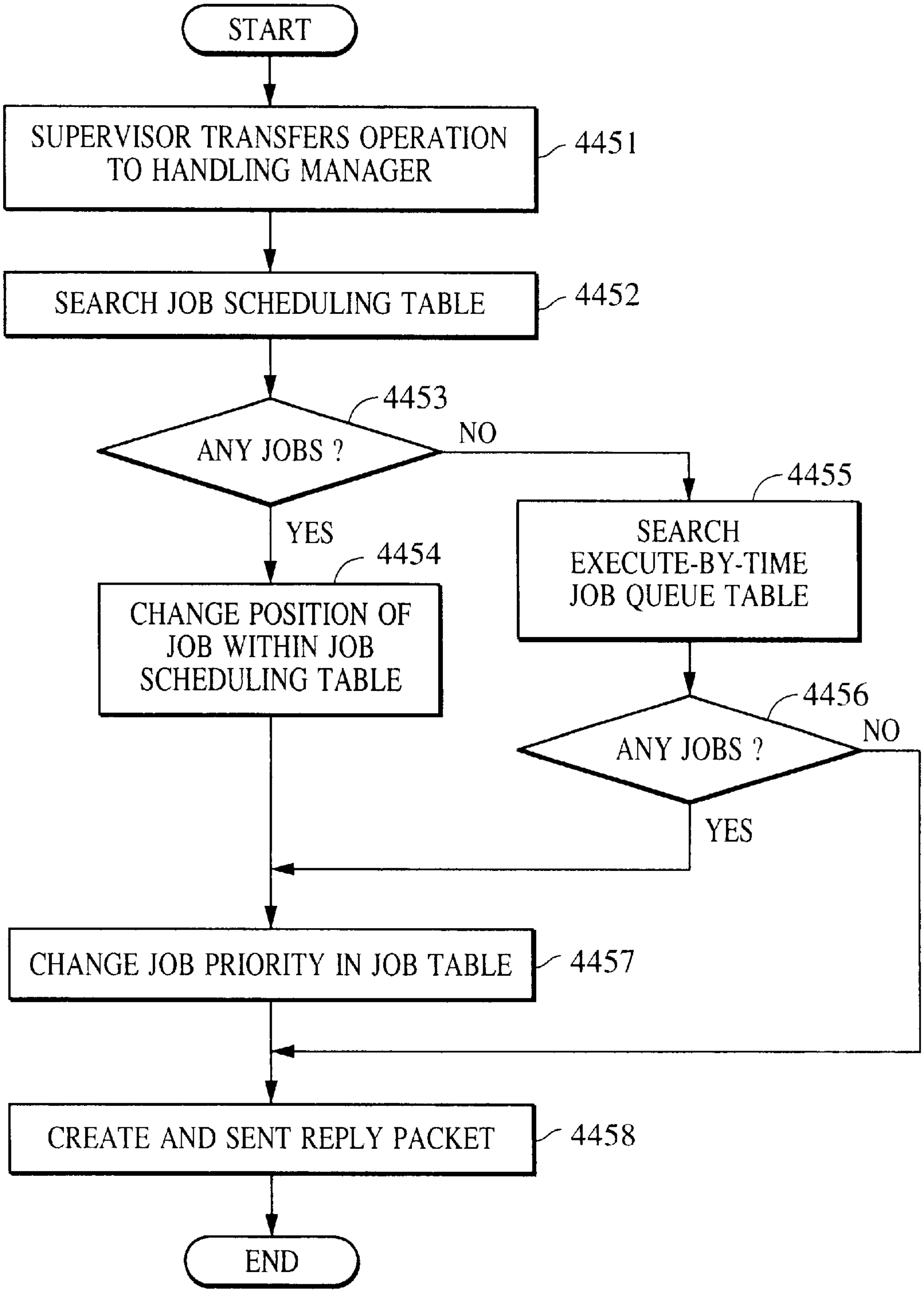
FIG. 93 is a flowchart of job management(3) with each manager.

The job deletion processing in step 4404 of FIG. 60 is shown in detail in FIG. 93. In step 4451 of FIG. 93, parameters are sent to the managers corresponding to the service IDs, according to the service IDS specified in the parameters. In step 4452, the specified job ID is searched for by the managers in the job scheduling table (FIG. 83) which each manager manages. In the event that the specified job ID is discovered in the job scheduling table in step 4453, the link position of the specified job within the job scheduling table is re-linked to the post-change priority in step 4454. Further, in step 4457, the job priority of the specified job ID in the job table (FIG. 20) is changed, and in step 4458, a reply packet to the effect that the change has been completed is created and sent. In the event that the specified job ID cannot be discovered in the job scheduling table in step 4453, this is searched from the execute-by-time job queue (FIG. 84) in step 4455. In the event that the specified job is discovered in the execute-by-time job queue table in step 4456, the flow proceeds to step 4457. In the event that the specified job cannot be discovered in step 4456, the specified job has already been provided to controller or already completed, so a reply packet to that effect is created and sent in step 4458.

(Job Management With the Managers (4): Execution Time Changing Processing)

Figure 94:
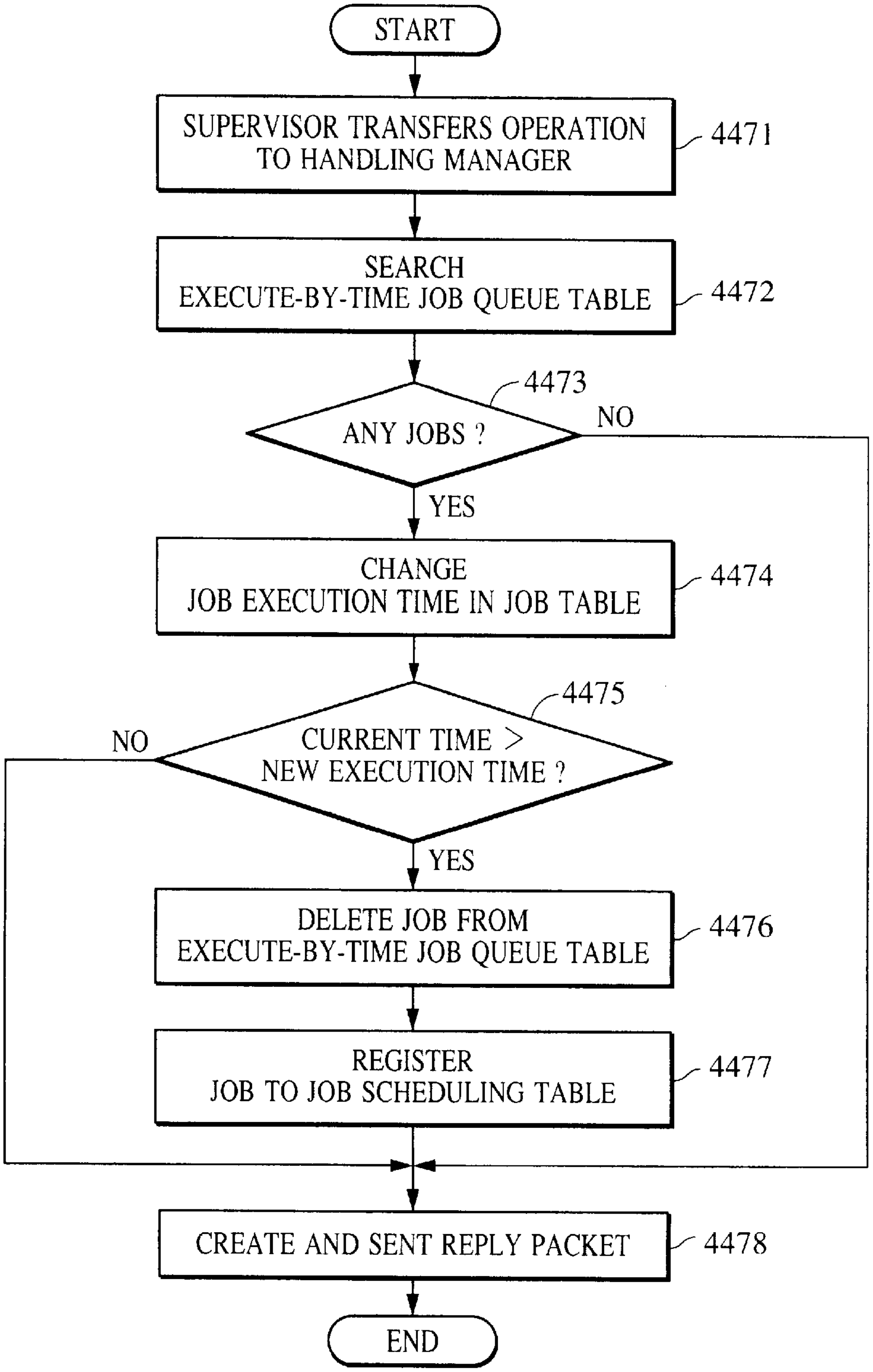
FIG. 94 is a flowchart of job management(4) with each manager.

The execution time changing processing in step 4406 of FIG. 60 is shown in detail in FIG. 94. In step 4471 of FIG. 94, parameters are sent to the managers corresponding to the service IDs, according to the service IDs specified in the parameters. Changing of the execution time is only valid while the job is still in the execute-by-time job queue (FIG. 84), so in step 4472, the specified job is searched for in the execute-by-time job queue table. In the event that the specified job is discovered in step 4473, the execution time of the specified job in the job table is changed in step 4474. The execution time may be either set up or set backwards from the originally specified time. In step 4475, the current time and the changed execution time are compared. In the event that the execution time has already been reached, the flow proceeds to step 4476. In step 4476, the specified job is deleted from the execute-by-time job queue table and registered in the job scheduling table (FIG. 83) instead in step 4477. At this time, the job is linked with the priority at the maximum priority, which is execution priority 1. Subsequently, in step 4478, a reply packet to the effect that changing the execution time has succeeded is created and sent. In the event that the execution time has not come yet in step 4475, the job does not move, and the flow proceeds to step 4478. In step 4473, in the event that the specified job does not exist in the execute-by-time job queue, a reply packet to the effect that the specified job could not be found is created in step 4478 and sent.

(Job Management With the Managers (5): Remaining Limit Time Changing Processing)

Figure 95:
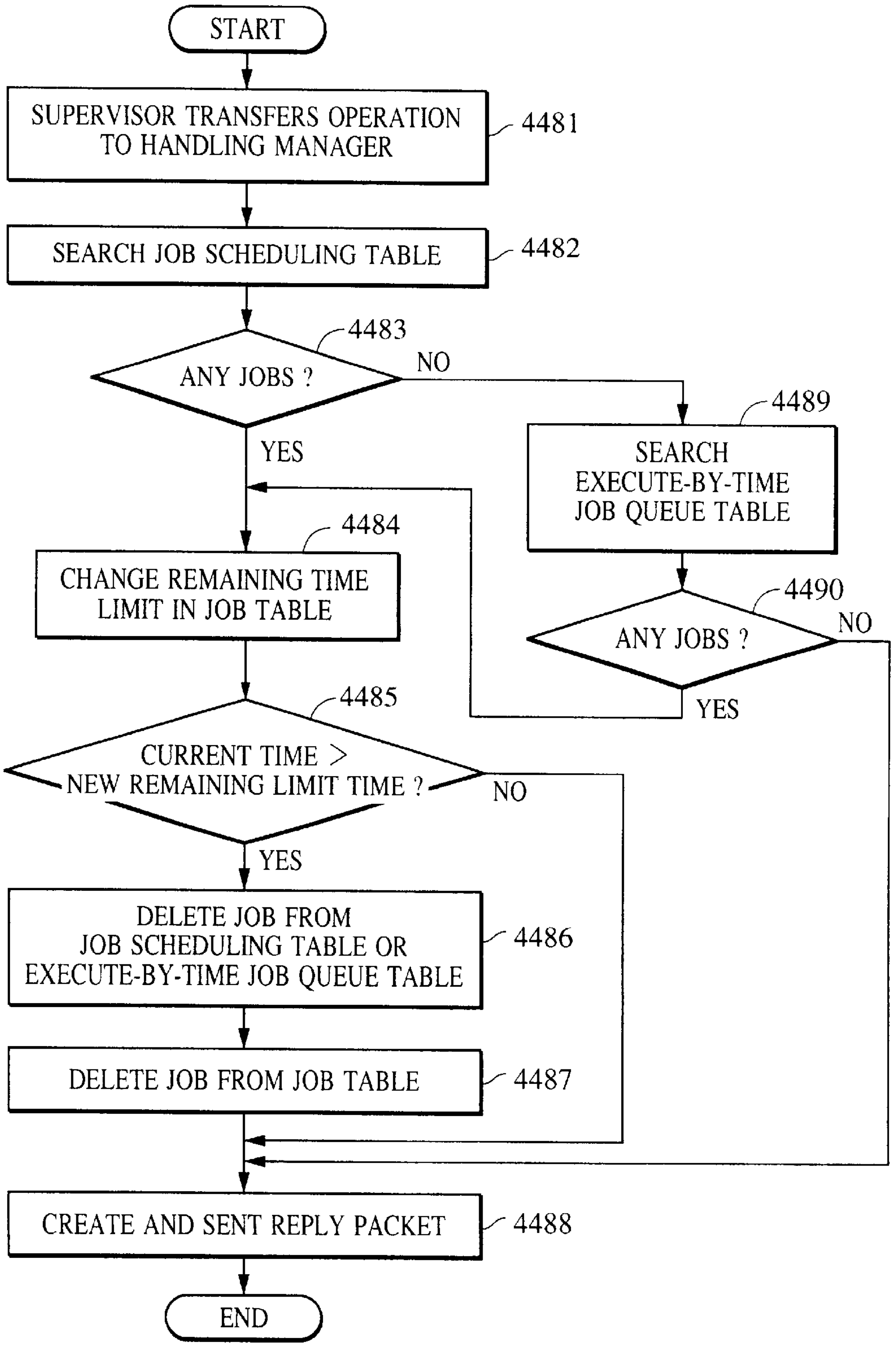
FIG. 95 is a flowchart of job management(5) with each manager.

The execution time changing processing in step 4408 of FIG. 60 is shown in detail in FIG. 95. In step 4481 of FIG. 95, parameters are sent to the managers corresponding to the service IDs, according to the service IDs specified in the parameters. Changing of the remaining limit time is only valid while the job is still in the execute-by-time job queue (FIG. 84) or in the job scheduling table. Accordingly, a search is made regarding whether the specified job is in either of the two tables, in steps 4482, 4483, 4489, and 4490. In the event that the specified job is discovered in either of the two tables, the record of the specified job in the table is changed regarding remaining limit time, in step 4484. In the event that the job is discovered in neither of the two tables, a reply packet to the effect that the specified job could not be discovered is created in step 4488 and sent. In step 4485, the current time and the changed remaining limit time are compared. In the event that the remaining limit time has already been reached, the flow proceeds to step 4486 where the specified job is deleted. The job exists either in the execute-by-time job queue table or in the job scheduling table. Further, in step 4487, the record of the job of the corresponding job ID is deleted from the job table, and in step 4488, a reply packet to the effect that the job was successfully deleted is created and sent.

(Sending Events)

FIG. 61 represents the processing flow for the managers sending events. Each manager has an event setting table such as shown in FIG. 16 as values of the attributes table held by each own. As indicated in the description of FIG. 16, this table is inscribed with connection formats for sending an event in the event that an event occurs, and destinations. In the event that a certain event occurs, the managers recognize the event ID corresponding to that event. Then, in step 4501, reference is made to the event setting table, and searches whether or not the event ID is registered. In the event that not even one event ID is registered in step 4502, the process ends. In the event that even one event ID is registered in step 4502, the event connection format used for sending the event and the destination for sending the event are obtained from the first record in step 4503, and in step 4504 an event sending packet is created. Added within this packet are parameters stipulated for each event ID, and parameters according to the format for each event ID registered in the event format table (FIG. 17) held by the supervisor 410. In step 4505, this event sending packet is sent to the sending destination of the connection format obtained in step 4503. Then, judgement is repeatedly made from step 4503 to step 4505 regarding all records having event IDs in step 4506 regarding whether or not processing has been conducted, and in the event that processing has been not conducted the flow returns to step 4503, and event that processing has been conducted for all records, the flow ends.

(Sending Data Script From the Multi-functional Peripheral Device)

FIG. 62 represents the processing flow for sending data as a script which is a continuation of command packets, from the multi-functional peripheral device 201. This processing flow is used in the sending step 4008 of image data obtained as the result of a scan job, the sending step 4303 for font data, and so forth. In step 4601, a packet containing the data attributes is generated and sent. If necessary, step 4501 is repeated, so as to send multiple attributes. In step 4602, the data regarding which sending has been specified, is obtained. The command packet has a structure such as shown in FIG. 46, and since the size of parameters that can be sent is limited, the data length is inspected in step 4603. In the event that the inspection shows that the data length exceeds the limit length (64 Kbytes), the data is cut at the limit length in step 4606, and a command packet with the obtained data added as parameters is generated and sent in step 4607. "Send" is set as the operation code for this command packet, and the continuation flag is set to true. In step 4608, the remaining cut data is obtained and the data length inspection of step 4603 is performed again. In the event that the inspection in step 4603 shows that the data length is within the limit length of the command packet, a command packet with the obtained data added as parameters is generated and sent in step 4604. "Send" is set as the operation code for this command packet, and the continuation flag is set to false. In step 4605, a command packet containing the remaining attributes is generated and sent. If necessary, step 4501 is repeated, so as to send a plurality of attributes, and the flow ends.

(Client PC Hardware Configuration)

Figure 63:
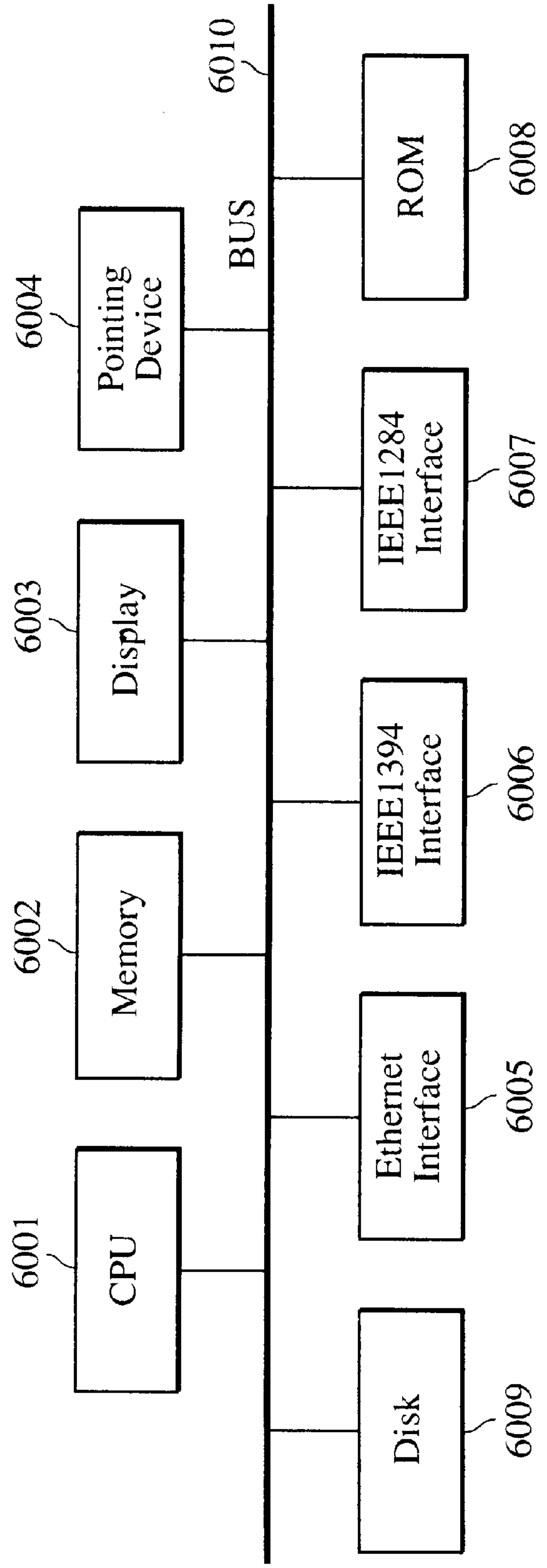
FIG. 63 is a diagram illustrating the hardware configuration of a Client PC.

FIG. 63 is a diagram illustrating the hardware configuration (controllers) according to the present embodiment common to the client PCs 202, 203, 204, and 205, shown in FIG. 2. Within the controller, the CPU 6001 is connected to memory (RAM) 6002, a display 6003 such as a CRT or the like, a pointing device 6004 such as a keyboard or a mouse, ROM 6008, and a disk 6009, via a bus 6010. The various programs and data shown in FIG. 77 are stored in the disk 6009 (recording medium) comprised of a hard disk or floppy disk or the like, and are read out to the memory (RAM) 6002 as necessary and executed by the CPU 6001. The disk 6009 may either be detachable from the client PC or built into the client PC. Further, the programs shown in FIG. 77 may be downloaded from another client PC or MFP 201 via a network interface cable 208 (10 BASE-T), an IEEE 1394 interface cable 206, or an IEEE 1284 interface cable 207, and thus stored in the disk 6009. The hardware shown in FIG. 63 comprises a common client PC such as shown in FIG. 78. Display is performed by the CPU 6001 writing data to the display 6003, and the user inputs instructions by the CPU 6001 reading data from the pointing device 6004.

Also, a network interface connector 6005, IEEE 1394 interface connector 6006, and IEEE 1284 interface connector 6007 are connected to the bus 6010, to which the Ethernet (10 BASE-T) cable 208, IEEE 1394 cable 206, and IEEE 1284 cable 207 shown in FIG. 2 are connected. Communication using the interfaces is performed by the CPU 6001 reading and writing data to and from these interfaces.

(Software Configuration of the Client PC)

Figure 64:
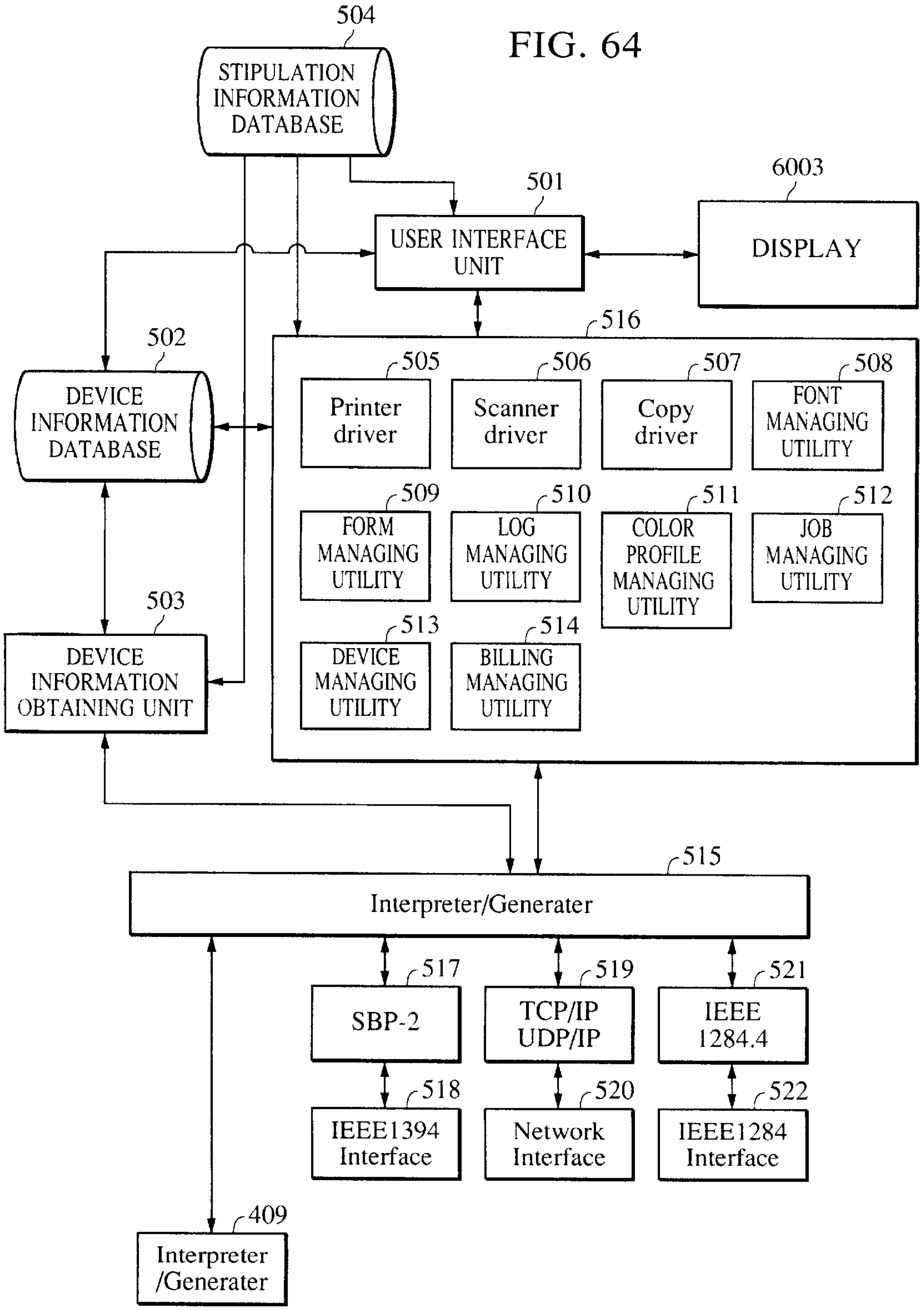
FIG. 64 is a diagram illustrating the software (control program) configuration of a Client PC.

FIG. 64 shows a portion of the software (control programs) block diagram of the client PCs 202, 203, 204, and 205, using the multi-functional peripheral device 201. The software (control programs) used by the client PCs and the data thereof are stored in a disk 6009, as shown in FIG. 77. Reference numeral 501 denotes a user interface, whereby the drivers and utilities 505 through 514 display the information of the multi-functional peripheral device 201 on the display 6003. Reference numeral 502 denotes a database (disk 6009) holding the information (data) of the multi-functional peripheral device 201 currently being used, and at the point that the client connects to the multi-functional peripheral device 201, the device information obtaining unit 503 obtains all information held by the device, and holds this in the database 502. Reference numeral 504 is a stipulation database (disk 6009) holding stipulation information that is used in the attributes tables which the multi-functional peripheral device 201 holds, such as the meaning of the attributes, the data type for each attribute ID, the format of the parameters stipulated for each event ID, the meaning of task types, supervisor sub-addresses, and so forth. The drivers and utilities denoted with reference numerals 505 through 514 operate based on the stipulation database 504 and the device information database 502. Reference numeral 5050 denotes a printer driver, which generates print job script upon instructions from an application program operating on the client PC. Reference numeral 506 denotes a scanner driver, which generates scan job script upon instructions from an application program operating on the client PC. Reference numeral 507 denotes a copy driver, which generates copy job script upon instructions from an application program operating on the client PC. Reference numeral 508 denotes a font managing utility, for generating jobs for performing downloading and uploading of font data, and generating commands for managing font data. Reference numeral 509 denotes a form overlay managing utility, for generating jobs for performing downloading and uploading of form overlay data, and generating commands for managing form overlay. Reference numeral 510 denotes a log managing utility, for generating jobs for performing downloading and uploading of log data, and generating commands for managing logs. Reference numeral 511 denotes a color profile managing utility, for generating jobs for performing downloading and uploading of color profile data, and generating commands for managing color profiles. Reference numeral 512 denotes a job managing utility, for generating commands for performing management such as deleting/suspending/resuming print jobs, scan jobs, and copy jobs. Reference numeral 513 denotes a device managing utility, for generating commands which obtain the status of the printer controllers and scan controller. Reference numeral 514 is a billing management utility, which generates commands for obtaining billing data.

Reference numeral 515 is a generator for generating command packets based on commands generated from the drivers and utilities denoted by reference numerals 505 through 514. The generated command packets use the transport processing modules 517, 519, and 521 to be sent to the multi-functional peripheral device 201. The generator 515 interprets the reply packets and event packets input from the transport processing modules 517, 519, and 521, and distributes these to appropriate drivers or utilities. Reference numeral 517 denotes the processing module of SBP-2 which is the IEEE 1394 transport layer. Reference numeral 519 denotes the TCP/IP and UDP/IP processing module. Reference numeral 521 denotes the processing module of IEEE 1284.4 which is the IEEE 1284 transport layer. Reference numeral 518 denotes the interface which processes the physical layer of IEEE 1394. Reference numeral 520 denotes a network interface. Reference numeral 522 denotes the interface which processes the physical layer of IEEE 1284. FIG. 64 also represents the internal configuration of the user interface manager 405 in the software (control program) block diagram (FIG. 4) of the multi-functional peripheral device 201. In the case of the user interface manager 405, the SBP-2 processing module 517, TCP/IP and UDP/IP processing module 519, IEEE 1284.4 processing module 521, network interface 518, network interface 520, and IEEE 1284 interface 522, shown in FIG. 64, do not exist, with the generator 515 in FIG. 4 being directly connected to the interpreter 409, thereby exchanging command packets, reply packets, and event packets. This direct connection does not exist in the software (control program) configurations of the other clients 202, 203, 204, and 205.

(Packet Generating and Sending Processing)

Figure 65:
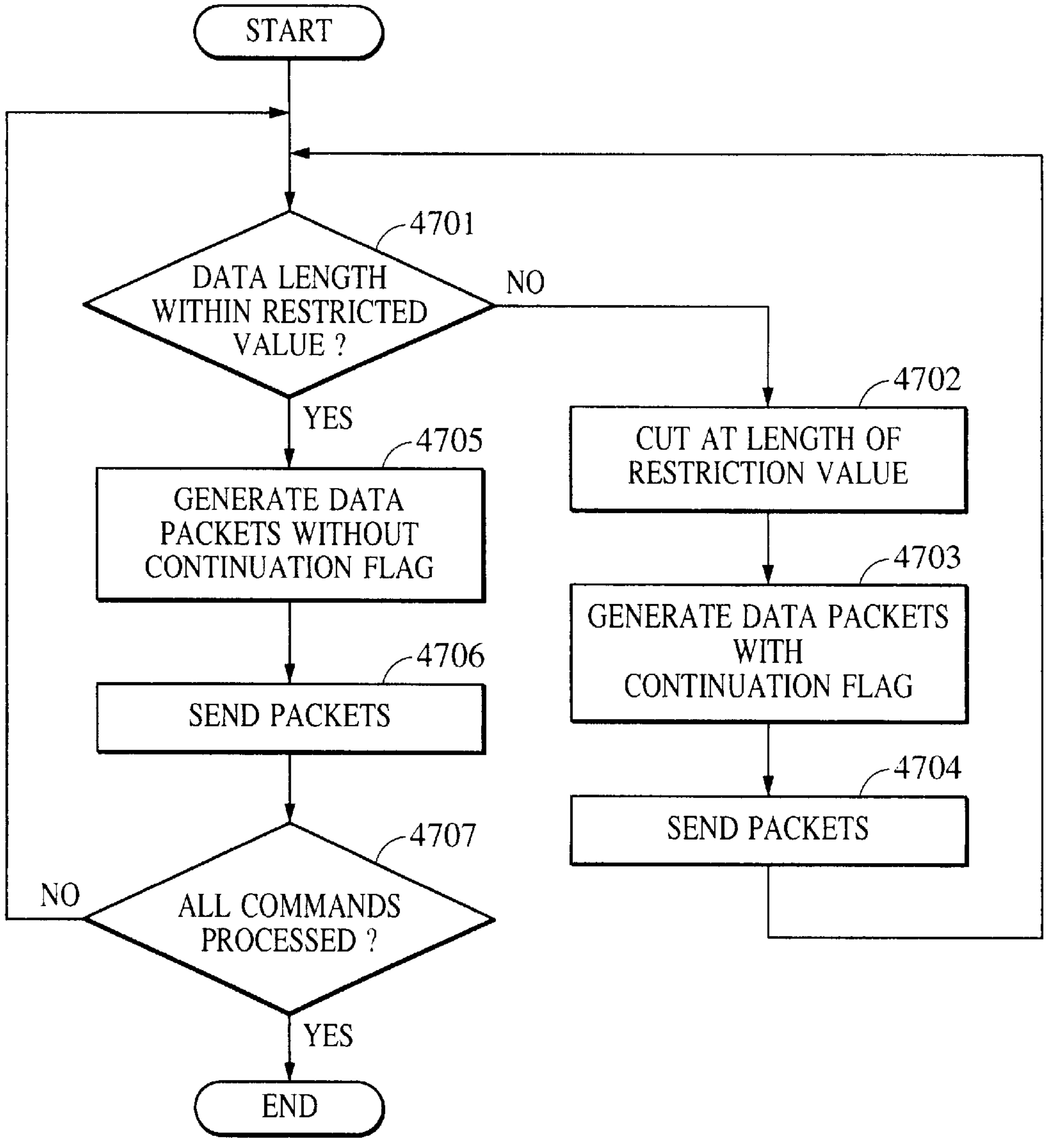
FIG. 65 is a flowchart for the packet generating and sending process.

FIG. 65 represents the processing flow of the generator 515 receiving commands or job scripts from the drivers and utilities 505 through 514, to generate command packets shown in FIG. 46 to send to the multi-functional peripheral device 201. It is assumed that the connection is made beforehand to an appropriate sub-address of the destination multi-functional peripheral device before this processing flow. Information regarding which sub-address should be connected to is obtained from the device information obtaining flow shown in FIG. 66. The job script is defined as a continuation of commands, and in the event that the object of processing is a job script, the steps 4701 through 4706 are repeated until all commands have been processed. In the following description, the term job script issuing means processing each command from step 4701 through step 4707. In step 4701, the length of data to be sent along with commands is inspected. In the event that the inspection shows that the data length exceeds the limit length (64 Kbytes), the data is cut at the limit length in step 4702. In step 4703, a packet containing operation code corresponding to the commands is generated of the cut data, the continuation flag is set to true, and the packet is sent in step 4704. In step 4701, in the event that the inspection shows that the data length is within the parameter limit length of the command packet in step 4705, a packet with containing operation code corresponding to the commands is generated, the continuation flag is set to false, and the packet is sent in step 4706.

(Obtaining Information and Automatic Software Configuration at the Client)

Figure 66:
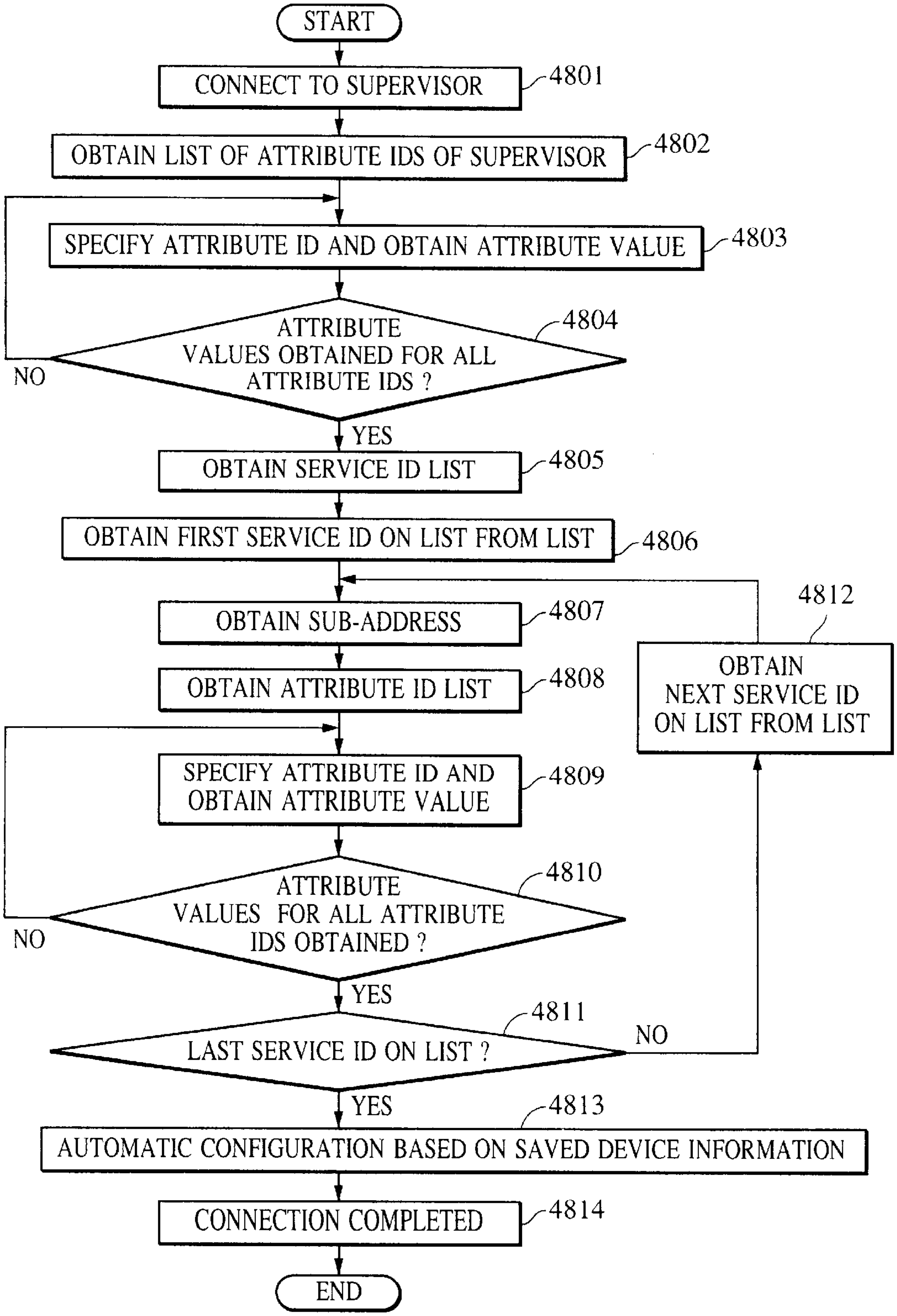
FIG. 66 is a flowchart of information obtaining and software (control program) automatic configuration at the client side.

FIG. 66 represents a processing flowchart of the device information obtaining unit 503 shown in FIG. 64. The device information obtaining unit 503 performs the processing shown in FIG. 66 immediately following connection of the client with the multi-functional peripheral device 201, obtains device information, and stores this in the device information database 502 (disk 6009). This processing is also activated again in the event that a configuration changing event is sent from the device. In step 4801, the client PC connects to the multi-functional peripheral device 201. Specifically, the client PCs 202 and 203 connected to the Ethernet 208 specify the IP address and port No. to connect to the multi-functional peripheral device 201, and output IP packet data. The client PC 204 connected to the IEEE 1394 interface 206 specifies the node ID and LUN (logical unit number) to connect to the multi-functional peripheral device 201, and outputs SBP-2 packet. The client PC 205 connected to the IEEE 1284 interface 207 specifies the socket No. to connect to the multi-functional peripheral device 201, and outputs IEEE 1284.4 packet data. As for the sub-address to connect to, a supervisor sub-address stipulated beforehand for each connection format used for connection is used. This stipulated value is obtained from the stipulation information database 504 (disk 6009). In step 4802, the value of the attribute ID 100 (attribute ID list) in the attributes table of the supervisor shown in FIG. 7 is obtained. Obtaining of the attribute value is performed by generating an attribute obtaining command (Get) with the service ID 0 and attribute ID of the supervisor as parameters thereof, and providing the command to the generator 515. The generator 515 performs processing of the flow shown in FIG. 65, and sends the command packet for obtaining the attribute value to the multi-functional peripheral device 201. The multi-functional peripheral device 201 receives the above command packet, performs the processing flow shown in FIG. 47 and FIG. 48, and returns the attribute value of the specified attribute ID to the client. The client analyzes the reply packet with a generator, and sends this to the device information obtaining unit. Incidentally, the attributes of the attribute ID 100 consist of a list of all attribute IDs on the supervisor attribute table. In step 4803, the attribute ID is specified and the attribute value is obtained, the processing is repeated until the attribute values for all of the attribute IDs are obtained in step 4804, and the attribute values are saved in the device information database 502 along with the attribute IDs. According to the above steps, the attributes table of the supervisor (FIG. 7) is completely saved in the device information database 502.

Then, a list of service IDs (the SID:task type table shown in FIG. 11) is obtained in step 4805 from the attributes table saved in the device information database 502 (disk 6009). Incidentally, obtaining services IDs can be performed by generating a service ID list inquiry command (LIST SERVICE), and providing the command to the generator 515. At this time, the processing flow shown in FIGS. 47 through 49 is executed at the multi-functional peripheral device 201. In steps 4806 through 4811, manager information for each of the service IDs obtained in step 4805 is obtained. In step 4806, the service ID 1 (print job manager 501) which is the first service ID of the service IDS except for the supervisor (service ID 0) is obtained from the list shown in FIG. 11. In step 4807, a sub-address corresponding to the service ID is obtained. Obtaining of the sub-address is performed by generating a sub-address obtaining command (Reserve) with the service ID as a parameter thereof, and providing this command to the generator 515. At this time, the processing flow shown in FIGS. 47 through 50 is executed at the multi-functional peripheral device 201. The obtained sub-address is saved in the device information database 502. In step 4808, the value of the attribute ID 100 (attribute ID list) in the attributes tables of the managers is obtained. Obtaining of the attribute value is performed by generating an attribute value obtaining command (Get) with a service ID corresponding to each manager and attribute ID as parameters thereof, and providing the command to the generator 515. In step 4809, the attribute ID is specified and the attribute value is obtained, the process is repeated in step 4810 until the attribute values of all attribute ID are obtained, and the attribute values are saved in the device information database 502 along with the attribute IDs. In step 4811, judgement is made whether the service ID is the last service ID in the service ID list, and in the event that it is not the last, the next service ID is obtained from the list in step 4812, and the processing from step 4807 is repeated. In step 4811, the attribute values of all service IDs (print job managers 501, 502, 503, 504, 505, 506, 507, 508, 509, scan job manager 419, copy managers 601, 602, 603, 604, 605, 606, 607, 608, font manager 413, form overlay manager 414, log manager 415, color profile manager 416, print controllers 510, 511, 512, and scanner controller 420) in the list are saved in the device information database 502 along with the attribute IDs. Then, in step 4813, user interfaces for managers corresponding to the driver utilities (control programs) 505 through 514 are automatically configured, based on the device information (data) saved in the device information database 502 (disk 6009). The processing of the automatic configuring step 4813 includes updating of the user interface, wherein the display of the setting screen (user interface) is changed according to the driver utility. For example, as shown in FIG. 81 and FIG. 82 the user interface of a printer driver changes the display screen displayed on the display 6003, regarding the list of PDLs supported based on the attribute values of the attribute ID 1101 of the print job managers (501 through 509), whether or not color printing is available based on attribute ID 1102, the kind of finishing supported based on the attribute value of the attribute ID 1103, the maximum settable resolution based on the attribute value of the attribute ID 1104, and minimum settable resolution based on the attribute ID 1105. In the same way, the display for the user interfaces of the other drivers 506 and 507, and utilities 508 through 514, are changed according to the attributes. Further, the icons of each driver and utility (print manager, copy job manager, etc.) is displayed in an identifiable manner. Finally, the connection with the supervisor 410 is ended in step 4814, and the processing is completed.

(Issuing a Job With a Specified Task Type)

Figure 67:
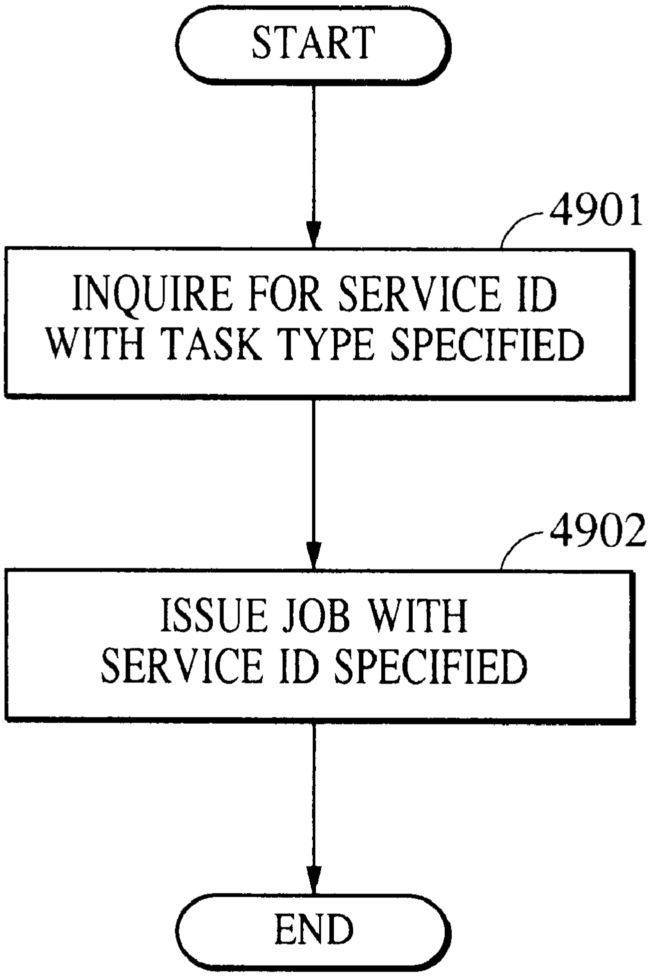
FIG. 67 is a flowchart of job issuing with the task type specified.

FIG. 67 represents the processing in the event that the applications and utilities issue job scripts specifying the task type. Issuing a job with a service ID specified is performed by searching the device information database 502 with the service ID as a key, and sending an appropriate job script to the obtained sub-address, but in the event that the user specifies only the task type, there is the need to instruct a service ID introduction request used for the multi-functional peripheral device 201. FIG. 67 shows the processing to perform in this case. In step 4901, a attribute value obtaining command is generated for obtaining the service ID by specifying the task type, and this command is provided to the generator 515. At this time, the processing flow shown in FIGS. 47 through 51 is executed at the multi-functional peripheral device 201. In step 4902, the device information database 502 is searched based on the service ID obtained in step 4901, and a job script is sent to the obtained sub-address.

(Event Structure)

Figure 68:
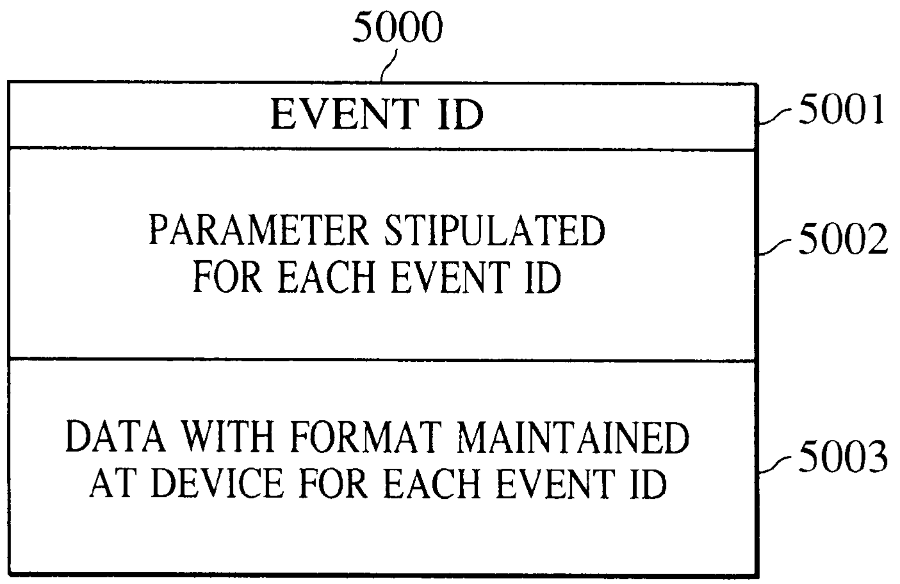
FIG. 68 is a diagram illustrating the construction of an event.

FIG. 68 represents the structure of an event sent from the multi-functional peripheral device 201 to the client. The event packet has the same structure as the command packet shown in FIG. 46, and that shown in FIG. 68 is the structure of the parameter 3110 portion of the packet. Numeral 5001 denotes an event ID representing the type of event, and 5002 denotes parameter data stipulated for each event ID. This data format is held in the stipulation information database 504 beforehand. Numeral 5003 denotes parameter data wherein the format is determined in the device for each event ID. This data format is held in the device information database 502 as an event format table (FIG. 17), by executing the processing flow shown in FIG. 66.

(Event Processing)

Figure 69:
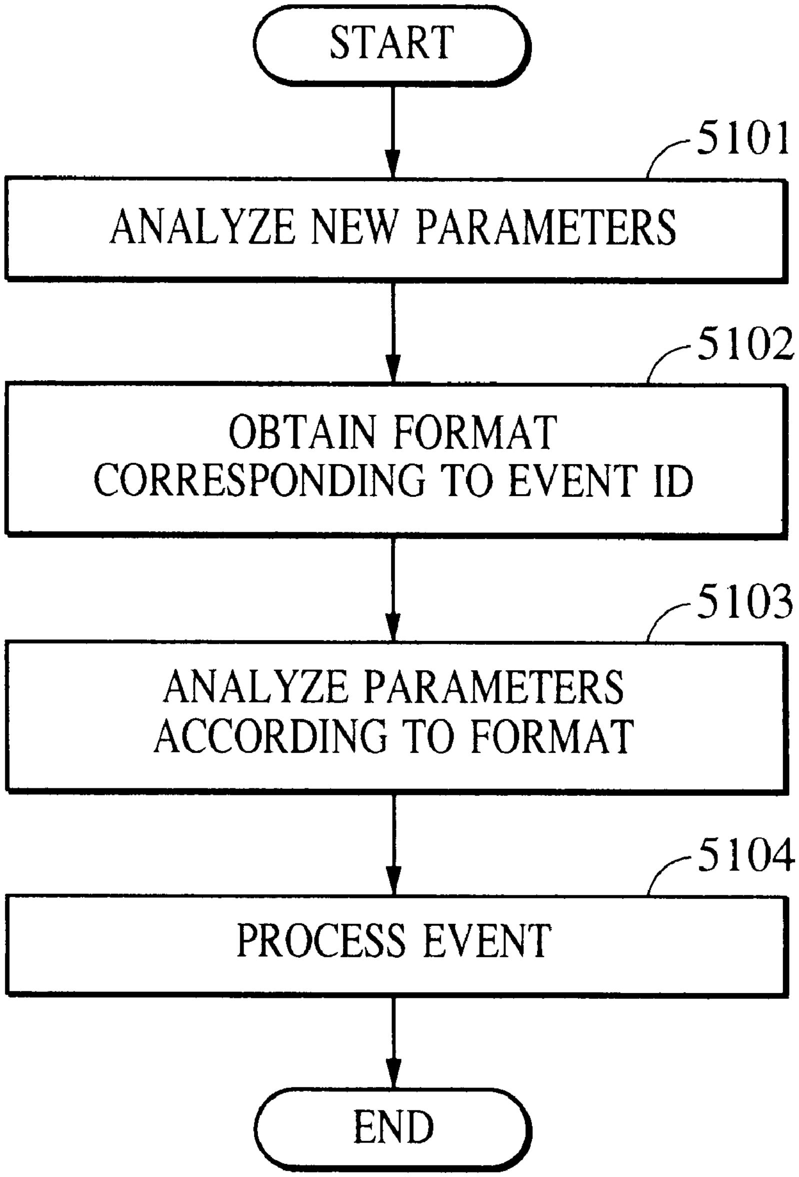
FIG. 69 is a flowchart for sending an event.

FIG. 69 is a flow representing the processing performed by the client in the event that the drivers and utilities receive an event from the multi-functional peripheral device 201. The drivers and utilities register the events that each wants in the generator 515 beforehand, with the event ID as a key. When an event is sent from the multi-functional peripheral device 201 to a client, the generator 515 distributes the event to the registered drivers and utilities. FIG. 69 represents the processing following the drivers and utilities receiving the distribution of the event. In step 5101, stipulation parameter data 5002 is analyzed based on the format information obtained from the stipulation information database 504. In step 5102, the event format 1302 corresponding to the event ID is obtained from the event format table (FIG. 17), held in the device information database 502, with the event ID (5001) as the key. In step 5103, event formats dependent one the device (event format attribute ID 676: size of paper, ID 756: type of paper, ID 666: type of toner, ID 698: type of ink, ID 600: cover position) are analyzed, based on the obtained event formats. Then, the parameters and event IDs analyzed in step 5104 (event ID 200: no paper, ID 399: no toner, ID 432; no ink, ID 234:; cover of multi-functional peripheral device open) are processed and a display according to the event (a display on the display 6003 of a user interface of no paper, cover open, no toner, etc.) is made.

(Log Processing)

Figure 70:
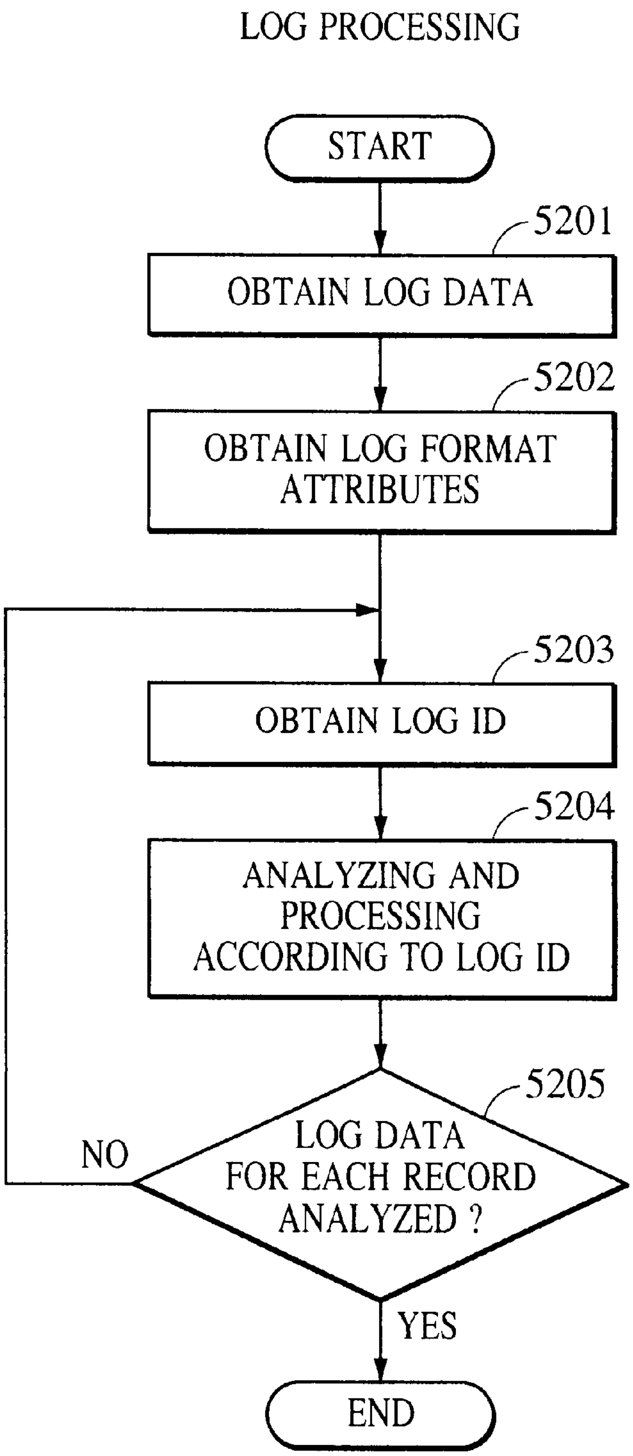
FIG. 70 is a flowchart of log processing.

FIG. 70 represents a flow wherein the log managing utility 510 obtains and processes logs held by the multi-functional peripheral device 201. In step 5201, log data is obtained. Obtaining of log data is performed by generating a log data obtaining job script, and sending this to the multi-functional peripheral device 201. At the multi-functional peripheral device 201, the processing flow shown in FIGS. 47, 53, and 59 is executed, and log data is sent to the client. For example, as shown in FIG. 35, the Log format ID 1, 98/1/31:23 log data "12345, 4, 1.23, 'OK'" means that the user ID which issued the job to the print job manager of the service ID 1 is 12345, the output number of sheets of paper is 4, and the amount of toner used is 1.23, with the completion status of the job being OK. In step 5202, a log format table (FIG. 36) is obtained from the device information database 502. In step 5203, the log format ID 2401 at the head of each log data record is obtained, and the log format 2502 is obtained from the log format table (FIG. 36) based on this value. For example, the Log format ID 1 "1:701, 1:565, 1:765, 1:777" represents the user ID which issued the job to the print job manager of the service ID 1, the output number of sheets of paper, the amount of toner used, and the completion status of the job. Also, the Log format ID 2 "11:701, 11:565, 11:765, 11:777" represents the user ID which issued the job to the print job manager of the service ID 11, the output number of sheets of paper, the amount of toner used, and the completion status of the job. In step 5204, analysis of the log data 2403 is performed according to the log format 2502, and the analyzed data is processed along with the log generation time 2402 (sorting of the log, etc.). Then, in step 5205, judgement is made whether or not analysis of the log data of the records has been performed, and in the event that analysis has not been performed the processing from step 5203 is repeatedly executed, and in the event that all has been analyzed, the flow ends.

(Obtaining and Processing Billing Information)

Figure 71:
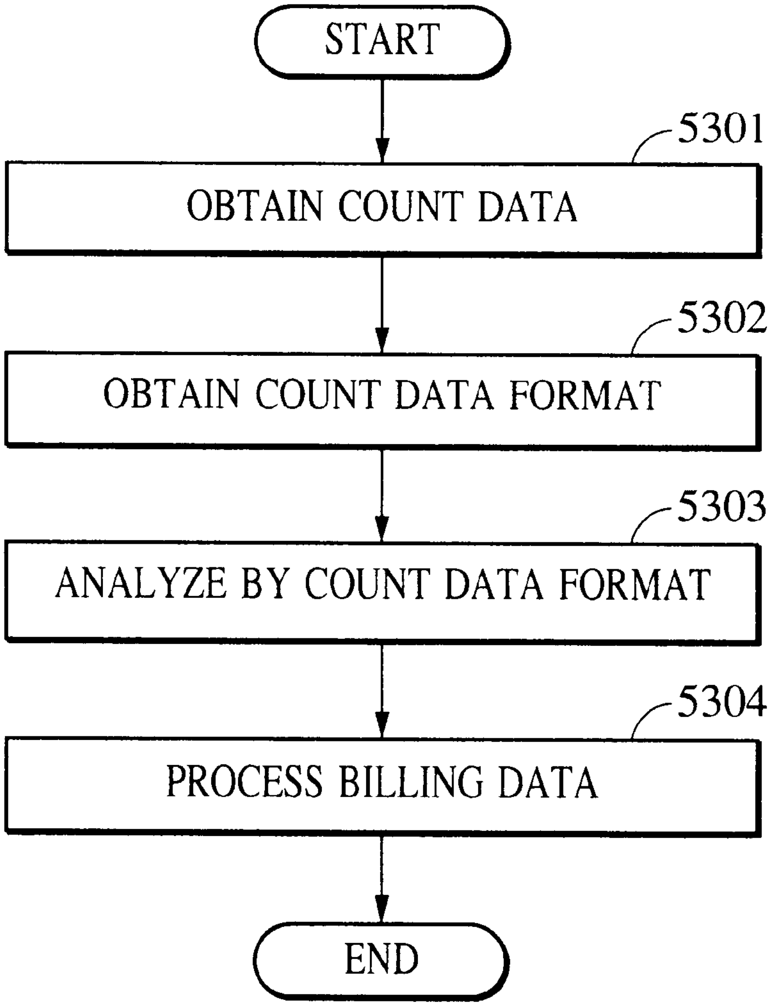
FIG. 71 is a flowchart of obtaining and processing billing information.

FIG. 71 represents a flow for obtaining and processing the billing data billing administration utility 514 with the which the multi-functional peripheral device 201 holds. The billing data is represented as count data which the managers hold. The count data is held in attribute tables (FIGS. 7, 18, 22, 24, 26, 29, 32, 37, 40, and 44) as values of the attribute ID 401, and the value thereof consists of a list of integer values. The meaning of the integer values is represented as a value of the count data format attribute (attribute ID 402) in the attribute tables of the managers, with the value being a list of attribute IDs. The list of count data and the list of count data formats correlate according to the order in the lists. For example, the third value in the count data means the information of the third attribute ID in the count data format. FIG. 71 represents a flow which obtains and processes count data which the managers hold. In step 5301, the service IDs of object managers are specified, and the value of the attribute ID 401 (count data value) is obtained. For example, the values of the attribute ID 401 (45, 78, 34, and 13) represent the number of sheets printed of sizes represented by the attribute ID 402 count data format. The value of this attribute ID 401 is obtained by generating an attribute value obtaining command with the service ID and attribute ID as parameters thereof, and providing this command to the generator 515. In step 5302, the same service ID is specified, to obtain the value of the attribute ID 402 (the value of the count data format). For example, the attribute value 565 of the attribute ID 402 means the number of A2 size sheets printed, the attribute value 537 means the number of A3 size sheets printed, the attribute value 545 means the number of A4 size sheets printed, and the attribute value 523 means the number of A5 size sheets printed. This may be obtained from the device information database. In step 5303, the obtained count data format is used to analyze the count data. In step 5304, the analyzed count data is used to process and generate billing data for each service ID, each user ID, and each copy, for example, and ends.

(Issuing Print Job, Data Download Job)

Figure 72:
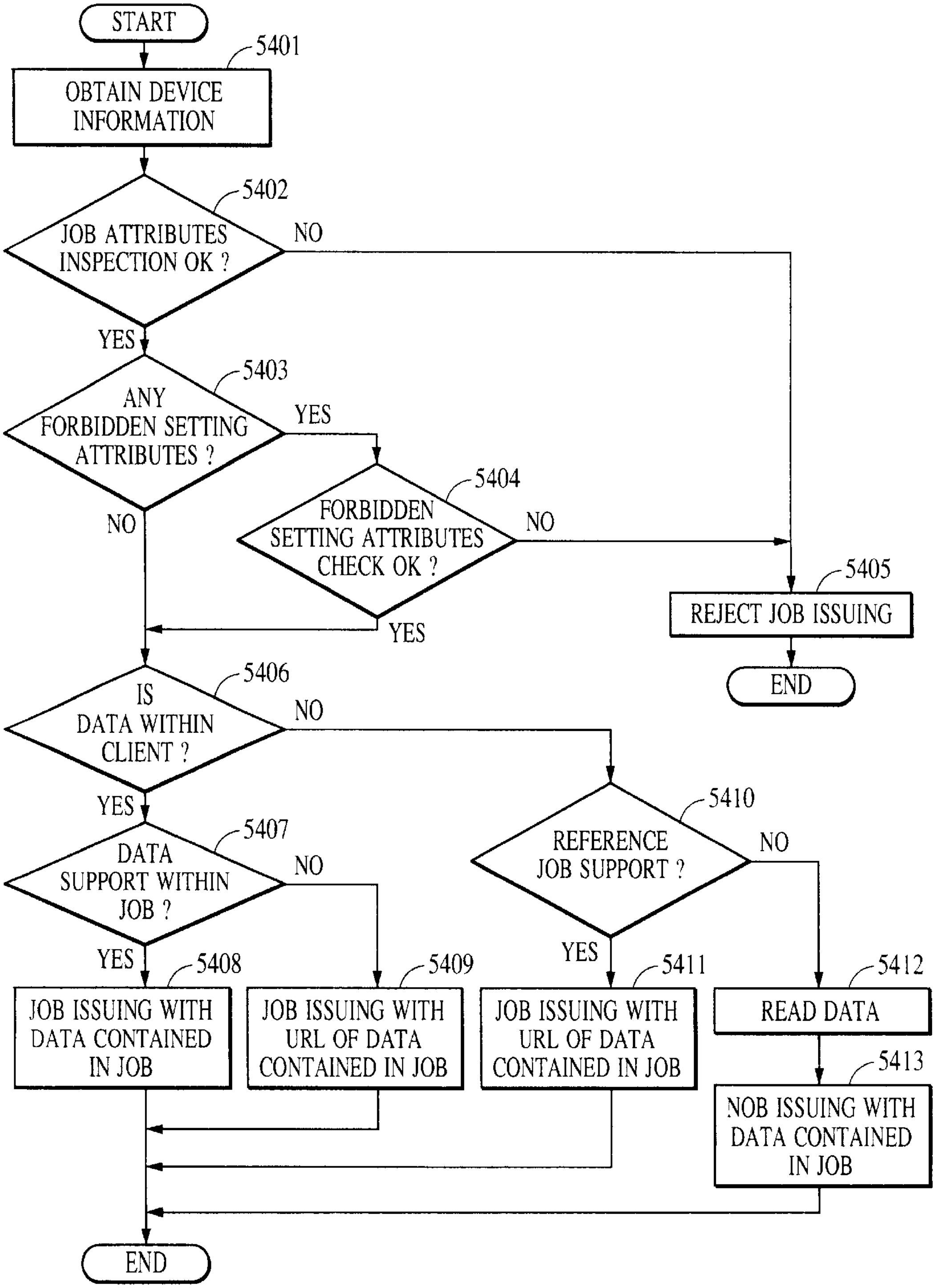
FIG. 72 is a flowchart of job issuing (print job, data download)

FIG. 72 represents the processing for issuing a print job with the printer driver 505, issuing a font data download job script with the font management utility 508, issuing a form overlay data download job script with the form overlay management utility 509, issuing a log data download job script with the log management utility 510, and issuing a color profile data download job script with the color profile management utility 511. The processing flow with any of the above pieces of software (control program) is common one to another, and the document data to be printed and the above various types of data to be downloaded (font data, form data, color profile data, log data) are described from FIG. 72 on and referred to as "data". At the time of issuing a job, the data to be printed or downloaded is specified along with the multiple attribute values to be set within the job script. In step 5401, access is made to the device information database 502 to obtain device information. In step 5402, reference is made to an attributes table containing the managers to which the data is to be provided (for example, in the event that the data is document data to be printed, a print manager for specifying printing), and a check is made whether or not the specified attributes value within the range of the attribute values set in the attributes table. In the event that the check shows that there is even one which is not in the range, issuing of the job is refused, by displaying an error dialog on the user interface in step 5405 or some other like action, and the flow ends.

In step 5402, in the event that the check shows that all attributes are within the range of the attribute values in the attributes table of the manager, a check is made in step 5403 whether or not there are forbidding setting attributes (attribute ID 801 through 805) in the attributes table of the manager. In the event that there are forbidding setting attributes in the attributes table of the manager, a check is made in step 5404 for each forbidding setting attributes in the manager attributes table to make sure that the combination of setting values forbidden is not used. In the event that the check shows that there is a forbidden combination of setting values, a process of refusing issuing of the job is performed in step 5405 and the flow ends. In the event that the check in step 5403 shows that the manager has no forbidden setting attributes or that the check in step 5404 shows that there is no forbidden combination of setting values for job attributes, the location of the data is checked in step 5406. Specification of the location of the data is performed by specifying an address or an application generating an address. In the event that the location of the data is inside the client issuing the job, in step 5407 the attribute value 601 (method for downloading supported data) in the attributes table of the manager handling the operation is checked within the device information database 502.

In the check in step 5407, in the event that a method for including data in the job is supported, a job script containing the data in the job is generated in step 5408, which is sent to the multi-functional peripheral device 201, following the packet generating process shown in FIG. 65. In the check in step 5407, in the event that a method for including data in the job is not supported, a job script containing a reference pointer (URL, or Unified Resource Locator) to the data in the device is generated in step 5409, which is sent. In the check in step 5406, in the event that the data is outside of the client issuing the job, in step 5410 the attribute value 601 (method for downloading supported data) in the attributes table of the manager handling the operation is checked within the device information data. In the check in step 5410, in the event that a method of including a reference pointer in the job and the device itself reading data is supported, job script wherein the reference pointer to the data is included in the job is generated and sent. In the check in step 5410, in the event that a method of including a reference printer in the data and the device itself reading data is not supported, in step 5412 the data is temporarily read from outside of the device into the device. Then, in step 5413, a job script containing the read data within the job is generated and sent. The managers of the multi-functional peripheral device 201 which have received the job script perform the processing indicated in FIGS. 53 through 55 (print job manager) or FIGS. 53, 54, 58 (font manager, form overlay manager, log manager, color profile manager), thereby processing the specified job.

(Issuing Scan Job, Data Upload Job)

Figures 73, 73A:
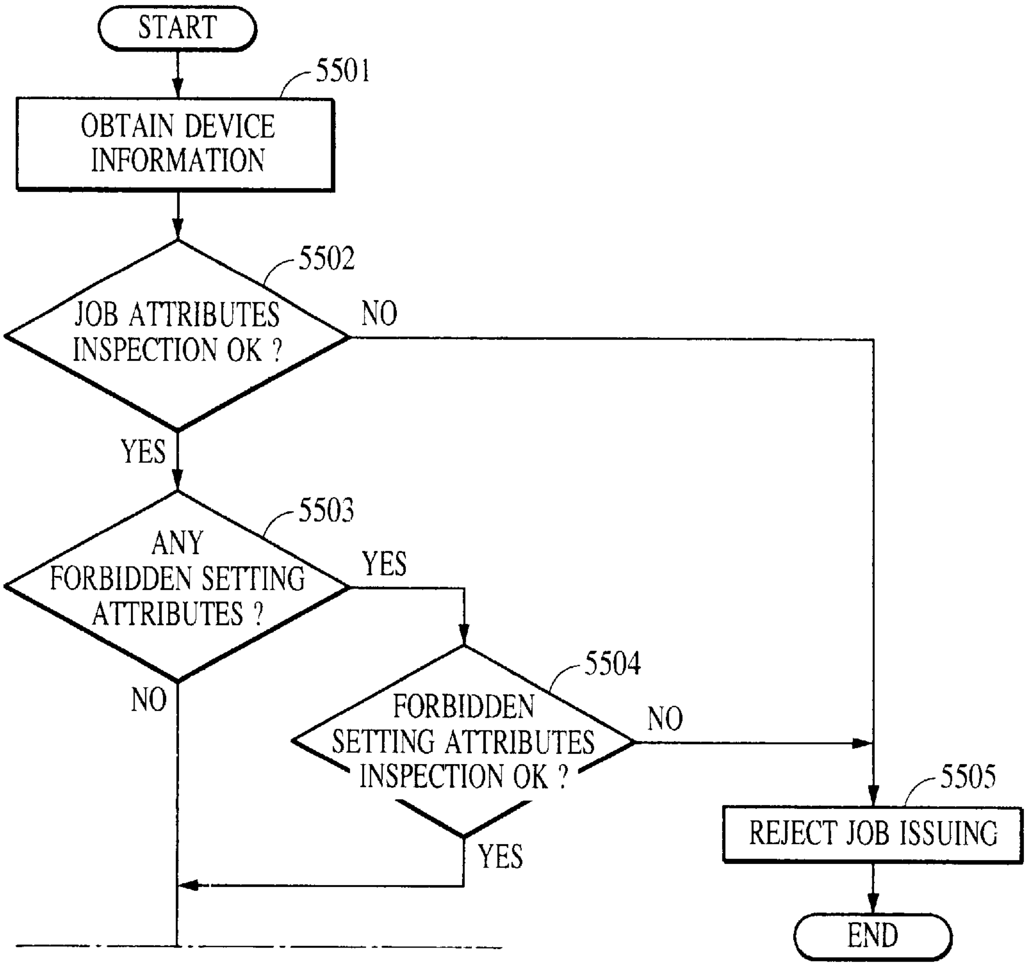
FIG. 73 is a flowchart of job issuing (scan job, data upload)
Figure 73B:
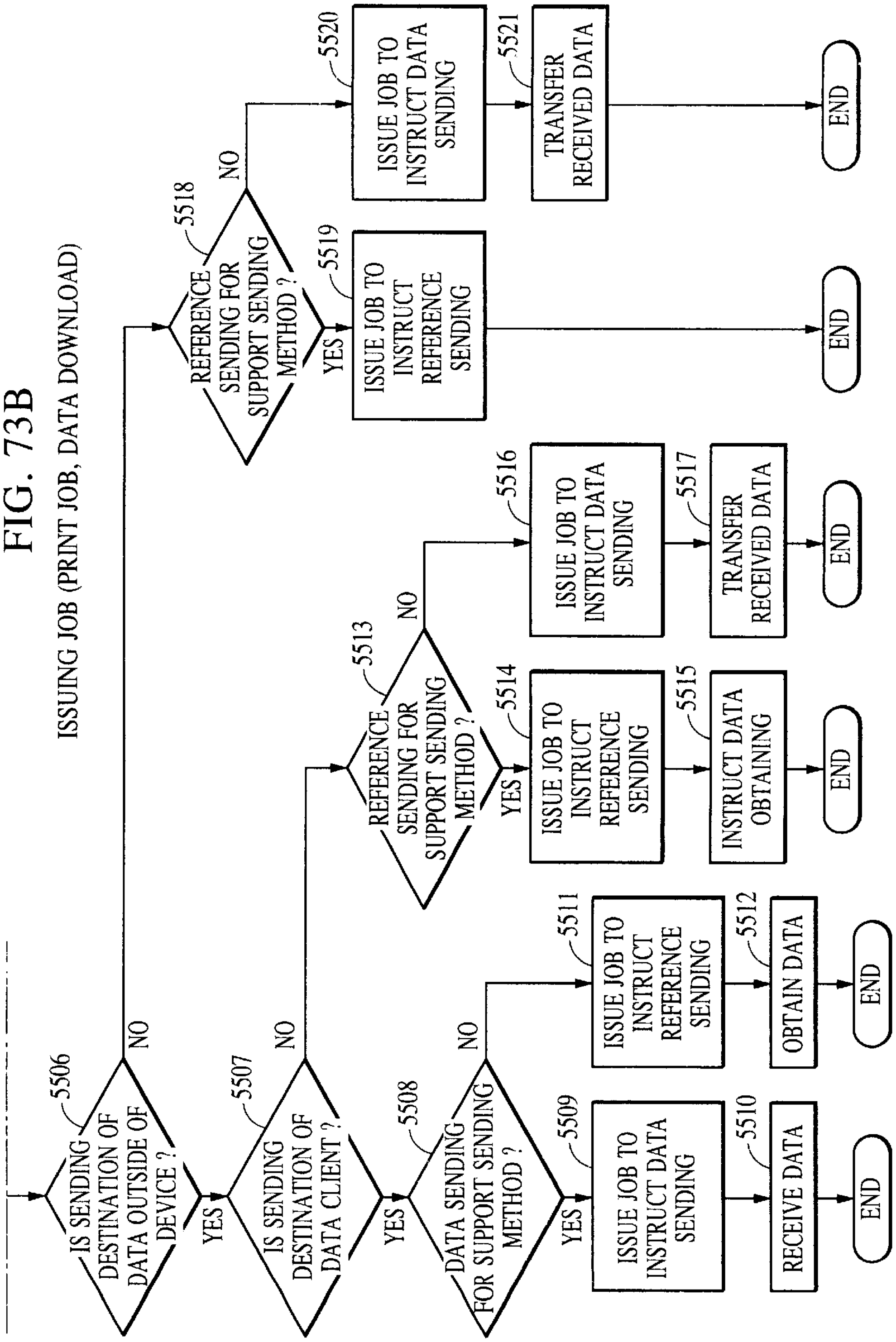

FIG. 73 represents the processing for issuing a scan job with the scanner driver 506, issuing a font data upload job script with the font management utility 508, issuing a form overlay data upload job script with the form overlay management utility 509, issuing a log data upload job script with the log management utility 510, and issuing a color profile data upload job script with the color profile management utility 511. The processing flow with any of the above pieces of software (control program) is common one to another, and the document data obtained by scanning to be printed and the above various types of data to be uploaded (font data, form data, color profile data, log data) are described from FIG. 73 on and referred to as "data". At the time of issuing a job, an indicator pointing to the data is specified along with the multiple attribute values to be set within the job script. In step 5501, access is made to the device information database 502 to obtain device information. In step 5502, reference is made to an attributes table containing the managers to which the data is to be uploaded (for example, in the event of font data, the font manager managing the font data), and a check is made whether or not the specified attributes values are within the range of the attribute values set in the attributes table. In the event that the check shows that there is even one which is not in the range, issuing of the job is refused, by displaying an error dialog on the user interface in step 5505 or some other like action, and the flow ends. In the event that the check in step 5502 shows that all attributes are within the range of the attribute values in the attributes table of the manager, a check is made in step 5503 whether or not there are forbidding setting attributes (attribute ID 801 through 805) in the attributes of the manager. In the event that there are forbidding setting attributes in the attributes table of the manager, a check is made in step 5504 for each forbidding setting attributes in the manager attributes table to make sure that the combination of setting values forbidden is not used for the attributes of the specified job. In the event that the check shows that there is a forbidden combination of setting values, a process of refusing issuing of the job is performed in step 5505 and the flow ends.

In the event that the check in step 5503 shows that the manager has no forbidden setting attributes or that the check in step 5504 shows that there is no forbidden combination of setting values, the sending destination (saving location) of the data is checked in step 5506. In the event that the sending destination is outside the device, the sending destination of the data is check once more in step 5507. In the event that the sending destination of the data is inside the client issuing the job, the attribute value 602 (method for uploading supported data) in the attributes table of the manager handling the operation is checked within the device information data. In the event that the check in step 5508 shows that data sending is supported, and in step 5509 the job script of instructing data sending is issued, thereby performing data reception in step 5510. In the event that the check in step 5508 shows that data sending is not supported (NO), the data is held within the device in step 5511 and a job script, instructing a reference transmission meaning that a reference pointer to the data is sent as a reply, is issued, and the information of the returned reference pointer is used to obtain the data in step 5512. In the event that the sending destination of the data in step 5507 is other than the client issuing the job, the attribute value 602 (method for uploading supported data) in the attributes table of the manager handling the operation is checked within the device information data in step 5513. In the event that the check in step 5513 shows that reference sending is supported, a job script instructing reference sending with the sending destination as a parameter thereof is issued in step 5514, and informing the data sending destination in step 5515 that data will be sent from the multi-functional peripheral device 201 sends data obtaining instructions. In the event that the check in step 5513 shows that reference sending is not supported, a job script instructing data sending is issued in step 5516, data is received in step 5517, and the data is re-sent to the sending destination. In the event that the check in step 5506 shows that the sending destination is within the device, the attribute value 602 (method for uploading supported data) in the attributes table of the manager handling the operation is checked within the device information data in step 5518. In the event that the check in step 5518 shows that reference sending is supported, a job script instructing reference sending with the destination within the device as a parameter thereof is issued in step 5519. In the event that the check in step 5518 shows that reference sending is not supported, a job instructing data sending is issued in step 5520, and in step 5521, the data is returned to the device after the client has received the data. The managers of the multi-functional peripheral device 201 which have received the job script perform the processing indicated in FIGS. 53, 54, 56 (scan job manager) or FIGS. 53, 54, 59 (font manager, form overlay manager, log manager, color profile manager), thereby processing the specified job.

(Issuing Copy Job)

Figure 74:
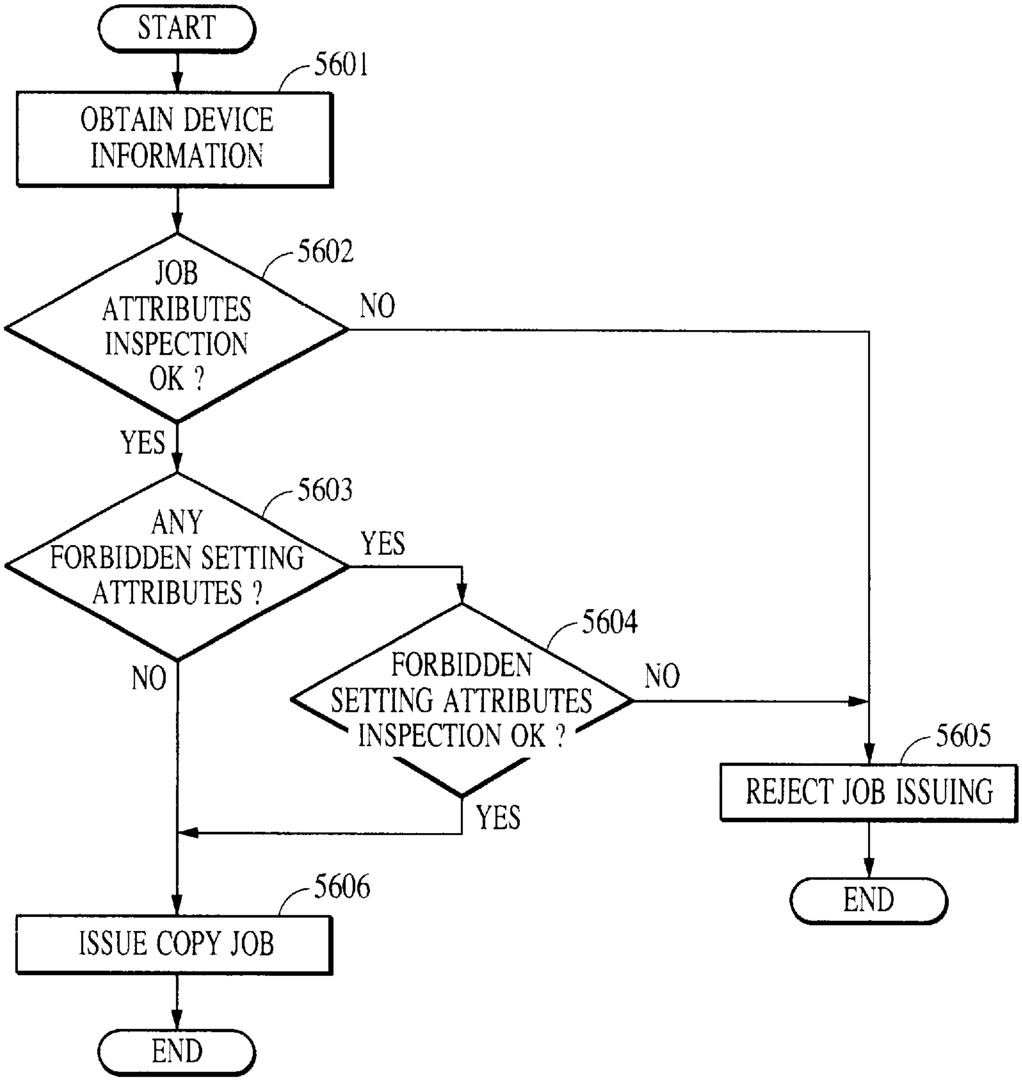
FIG. 74 is a flowchart of copy job issuing.

FIG. 74 represents the processing for issuing a copy job. At the time of instructing copy job issuing, a plurality of attribute values set within the job script are specified. In step 5601, access is made to the device information database 502 to obtain device information. In step 5602, reference is made to an attributes table of the copy manager, and a check is made whether or not the specified attributes values are within the range of the attribute values set in the attributes table. In the event that the check shows that there is even one which is not in the range, issuing of the job is refused, by displaying an error dialog on the user interface in step 5605 or some other like action, and the flow ends. In the event that the check in step 5602 shows that all attributes are within the range of the attribute values in the attributes table of the copy manager, a check is made in step 5603 whether or not there are forbidding setting attributes (attribute ID 801 through 805) in the attributes table of the copy manager. In the event that there are forbidding setting attributes in the attributes table of the copy manager, a check is made in step 5604 for each forbidding setting attributes in the manager attributes table to make sure that the combination of setting values forbidden is not used for the attributes of the specified job. In the event that the check shows that there is a forbidden combination of setting values, a process of refusing issuing of the job is performed in step 5605 and the flow ends. In the event that the check in step 5603 shows that the manager has no forbidden setting attributes and that the check in step 5604 shows that there is no forbidden combination of setting values, a job script is generated in step 5606, which is issued, and the flow ends. The copy job manager of the multi-functional peripheral device 201 which has received the job script performs the processing shown in FIGS. 53, 54, and 57, performing management of the specified job.

(Issuing Job Managing Command)

Figure 75:
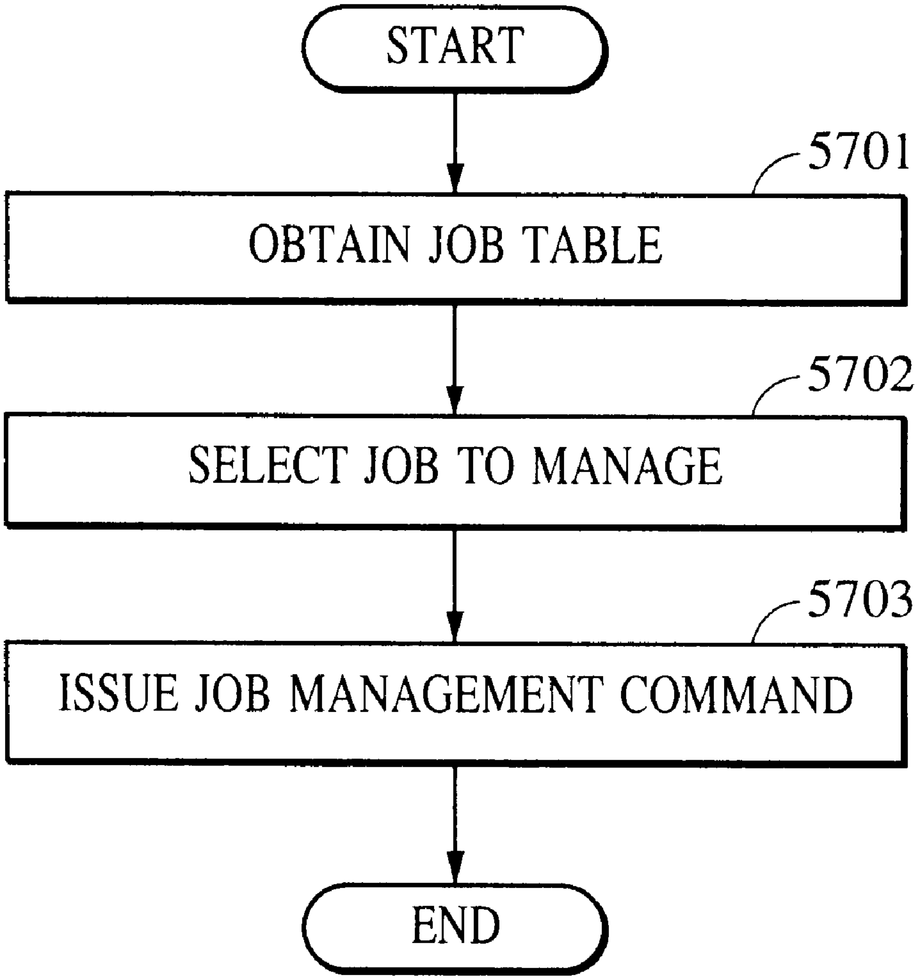
FIG. 75 is a flowchart of job management command issuing.

FIG. 75 represents a processing flow in the case of the job managing utility 512 issuing a job managing command. In step 5701, the service ID of the object manager issued as a parameter to obtain the job table (FIG. 20) of the manager from the MFP 201. In step 5702, a job ID of a job to be managed is selected from the job list contained in the obtained job table is selected by an appropriate method. Examples of the selecting means includes displaying a list of jobs on the display 6003 via the user interface 501 and allowing the user to make the selection, and so forth. In step 5703, a job managing command is generated with the specified job ID as a parameter thereof, which is issued and the flow ends. Upon receiving the job managing command, the supervisor of the multi-functional peripheral device 201 performs the processing indicated in FIGS. 47, 48, 49, 50, 51, 60, and 92 through 95, and manage the specified jobs.

Specifically, in the event that the job managing commands in step 5703 shown in FIG. 75 respectively are "Cancel job", "Promote job", "Change exec time", and "Change expire time", the job managing performed by the corresponding job managers are: the job deletion processing shown in FIG. 92, the job priority changing processing shown in FIG. 93, the execution time changing processing shown in FIG. 94, and the remaining limit time changing processing shown in FIG. 95.

(Issuing an Interruption Job)

Figure 96:
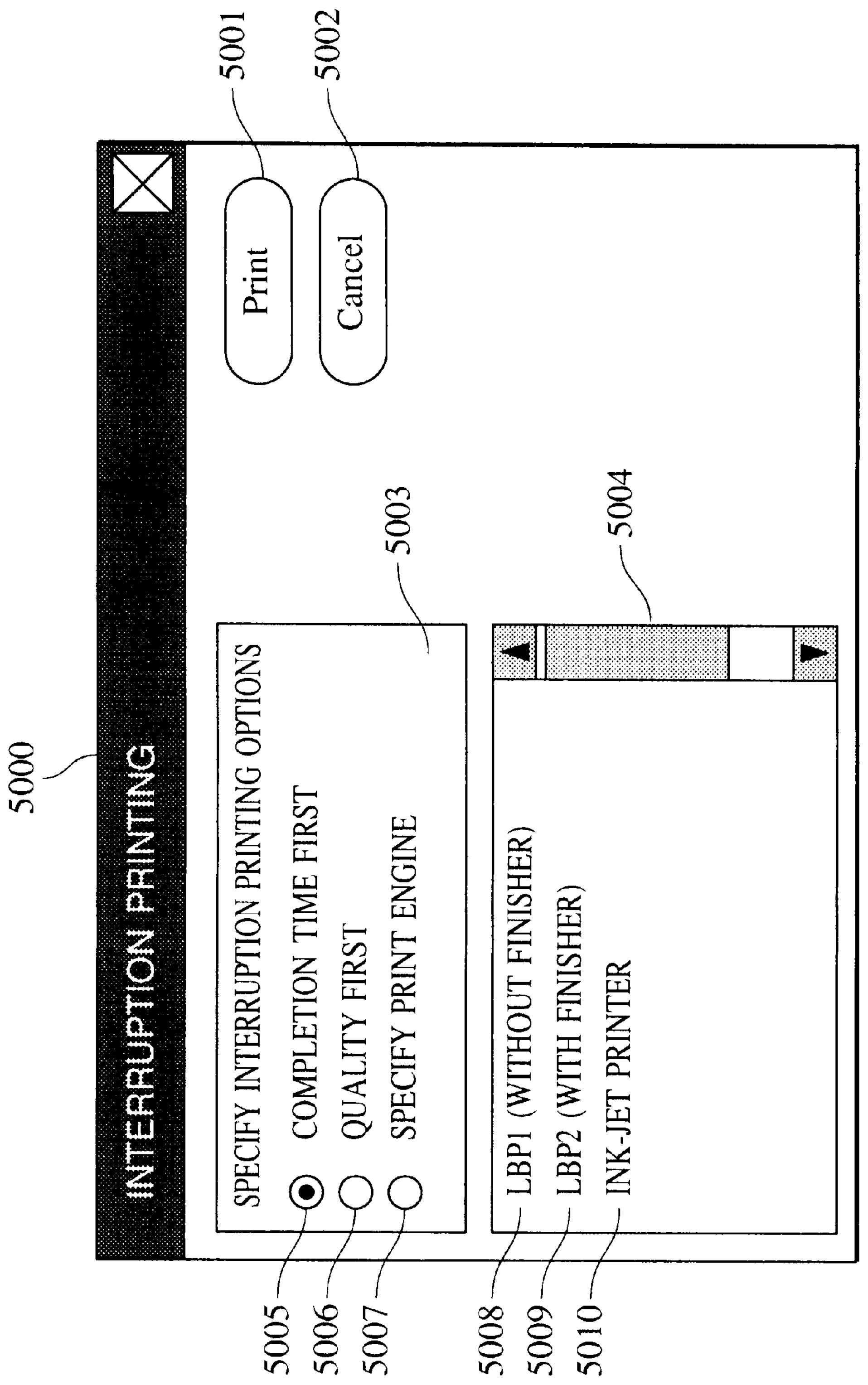
FIG. 96 is an option setting dialog box for executing interruption printing.

FIG. 96 represents a dialog box displayed on the display 6003 at the time of issuing an interruption print job with the print driver 505. In the event that the user instruction interruption printing at the time of providing a job, the dialog box 5000 for setting the interruption options are displayed on the client PC screen. This dialog box sets as an interruption printing option, what will be given priority. That is, the multi-functional peripheral device 201 has multiple print engines, and several selections can be made according to differences in speed, resolution, finishing functions, and so forth.

For example, user preferences can be set such as reducing the wait time to completion of the printing as much as possible, selecting a printer with higher image quality even if this means a longer wait, and so forth. A printer is selected wherein satisfying the preferences of the user set here is the highest priority (there may be cases wherein several are selected), which is instructed to interrupt executing jobs. In 5005 through 5007 shown in FIG. 96, one option preferred by the user is selected. A list of candidates of print engines capable of executing interruption jobs is given at 5004. In the event that the user selects the print engine specification 5007 in the setting in 5003, a preferred print engine listed in 5004 can be selected. In the example shown in FIG. 96, the user has selected completion time priority 5005, so all of the listed printers are used to divide and output the job. Once the setting is completed, the print execution button 5001 is pressed to issue the interruption job.

Figure 97:
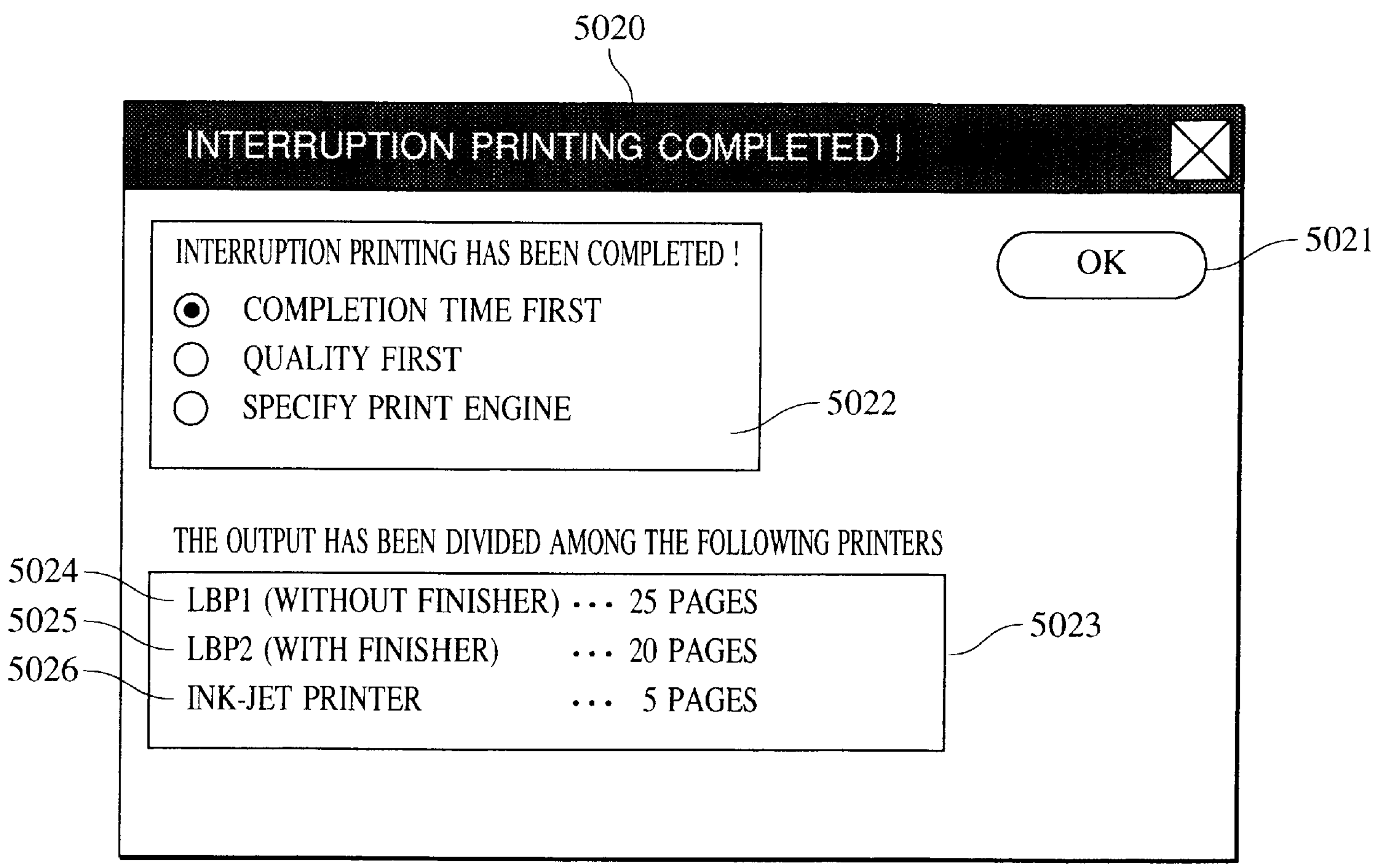
FIG. 97 is a dialog box for notifying completion of interruption printing.

The job completion dialog box is displayed on the user PC as show in FIG. 97, upon the completion notification event of the interruption job issued from the multi-functional peripheral device 201. This dialog box displays the user interruption specifications shown in 5022, and the printer engine names used and the number of pages output shown in 5023. In this example, the user has printed with the completion time having the highest priority, so the three printer engines available at that time for job processing were used to divide the job, so that the completion time would be as short as possible. The user then collects the documents output according to this list.

Figure 98:
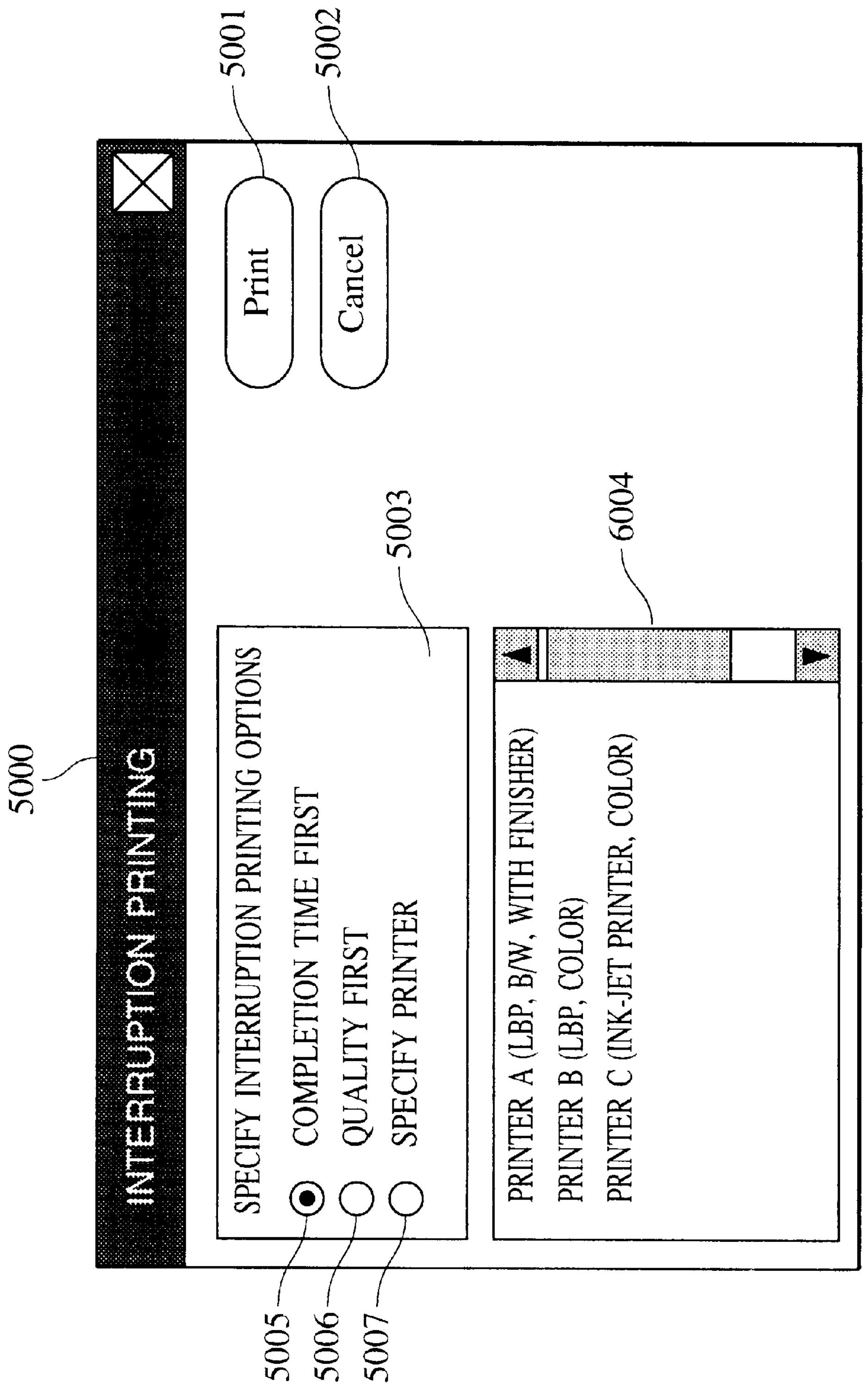
FIG. 98 is an option setting dialog box for executing interruption printing.

Also, as shown in FIG. 98, in the event that the user selects the printer specification option, information (the attribute values of the attributes of the interruption print job managers) regarding the interruption print job managers capable of executing interruption jobs may be listed in 6004. Incidentally, the interruption print job managers are provided with virtual (logical) printer names, and the capabilities and functions thereof are listed in the parentheses. Now, the attribute values of the attributes of the interruption print job managers are obtained in step 5401 of FIG. 72.

Once the user selects either one of the printer engines shown in FIG. 97 or a virtual printer shown in FIG. 98, the device database 502 is searched with the service ID of the corresponding interruption print manager to obtain a sub-address corresponding to the manager, and the job script of the interruption print job is sent to the obtained sub-address.

Figure 99:
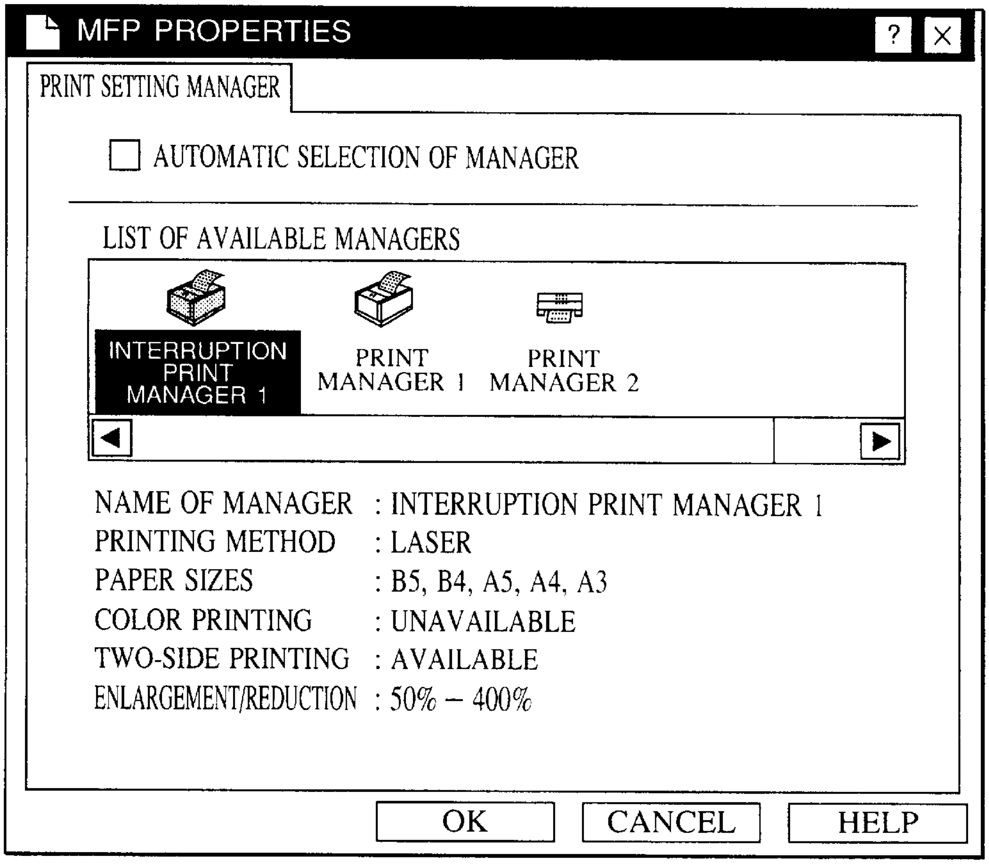
FIG. 99 is an example of a user interface for executing interruption printing.

Also, interruption printing may be specified from a screen such as shown in FIG. 99. The screen shown in FIG. 99 shows a list of print managers and interruption print managers including in the list of the service ID obtained in step 4806 of FIG. 66. Here, manager names are given to the print managers and interruption managers, with the manager names being displayed in a list. In the event of performing interruption processing, the user selects the interruption print manager from the list of managers. Then, the service ID of the interruption print manager is used as a key to search the device database 502, and the job script of the interruption print job is sent to the obtained sub-address.

On the screen, the printing method of a print manager or interruption print manager, paper size, availability of color printing, availability of two-side printing, range of enlargement/reduction, etc., for example, are displayed based on the attributes value obtained in step 4809. The user views the attribute values and can tell what sort of printing method can be used to perform interruption printing on what size of paper, or whether color interruption printing can be performed, or whether both-side interruption printing can be performed.

Now, the printing method is obtained according to which print controller is used, from the attribute values of the attribute ID 2001 (list of controller IDs executing jobs) of the print job manager or interruption print manager. Also, availability of color printing is obtained from the attribute values of the attribute ID 1102 of the print job manager or interruption print manager. Even more detailed information can be displayed based on attribute values.

Now, the present invention may be applied to a system configured of stand-alone copiers, printers, scanners, etc., or to an apparatus comprised of a single device (e.g., a photocopier, facsimile device, etc.) Also, the objects of the present invention are achieved by supplying a storage medium (FIGS. 76 and 77) in which is recorded program code of software (control program) realizing the functions of the above-described embodiment, to the system as shown in FIG. 2, and by the system devices (CPU 301, CPU 6001) reading and executing the program code stored in the storage medium. As for a method to supply the programs and data shown in FIG. 77 to the client PC, storing the programs and data in a floppy disk FD 7000 as shown in FIG. 78 for supply to the PC main unit 7001, is also a common method. In this case, the program code read out from the storage medium itself realizes the above-described functions of the present embodiment, and the storage medium storing the program code comprises the present invention.

Examples of storage medium which may be used for supplying the program code include, e.g., floppy disk, hard disk, and also include optical disk, optical-magnetic disk, CD-ROM, CD-R, magnetic tape, non-volatile memory card, ROM, and so forth. Also, as a matter of course, the present invention includes cases wherein not only are the functions of the above-described embodiment realized by means of executing the program code which the computer has read, but the operating system or the like operating on the computer performs part or all of the actual processing based on the instructions of the program code, this processing realizing the aforementioned functions. Further, as a matter of course, the present invention includes cases wherein following the program code read from the storage medium being written to memory provided to function extension boards inserted to the computer or function extension units connected to the computer, the CPU or the like provided to the function extension board or the function extension unit performs part or all of the actual processing based on the instructions of the program code, this processing realizing the functions of the aforementioned embodiment.

Also, the objects of the present invention may be achieved by software (control program) realizing the above-described functions of the embodiment, wherein program code (the program code shown in FIGS. 76 and 77) are supplied to the storage means (memory 302, disk 315, memory 6002, disk 6009) of a system such as shown in FIG. 2 via a LAN or public telephone lines, from a program sending device, and the system devices (CPU 301 and CPU 6001) read and execute the program code stored in the storing means. The program sending device is mainly a server in a client-server system, examples thereof being a Web server or an ftp server. In this case, the program code itself sent from the program sending device realizes the functions of the present embodiment, and the sending device which has sent the program code comprises the present invention.

Figure 79:
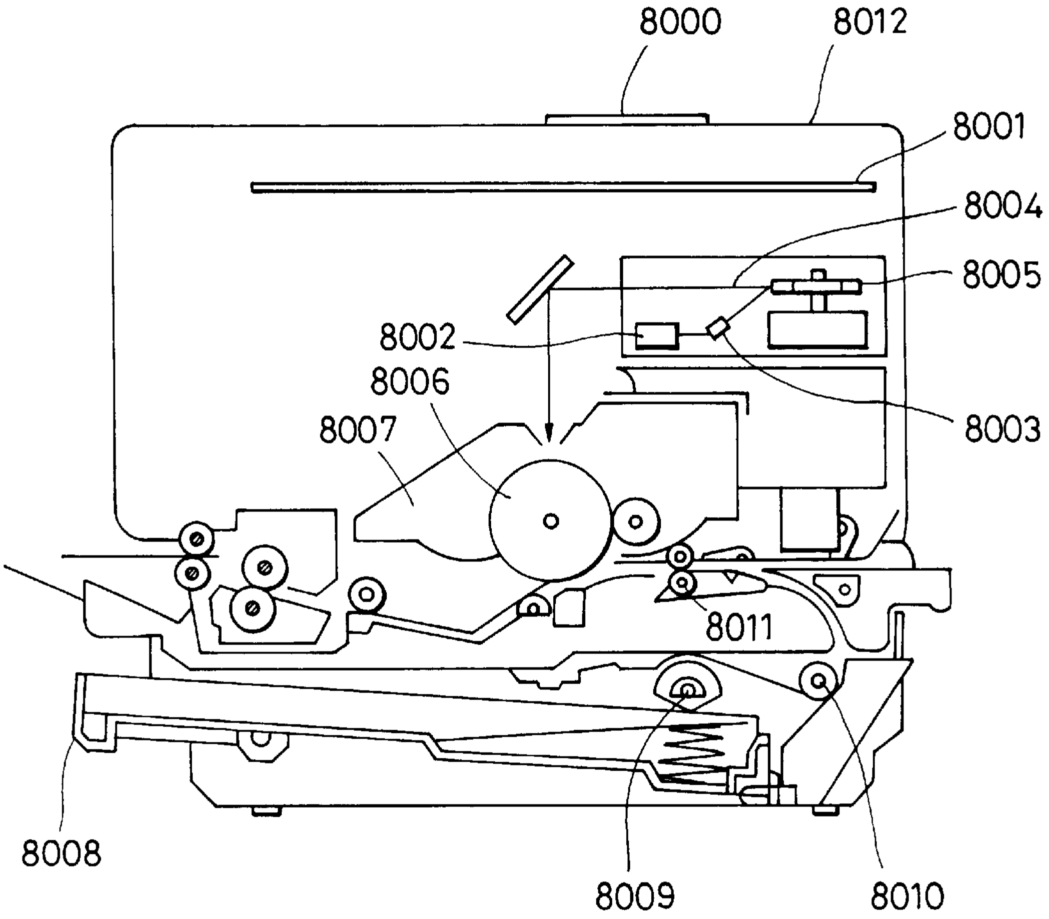
FIG. 79 is a diagram illustrating an LBP applicable to the laser beam printer engine of the MFP.

FIG. 79 is a cross-sectional diagram of the internal structure of a laser beam printer (hereafter abbreviated as LBP) applicable to the laser beam printer engines 103 and 104 shown in FIG. 1, the LBP being capable of inputting text pattern data and the like and printing this or recording paper. In FIG. 79, reference numeral 8012 denotes the LBP proper, and forms an image on the recording paper serving as the recording medium, based on the supplied character pattern. Reference numeral 8000 denotes an operating panel wherein switches for operating and LED display devices, etc., are arrayed. Reference numeral 8001 denotes a printer control unit for overall control of the LBP 8012 and for analyzing text pattern information and the like. This printer control unit 8001 mainly converts text pattern information into video signals and outputs this to the laser driver 8002. The laser driver 8002 is a circuit for driving a semiconductor laser 8003, and switches laser beams 8004 emitted from the semiconductor laser 8003 on and off, according to input video signals. The laser beam 8004 is shunted to the right and left by a rotating polygonal mirror 8005 so as to scan a photosensitive drum 8006. Thus, an electrostatic latent image of the text pattern is formed on the photosensitive drum 8006. This latent image is developed by a developing unit near the photosensitive drum 8006, and then is transferred to recording paper. Cut sheets are used for this recording paper, the cut sheet recording paper being stored in multiple paper cassettes 8008 corresponding to multiple types of paper mounted in the LBP 8012, transported into the device by a feeding roller 8009 and transporting rollers 8010 and 8011, thereby being supplied to the photosensitive drum 8006.

Figure 80:
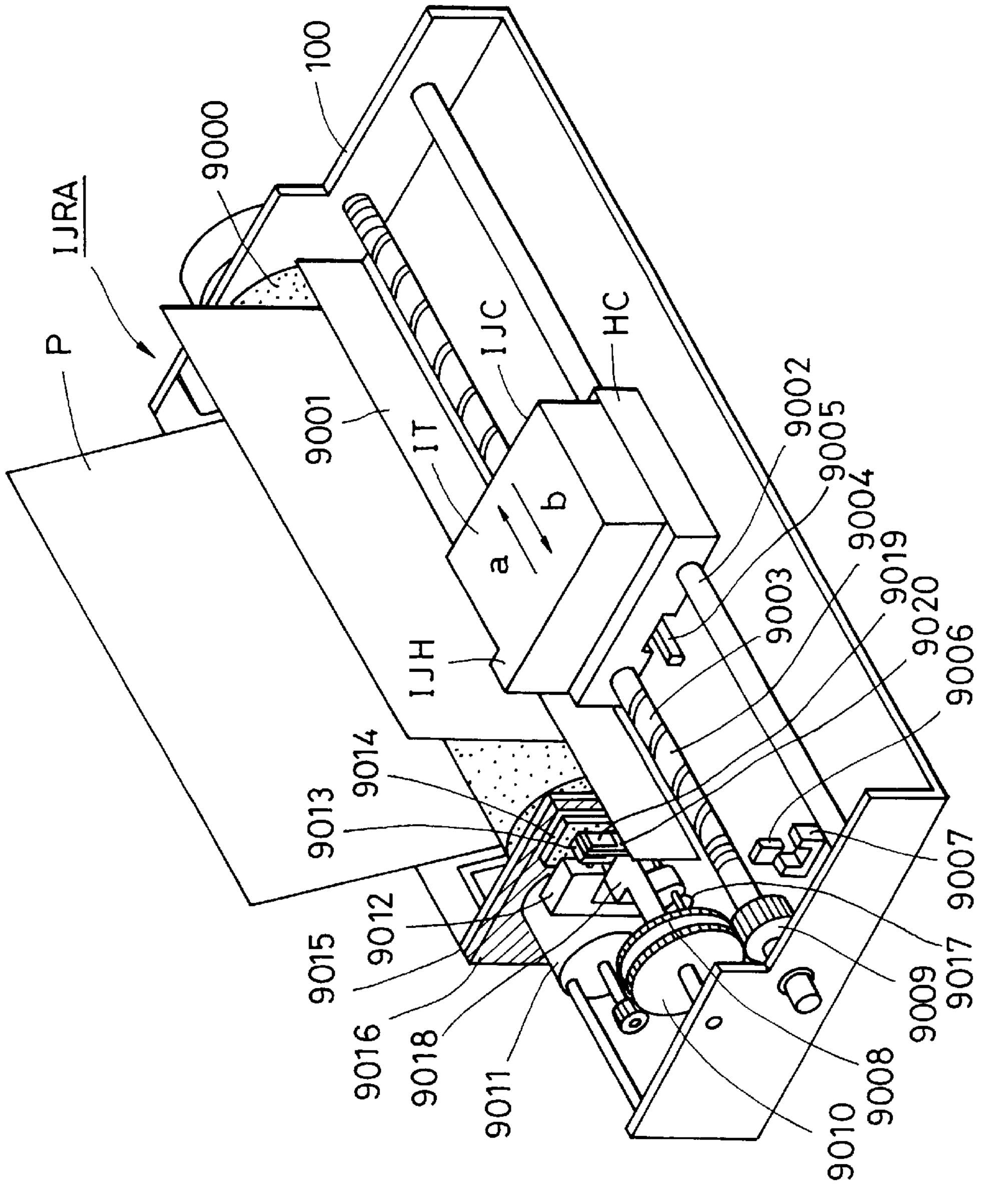
FIG. 80 is a diagram illustrating an IJRA applicable to the ink-jet printer engine of the MFP.

FIG. 80 is a schematic view of an ink jet recording device IJRA hat is capable of being applied o the ink-jet printer engine 105 shown in FIG. 1. In this Figure, the carriage HC, which fits to a spiral groove 9003 of a lead screw 9004 which is rotated via driving force transmitting gears 9010 and 9008 which move synchronously with the forward and reverse rotations of the driving motor 9011, has a pin (not shown), and is reciprocally moved in the directions of the arrows a and b. This carriage HC is mounted with an ink-jet cartridge IJC. Reference numeral 9001 denotes a paper pressing plate, which presses the paper against the platen 900 along the direction of motion of the carriage. Reference numerals 9006 and 9007 denote photo-couplers, serving as home position detecting means for recognizing the existence of a carriage lever 9005 in this area for switching the rotation direction of the motor 9011, and so forth. Reference numeral 9013 is a member for supporting a cap member 9019 for capping the front side of the recording head, reference numeral 9012 is a suction means for suctioning the inside of the cap, and performs suction restoring of the recording head via the cap opening 9020. Reference numeral 9014 is a cleaning blade and reference numeral 9016 is a member for allowing the blade to move forwards and backwards, these being supported by a main unit supporting plate 9015. It is needless to mention that a known cleaning blade may be applied to this example instead of this form. Also, reference numeral 9018 denotes a lever for starting suction for the suction restoration, which moves according to the motion of a cam 9017 which fits with the carriage, the driving force from the driving motor being controlled by known transmitting means such as a clutch or the like. The capping, cleaning, and suction restoration are arranged so that the desired processing can be performed according to the corresponding position of each at the time that the carriage comes to the area of the home position, by operation of the lead screw 9004, but any of these can be applied to the present example as long as the arrangement is such that the desired processing is performed at a known timing.

As described above, according to the present embodiment, job analysis can be performed with a logical device control program (scan job manager 419, print job managers 501 through 509, copy job managers 601 through 608) which holds the functions of a logical device to which jobs are provided from an information processing device and which manages jobs provided to the logical device, and a physical device controlling program (scanner controller 420, LBP controllers 510 and 511, ink-jet controller 512) which holds functions as a device engine for peripheral devices and manages jobs at the device engine.

Now, the physical device control program is a scanner control program (scanner controller 420) for controlling the scanner engine of the peripheral device. The physical device control program is a laser beam printer control program (LBP controllers 510, 511) for controlling the laser beam printer engine of the peripheral device. The physical device control program is an ink-jet printer control program (ink-jet printer controller 512) for controlling the ink-jet printer engine of the peripheral device. Also, the logical device control program is a print job control program (print job managers 501 through 509) for controlling the laser beam printer control program or ink-jet printer control program, or laser beam printer control program and ink-jet printer control program, of the peripheral device. Also, the logical device control program is a scanner job control program (scan job manager 419) for controlling the scanner control program of the peripheral device. Also, the logical device control program is a copy job control program (copy job managers 601 through 608) for controlling the scanner control program and the laser beam printer control program or ink-jet printer control program, or the laser beam printer control program and ink-jet printer control program, of the peripheral device.

According to such a configuration, the logical device control program can maintain the relation with at least one device engine to be used by the logical device for executing the job, so that the device engine to be used for executing the actual job can be determined based on the job provided to the logical device. Also, the functions of the logical device control program can be changed. The job provided to the logical device can be correlated with the job managed by the physical device which actually executes the job. Also, multiple logical device control programs exist, and the load status of the multiple logical device control programs can be compared so that the optimal logical device control program can be selected. Also, a plurality of logical device control programs and a central administration program (supervisor 410) for central administration of the logical device control programs are provided, wherein the central administration program is capable of holding the kind of sub-address and connection interface used at the time of providing jobs to the logical device control programs, in a manner correlated with the logical device control programs. Also, the central administration program holds a list of information indicating whether the sub-addresses are valid or invalid, and is capable of discarding jobs provided to invalid sub-addresses. Also, the central administration program holds a list of verification information of authorized users, and can notify a job error in the event that user information included in the input job is not included in the verification information. Also, the central administration program can hold a list of security levels indicating the kind of verification judgment processing of authorized users. Also, the logical device control program may hold a list of connection interfaces and sending destination addresses for sending event data to the information processing device in the event that an event occurs while analyzing a job. Also, the logical device control program can make reference to a list of connection interfaces and sending destination addresses, for sending event data to the information processing device in the event that an event occurs while analyzing a job.

Also, according to the present embodiment as described above, a control program user interface for controlling peripheral device may be automatically configured (step 4813) according to the functions (attribute values) obtained from the peripheral devices. Also, display of the user interface (FIGS. 81 and 82) for the peripheral devices can be controlled according to the obtained functions. Also, information (attributes data) relating to the setting range of the functions of the peripheral device can be obtained. Also, information relating to the setting range of the peripheral equipment is represented as attribute combinations (attribute ID 801 through ID 805) regarding which job setting is forbidden. Also, information (attributes values) regarding function options of the peripheral devices can be obtained. An attributes list (attributes table) indicating functions of the peripheral device can be obtained from the peripheral device, and attribute values can be obtained from the attributes list by specifying the attribute ID. Also, an attributes list (attributes table) indicating the functions of the physical device control program, logical device control program, resource control program, and the central administration program governing the above, with regard to peripheral devices, can be obtained from the peripheral devices. Also, the physical device control program is a scanner control program for controlling the scanner engine of the peripheral device. Also, the physical device control program is a laser beam printer control program for controlling the laser beam printer engine of the peripheral device.

Also, the physical device control program is an ink-jet printer control program for controlling the ink-jet printer engine of the peripheral device. Also, the logical device control program is a print job control program for controlling the laser beam printer control program or ink-jet printer control program, or laser beam printer control program and ink-jet printer control program, of the peripheral device. Also, the logical device control program is a scanner job control program for controlling the scanner control program of the peripheral device. Also, the logical device control program is a copy job control program for controlling the scanner control program and the laser beam printer control program or ink-jet printer control program, or the laser beam printer control program and ink-jet printer control program, of the peripheral device. Also, the resource control program is a font control program for managing fonts of the peripheral device. Also, the resource control program is a form overlay control program for managing form overlay of the peripheral device. Also, the resource control program is a log control program for managing logs of the peripheral device. Also, the resource control program is a color profile control program for managing color profiles of the peripheral device.

Also, according the present embodiment as described above, the job issuing processing can be controlled by judging whether or not job scripts can be issued to the peripheral device (steps 5402 through 5404, and steps 5502 through 5504), based on functions obtained from the peripheral device (MFP 201).

Now, an attributes list (attributes table) indicating the functions of each of the physical device control programs, logical device control programs, resource control programs (font manager 413, form overlay manager 414, log manager 415, and color profile manager 416), and the central administration program governing the above, of the peripheral device, is obtained from the peripheral device. Also, combinations of attributes forbidden for job settings (Attribute ID 801 through ID 805) are obtained. Also, a download job or print job is issued to the peripheral device. Also, an upload job or scan job is issued to the peripheral device. Also, the job issuing method is selected according to the attributes (attribute ID 601) indicating support of the download method of the obtained function, and the location of data which is the object of issuing. Also, the job issuing method is selected according to the attributes (attribute ID 602) indicating support of the upload method of the obtained function, and the saved location of data which is the object of job issuing. Also, data which is the object of job issuing is print document data. Also, data which is the object of job issuing is scan document data. Also, data which is the object of job issuing is font data. Also, data which is the object of job issuing is form overlay data. Also, data which is the object of job issuing is color profile data. Also, data which is the object of job issuing is log data. Also, data which is the object of job issuing is font data. Also, event format data according to events received from the peripheral device is obtained, and received events are analyzed based on the event format data. Also, the log data of the peripheral device and the log format data of the log data are obtained, and the log data is analyzed based on the log format data. Also, the billing data (count data) of the peripheral device and the format data of the billing data are obtained, and the billing data is analyzed based on the billing format data.

As described above, according to the present invention, with regard to a peripheral device connected to an information processing device, in the event that an interruption job is input from the information processing device while the peripheral device is processing a job by executing one of multiple device control programs for holding the functions of multiple devices engines of the peripheral device and managing jobs with the device engines, another device control program different from the device control program being executed is selected and the interruption job is executed.

Also, the device control program can save the context of the job that was being executed at the time of interruption job input, and restore the execution context of the saved job at the point that execution of the interruption job is completed.

Also, multiple input of other interruption jobs can be prevented while executing an interruption job.

Also, in the event that an interruption copy job is input, the job can be provided to the scanner control program holding the functions of the scanner engine of the peripheral device and managing jobs with the scanner engine, and then be provided to an arbitrary printer control program holding the functions of a printer engine of the peripheral device and managing jobs with the printer engine.

Also, identification information corresponding to device control programs of the peripheral device, such as icons, are listed on the display of the information processing device, and the user can issue an interruption job by selecting one of these. An icon corresponding to a device control program selected and executed at the time of issuing an interruption job is included in the listed icons, and the interruption job is issued by the user selecting this icon. Further, the user can know which sort of interruption jobs can be issued, by viewing the information relating to the device control programs.

What is claimed is:

1. An information processing apparatus for outputting a job to a peripheral device, comprising:

obtaining means for obtaining information about a control program having a function for controlling jobs with a device engine;

display control means for displaying identification information for identifying the control program which instructs interruption job execution to the peripheral device;

selecting mean for selecting identification information displayed by said display control means; and output means for outputting a job instruction to a control program corresponding to the identification information selected by said selecting means, wherein the displayed identification information is based on the obtained information from said obtaining means and includes information relevant to the control program which is executed in the peripheral device.

2. An information processing apparatus according to claim 1, wherein said information relevant to the control program includes types of control programs, wherein said types of control program include an interruption job.

3. An information processing apparatus according to claim 1, wherein said information relevant to the control program includes the function of said control program.

4. An information processing apparatus for outputting a job to a peripheral device, comprising:

obtaining means for obtaining information about a device control program having a function for controlling jobs with a device engine;

display control means for displaying identification information for identifying the device control program which instructs interruption job execution to the peripheral device;

selecting means for selecting identification information displayed by said display control means; and output means for outputting a job instruction to a device control program corresponding to the identification information selected by said selecting means, wherein said display means displays the identification information for identifying said device control program which is executed in the peripheral device, in the event that an interruption job is output, so as to be distinguished from other device control programs.

5. An information processing method for outputting a job to a peripheral device comprising:

an obtaining step of obtaining information about a control program having a function for controlling jobs with a device engine;

a display control step of displaying identification information for identifying the control program which intructs interruption job execution to the peripheral device;

a selecting step of selecting identification information displayed in said display control step; and an output step of outputting a job instruction to a control program corresponding to the identification information selected in said selecting step, wherein the displayed identification information is based on the obtained information from said obtaining step and includes information relevant to the control program which is executed in said peripheral device.

6. An information processing method according to claim 5, wherein said information relevant to the control program includes types of control programs, wherein said types of control program include an interruption job.

7. An information processing method according to claim 5, wherein said information relevant to the control program includes the function of said control program.

8. An information processing method for outputting a job to a peripheral device comprising:

an obtaining step of obtaining information about a device control program having a function for controlling jobs with a device engine;

a display control step of displaying identification information for identifying the device control program which instructs interruption job execution to the peripheral device in the event that an interruption job is output, based on the obtained information;

a selecting step of selecting identification information displayed in said display control step; and an output step of outputting a job instruction to a device control program corresponding to the identification information selected in said selecting step, wherein said display step includes displaying the identification information for identifying the device control program which is executed in the peripheral device, in the event that an interruption job is output, so as to be distinguished from other device control programs.

9. A storage medium, which stores an information processing program for execution in an information processing apparatus for outputting a job to a peripheral device, the information processing program comprising:

an obtaining step of obtaining information about a control program having a function for controlling jobs with a device engine;

a display control step of displaying identification information for identifying the control program which instructs interruption job execution to the peripheral device;

a selecting step of selecting identification information displayed in said display control step; and an output step of outputting a job instruction to a control program corresponding to the identification information selected in said selecting step, wherein the displayed identification information is based on the obtained information from said obtaining step and includes information relevant to the control program which is executed in the peripheral device.

10. A storage medium according to claim 9, wherein said information relevant to the control program includes types of control programs, where said types of control programs include an interruption job.

11. A storage medium according to claim 9, wherein said information relevant to the control program includes the function of said control program.

12. A storage medium which stores an information processing program for execution in an information processing apparatus for outputting a job to a peripheral device, the information processing program comprising:

an obtaining step of obtaining information about a device control program having a function for controlling jobs with a device engine;

a display control step of displaying identification information for identifying the device control program which instructs interruption job execution to the peripheral device;

a selecting step of selecting identification information displayed in said display control step; and an output step of outputting a job instruction to a device control program corresponding to the identification information selected in said selecting step, wherein said display step includes displaying the identification information for identifying the device control program which is executed in the peripheral device, so as to be distinguished from other device control programs.

13. An information processing product executed in an information processing apparatus for outputting job to a peripheral device, the information processing program comprising:

an obtaining step of obtaining information about a control program having a function for controlling jobs with a device engine;

a display step of displaying identification information for identifying the control program which instructs interruption job execution to the peripheral device;

a selecting step of selecting identification information displayed in said display control step; and an output step of outputting a job instruction to a control program corresponding to the identification information selected in said selecting step, wherein the displayed identification information is based on the obtained information from said obtaining step and includes information relevant to the control program which is executed in the peripheral device.

* * * * *

UNITED STATES PATENT AND TRADEMARK OFFICE

CERTIFICATE OF CORRECTION

PATENT NO. : 6,775,729 B1
DATED : August 10, 2004
INVENTOR(S) : Matsuo et al.

It is certified that error appears in the above-identified patent and that said Letters Patent is hereby corrected as shown below:

Title page,
Item [75], Inventors: "Takyuki Matsuo, Yokohama (JP);" should read
-- Takayuki Matsuo, Yokohama (JP); --.

Column 6,
Line 50, "of" should read -- of driving a --.

Column 14,
Line 40, "even" should read -- event --;
Line 53, "provided" should be deleted; and
Line 54, "with" should read -- will --.

Column 30,
Line 52, "and" should be deleted.

Column 32,
Line 44, "lest" should read -- list --.

Column 39,
Line 33, "thereof" should read -- thereto --.

Column 42,
Line 25, "cob" should read -- job --.

Column 43,
Line 48, "IDS" should read -- IDs --.

Column 49,
Line 52, "a" should read -- an --.

Column 50,
Line 24, "one" should read -- on --.

Column 51,
Line 64, "value" should read -- value is --.

Column 52,
Line 10, "attributes" should read -- attribute --.

UNITED STATES PATENT AND TRADEMARK OFFICE

CERTIFICATE OF CORRECTION

PATENT NO. : 6,775,729 B1 
DATED : August 10, 2004
INVENTOR(S) : Matsuo et al.

It is certified that error appears in the above-identified patent and that said Letters Patent is hereby corrected as shown below:

<u>Column 53</u>,
Line 23, "attributes" should read -- attribute --;
Line 36, "check" should read -- checked --; and
Line 42, "and" should be deleted.

<u>Column 54</u>,
Line 33, "805)." should read -- 805) --;
Line 58, "is selected" should be deleted; and
Line 67, "manage" should read -- manages --.

<u>Column 56</u>,
Line 2, "ID" should read -- IDs --.

<u>Column 57</u>,
Line 4, "are" should read -- is --;
Line 20, "or" should read -- on --;
Line 48, "hat" should read -- that --; and
Line 48, "o" should read -- to --.

<u>Column 60</u>,
Line 21, "(Attribute" should read -- (attribute --.

Signed and Sealed this

Fourteenth Day of February, 2006

JON W. DUDAS
*Director of the United States Patent and Trademark Office*